US008645112B2

(12) United States Patent
Falash et al.

(10) Patent No.: US 8,645,112 B2
(45) Date of Patent: Feb. 4, 2014

(54) DISTRIBUTED PHYSICS BASED TRAINING SYSTEM AND METHODS

(75) Inventors: Mark Falash, Oviedo, FL (US); Eytan Pollak, Oviedo, FL (US); Yushan Chen, Orlando, FL (US); Jon Williams, Oviedo, FL (US)

(73) Assignee: L-3 Communications Corporation, New York, NY (US)

( * ) Notice: Subject to any disclaimer, the term of this patent is extended or adjusted under 35 U.S.C. 154(b) by 892 days.

(21) Appl. No.: 12/085,541

(22) PCT Filed: Nov. 28, 2006

(86) PCT No.: PCT/US2006/045569
§ 371 (c)(1),
(2), (4) Date: May 27, 2008

(87) PCT Pub. No.: WO2007/062260
PCT Pub. Date: May 31, 2007

(65) Prior Publication Data
US 2009/0099824 A1    Apr. 16, 2009

Related U.S. Application Data

(60) Provisional application No. 60/740,579, filed on Nov. 28, 2005.

(51) Int. Cl.
*G06G 7/48* (2006.01)
(52) U.S. Cl.
USPC ..................................... 703/6; 703/7; 703/8
(58) Field of Classification Search
USPC ...................................... 703/6, 7, 8
See application file for complete search history.

(56) References Cited

U.S. PATENT DOCUMENTS

| 5,910,903 | A | 6/1999 | Feinberg et al. |
| 6,763,325 | B1 | 7/2004 | Stone |
| 6,809,738 | B2 * | 10/2004 | Hubrecht et al. ............ 345/543 |
| 7,240,094 | B2 * | 7/2007 | Hackney et al. ............ 709/205 |
| 2002/0138242 | A1 | 9/2002 | Wilensky et al. |
| 2005/0168403 | A1 * | 8/2005 | Ebersole et al. .............. 345/8 |
| 2005/0187742 | A1 | 8/2005 | Collodi |
| 2007/0146367 | A1 * | 6/2007 | Harvey, Jr. .................. 345/473 |
| 2011/0126131 | A1 * | 5/2011 | Baszucki ..................... 715/757 |

OTHER PUBLICATIONS

Nordfelth, M. and Skogman, F., "Extending TACSI with Support for Group Behavior," SAAB Aerosystems AB, May 19, 2005.

(Continued)

*Primary Examiner* — Aniss Chad
(74) *Attorney, Agent, or Firm* — Tiajoloff and Kelly LLP

(57) ABSTRACT

A distributed simulation system is composed of simulator stations linked over a network that each renders real-time video imagery for its user from scene data stored in its data storage. The simulation stations are each connected with a physics farm that manages the virtual objects in the shared virtual environment based on their physical attribute data using physics engines, including an engine at each simulation station. The physics engines of the physics farm are assigned virtual objects so as to reduce the effects of latency, to ensure fair fight requirements of the system, and, where the simulation is of a vehicle, to accurately model the ownship of the user at the station. A synchronizer system is also provided that allows for action of simulated entities relying on localized closed loop controls to cause the entities to meet specific goal points at specified system time points.

40 Claims, 44 Drawing Sheets

(56) References Cited

OTHER PUBLICATIONS

Bakker, K. and Button, C., "Train as You Fight, Integrating the Army's Aviation Mission Planning System with AVCATT-A," 2003.
VBS1, "Features," Bohemia Interactive Studio, 2004, retrieved from the Internet from http://www.virtualbattlespace.com/features.htm.
RP, "Forward Air Control Trainer to Go on Display," Jane's International Defence Review, Sep. 2005.
Chapter VI.: Infrastructure: Army Science and Technology Master Plan (ASTMP 1997) "3. Distributed Interactive Simulation," http://www.fas.org/man/dod-101/army/docs/astmp/c6/P6C3.htm, retrieved Nov. 17, 2005.
Lu, Honghui, et al. "The Design of Synchronization Mechanisms for Peer-to-Peer Massively Multiplayer Games". Department of Computer and Information Science, The University of Pennsylvania Technical Report, 2004.
McLaurin, Matt. "Outsourcing Reality: Integrating a Commercial Physics Engine". Gamasutra.com, http://www.gamasutra.com/features/20020816/maclaurin_01, Aug. 16, 2002.
Brunett, et al. "An Architecture for Large MODSAF Simulations Using Scalable Parallel Processors". California Institute of Technology, 1997.
Brunett, et al. "Implementing Distributed Synthetic Forces Simulations in Metacomputing Environments," hcw, pp. 29, Seventh Heterogeneous Computing Workshop, 1998.
Cohen, et al. "From HLA to MMOG and Back Again". Working Group, 2004.
Brunett, et al. "Metacomputing Supports Large-Scale Distributed Simulations". California Institute of Technology, 1998.
Prasithsangaree, et al. "UTSAF: A Simulation Bridge Between OneSAF and the Unreal Game Engine". IEEE International Conference on Systems, Man and Cybernetics, Oct. 5-8, 2003.
Knutsson, et al. "Peer-to-Peer Support for Massively Multiplayer Games". INFOCOM 2004: Twenty Third Annual Joint Conference of the IEEE Computer and Communications Societies, University of Pennsylvania, Philadelphia, PA, Nov. 22, 2004.
Messina, et al. "Synthetic Forces Express: A New Initiative in Scalable Computing for Military Simulation". 1997.
Little, Reed. "Architectures for Distributed Interactive Simulation". Advances in Modeling and Simulation Conference, 1994.
Hardt, et al. "Distributed Interactive Simulation (DIS)". University of Central Florida, Fall 1998.
AGEIA: A White Paper: Physics, Gameplay and the Physics Processing Unit. AGEIA Technologies, Inc., Mar. 2005.
FLAMES Support for Distributed, Interactive Simulation. Copyright 2005 Ternion Corporation, version Nov. 16, 2005.
Smith, Russell. "Math Engine Non-Technical Technology Briefing". Jul. 7, 1999.
Lander, Jeff and Hecker, Chris. "Product Review of Physics Engine, Part One: The Stress Tests," http://www.gamasutra.com/features/20000913/lander_01.htm. Sep. 13, 2000.
Lander, Jeff and Hecker, Chris. "Product Review of Physics Engine, Part Two: The Rest of the Story," http://www.gamasutra.com/features/20000920/lander_01.htm. Sep. 20, 2000.
"Physics Processing Unit". Contributed by jkabaseball, www.devhardware.com/index2.php?option=content&task=view&id=1534&pop=1, retrieved Nov. 18, 2005.
Smith, Russell. "Dynamics Simulation: A Whirlwind Tour (Current State, and New Frontiers)". Dec. 2004.
Sweeney, Tim. "Unreal Networking Architecture". Epic MegaGames, Inc. Retrieved from http://unreal.epicgames.com/Network.htm. Last updated Jul. 21, 1999.
Brunett, et al. "A Large-Scale Metacomputing Framework for the ModSAF Real-Time Simulation". Parallel Computing, vol. 24, Issues 12-13, Nov. 1998, p. 1873-1900.

\* cited by examiner

Dead Reckoning

Example of current Military DIS approach vs. new Physics approach

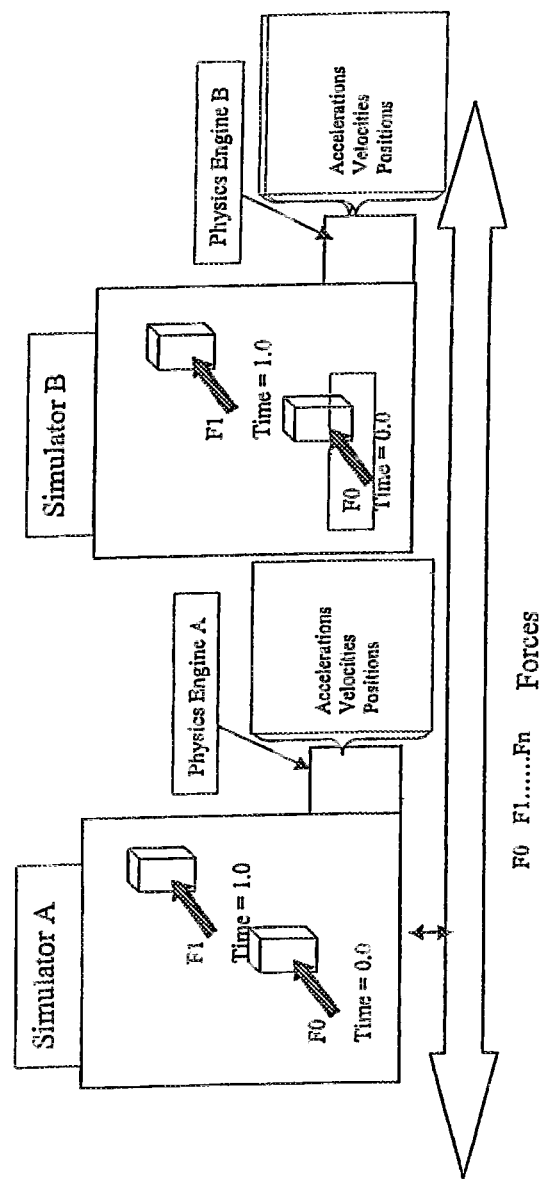
Figure 9. Physics Networking Approach

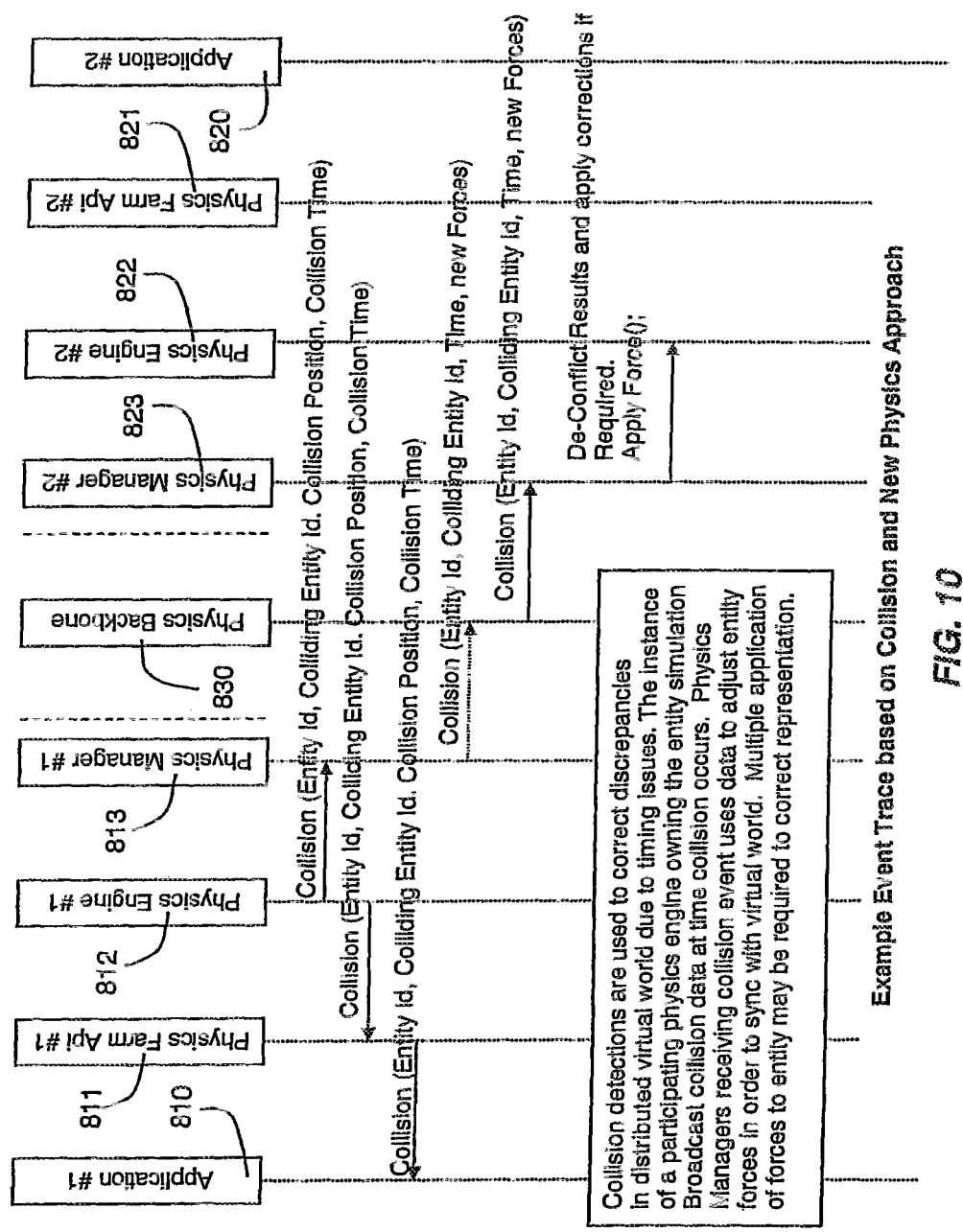

| Create Entity | Entity Id | Identifies unique instance of entity in distributed simulation |
| --- | --- | --- |
| | Entity Type | Type of entity to be create, used to load entity attributes |
| | Time | Time that entity was created |
| | Position | Initial position of entity |
| | Forces | Initial forces to be applied to entity |
| Apply Force | Entity Id | Identifies unique instance of entity that force is applied to |
| | Time | Time that new force was applied |
| | Force | Force to be applied to entity |
| Collision | Entity Id | Identifies unique instance of entity experiencing collision |
| | Colliding Id | Identifies unique instance of entity that Entity collided with. |
| | Time | Time that collision event occurred |
| | Position | Position identifying location of collision |
| | Forces | Forces of entity that result from collision |

Example Message Formats

*FIG. 11*

Physics Application Manager resource management approach using New Physics Approach

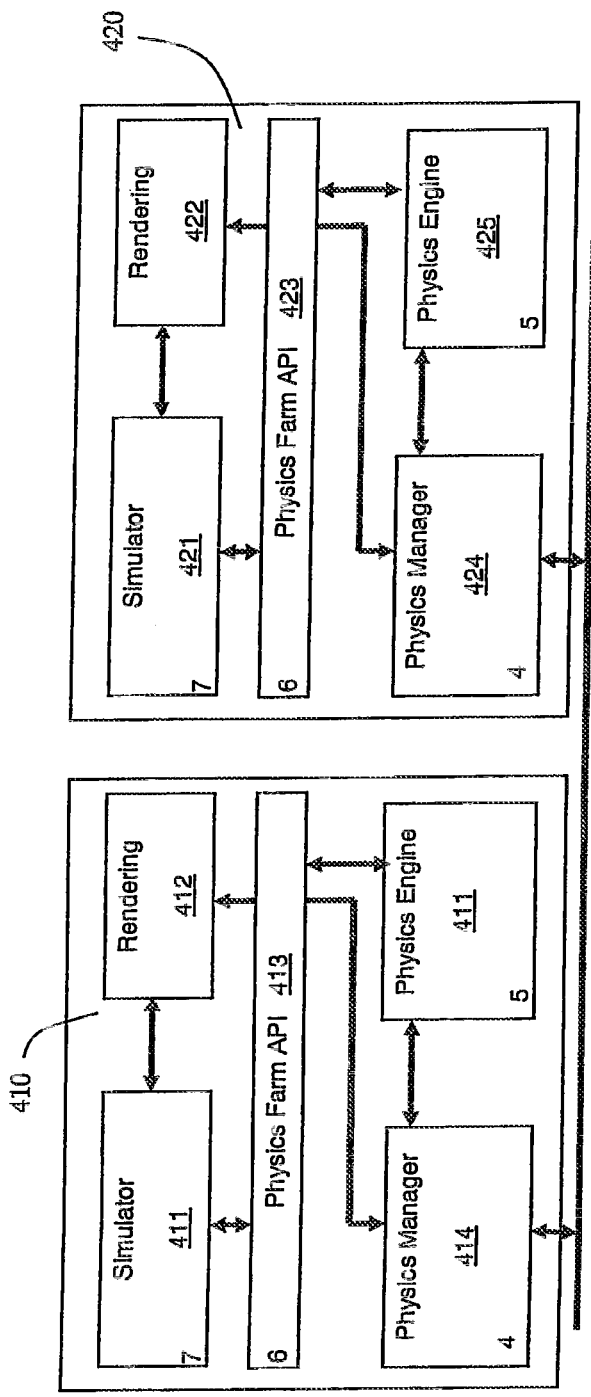

- Physics Communications Backbone is used to shared Physics Based State Data. (Forces)
- Host processors system clocks are synchronized using Network Time Protocol (NTP) standard
- Time Stamped messages with Forces communicated over Physics Communications backbone for each entity
- Physics Manager notifies remote Physics Managers of new, modified or removed entities. Collision Events generated by Physics Engine are used Physics Manager as indicators that corrective action may be required.
- Physics Manager must send new forces resulting from collision only for those created locally. Receiving Physics Managers apply correction for remote entities upon collision indicator.
- Extrapolation or Dead Reckoning no longer required since Physics Engine continuously applying forces.
- Applications used Farm to interact with Physics Environment.
- Physics Farm API encapsulated Physics Manager and Physics Engine since Engine may or may not be embedded and Physics Manager must interceptive local changes to forces when they are applied.

Physics Networking and Entity Management Approach

FIG. 19

Physics-SAF Interface Data Flow

Physics Based Simulation Proof of Concept

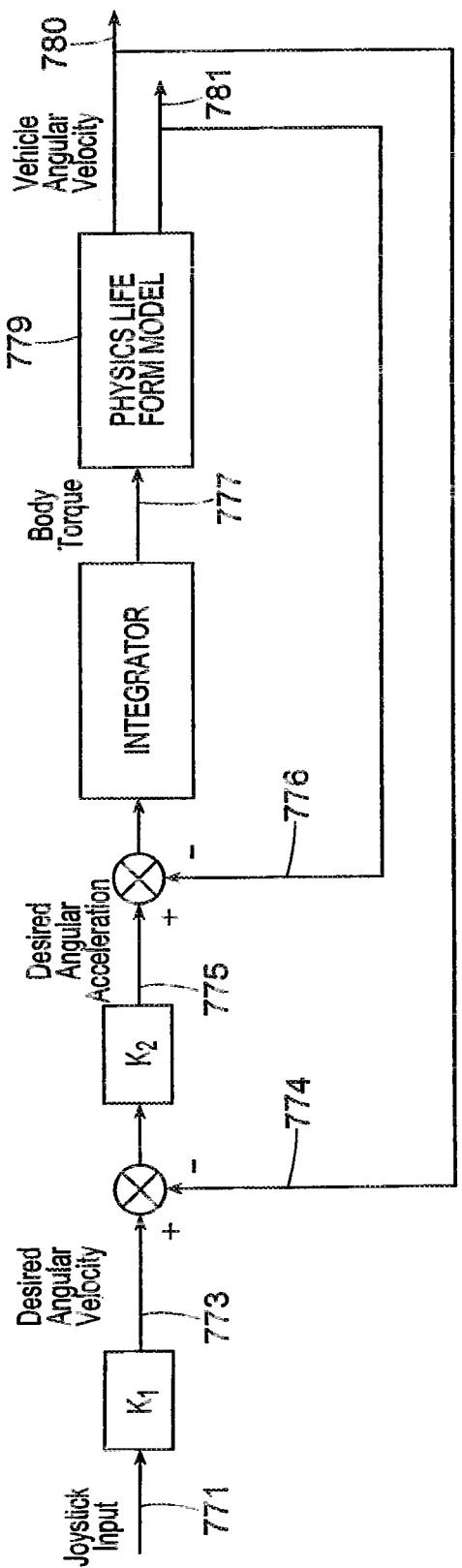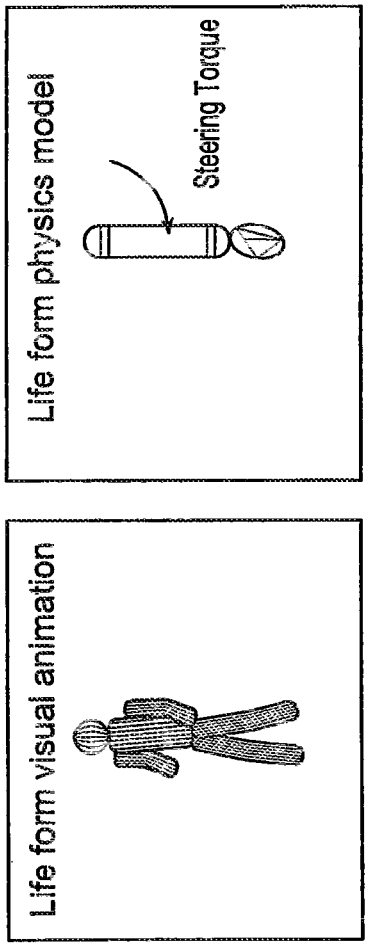
FIG. 33

DISTRIBUTED PHYSICS BASED TRAINING SYSTEM AND METHODS

RELATED APPLICATIONS

This application claims the priority of U.S. provisional application Ser. No. 60/740,579 filed Nov. 28, 2005, which is herein incorporated by reference in its entirety.

FIELD OF THE INVENTION

This invention relates to the field of simulators, and more particularly to the field of simulator systems for multiple users for training in military exercises or military vehicle operations, especially such systems for users that are geographically distributed relative to each other and connected by communications links such as a network or the Internet.

BACKGROUND OF THE INVENTION

It is known in the prior art to provide simulation systems for users distributed geographically relative to each other, potentially thousands of miles apart, with communications between the various users being transmitted over a network, such as the Internet. In these systems, each user normally has a simulation station where the user can see on a screen, a head-mounted display, or other display device, that user's view of a shared virtual environment based on his virtual position in it. The displayed scene is video prepared by an image generator at the simulation station that renders serial frames of video using changing scene data that defines the visible objects in the simulated environment in real-time. The user also can interact with and affect the virtual environment, as with simulated cockpit controls in an aircraft simulator, simulated weapons systems, or other interface mechanisms known in the art, and his interactions that change the scenery can be seen by him and all the other users.

In the armed forces, Distributed Interactive Simulations (DIS) are recognized as being essential for training, system acquisition and test and evaluation. DIS may also be employed in non-military simulation applications such as, e.g., simulations for air traffic control, airplane crash, traffic, land use, environmental, natural disaster, videogames (networked multiplayer video games) and the like. Within the U.S. Department of Defense, key components of DIS include high-fidelity computer-simulated individual entities (tanks, trucks, aircraft, etc.), interactions among entities hosted on different computers through network messages, and support for Human In Loop (HIL) interactions.

Using DIS, it is possible to create large-scale virtual representations of real operational environments that are inexpensive enough to be used repeatedly. Accordingly, a set of DIS protocols were promulgated by the IEEE in 1995 and became the basis for much of the current generation of networked simulations.

Modular Semi-Automated Forces ("ModSAF") is an example of the implementation and use of the DIS protocol in the armed forces for cost-effective training. ModSAF generally runs using a collection of workstations communicating over a network, typically a LAN. Each workstation is responsible for simulating a predetermined number of entities, or simulated objects. These computer-generated Semi-Automated Forces ("SAF") are intended to mimic realistically the behaviors of opposing forces or support forces within an exercise. The entity and environment models employed are typically quite detailed and the individual simulators can interact by exchanging data using a messaging protocol, the basic unit of which is referred to as a Protocol Data Units (PDUs). PDUs are used in ModSAF to describe the state of individual entities, weapons firing, detonations, environmental phenomena, command and control orders, etc.

In standard ModSAF, the PDUs are sent as UDP datagrams, which is an unreliable message-delivery mechanism, and therefore each entity state PDU typically contains a complete summary of the vehicle's current state. PDUs are transmitted/retransmitted at frequent, regular "heartbeat" intervals to compensate for dropped data packets. In using such a system, assurance that each simulator receives and responds to all PDUs from all other simulators is extremely difficult, if not impossible, as the number of simulators and simulated entities increases due to the avalanche of communication/network traffic that results from dynamically moving entities continually updating their state. Human-In-Loop (HIL) entities tend to complicate matters even further given their interactive and inherently unpredictable behavior.

A primary problem encountered in such distributed systems is that of latency, meaning communications delay between the transmission from a remote site of data affecting the scene and the reception and display of that data at a user's station. Latency depends on distance and the quality of the communications links, and can commonly be 200 milliseconds (a fifth of a second) or more. The consequence of latency in multi-user situations is that the actions of a remote user do not affect the scene viewed by the local user immediately, and this can result in inconsistencies in the views seen by the users in the distributed system.

To try to reduce some of the effects of latency, prior art systems have used a kinematics approach in which, when information relating to position and movement of a virtual object is received, it is checked for a time-stamp indicative of when precisely in system-time the data was produced. The movement of the affected object is then simply linearly projected or extrapolated to an estimate of its current position, based on its position and velocity defined by the most recent data available, together with a $\Delta t$ of the time-stamp from the current time, indicating the age of the data in system-time terms.

Linear projections of this type do not accurately extrapolate the real position of objects under a number of circumstances, and in addition to the positional errors associated with a pure linear projection of the location of the object, it is also possible that behavior of the object will be unrealistic if it is projected to a point that it could not reach in reality, such as, for example, when the position of a moving person or vehicle is extrapolated to the other side of a solid wall, making it appear that the person or vehicle actually went through the wall.

Furthermore, especially in military simulation-based training, discrepancies between various users' views of the simulated world can compromise principles of training, notably "fair fight" requirements. "Fair Fight" is a term that means no combatant has an unfair advantage over another due to differences in each participant's representation of the world. Differences in the viewed scenery of the participants can afford such an advantage to one user or another.

In addition, simulators for vehicles, especially aircraft, are usually modeled to run scripts when certain events occur to the user's ownship, such as when damage is done to the vehicle in combat. As an example, in a helicopter simulation, if a blade of the helicopter is shot at and it breaks off, the simulator normally initiates a damaged-vehicle script that is usually limited to a single type of damage scenario, and does not provide the realism of allowing a wide variety of effects for the various types of damage that may be done to the aircraft. These limitations reduce realism and also lessen to a degree the training value of the simulation.

SUMMARY OF THE INVENTION

It is accordingly an object of the invention to provide systems and methods that avoids the drawbacks of the prior art.

In one aspect of the invention, this is achieved by a simulation station for use in a simulation system having a plurality of users each associated with a respective simulation station. The simulation station comprises a link to a communication network to which all simulation stations are linked, and computer accessible data storage storing scene data. The scene data includes object data defining a plurality of virtual objects in a virtual environment. The object data includes for each of the objects location data defining a location of the object in the virtual environment and data defining characteristics of the virtual object affecting its appearance. An image generator periodically renders from the scene data a frame of video imagery corresponding to a view of the virtual environment from a position associated with the user of the simulation station so that the user is provided with a real time view of the virtual environment. A display receives the video imagery and displays the imagery so as to be viewable by the associated user. A physics engine manages the virtual objects in the scene data by determining physics data for a subset of the virtual objects in the scene based on data defining physical attributes of the objects and the locations thereof, and receiving, via the link, physics data regarding other of the virtual objects in the scene data. The physics engine influences the scene data so that the location data of the virtual objects as defined in the scene data complies with physical rules governing, based at least in part on the physical attribute data, the movement of the object in the virtual environment.

According to another aspect of the invention, a system is provided for giving a shared simulated environment to a plurality of users each having a respective user location in said simulated environment. The system comprises a plurality of simulator stations each associated with a respective user and linked over a network so as to communicate with each other. The simulator stations each include a data storage system storing scene data thereon and a computerized image generator generating real-time video as a stream of images each rendered based on the scene data corresponding to a respective point in time. The video is displayed to one of the users associated with the simulator station using a display communicating with the image generator. The scene data includes object data defining a position and physical attributes of virtual objects in the shared simulated environment. A physics farm is connected with the simulator stations, and it interfaces with the scene data of each of the simulator stations and controls position data of virtual objects of the scene data based on the defined physical attributes of the virtual objects and on physical rules that cause the virtual objects to emulate real movement of objects having corresponding real physical attributes. The physics farm comprises a plurality of physics engines operatively connected with the network so as to communicate with each other, each having at least one of the physics engines at its location, and a physics manager assigning each of the virtual objects in the shared simulated environment to one of the physics engines. Each of the physics engines determines if any of the virtual objects assigned thereto are in a physical conflict with any other objects in the simulated environment. Responsive to such a determination, each physics engine attempts to resolve the conflict of the objects locally, without reference to the other physics engines. If not resolved locally by the physics engine, the conflict outcome for the virtual objects in the conflict is determined by the physics engines assigned the virtual objects involved, and the conflict outcome is communicated by transmitting a packet of data identifying the virtual object involved and including conflict data corresponding to the conflict over the network, from which packet of data the position or positions of the virtual objects involved after the conflict can be determined.

According to a further aspect of the invention a method for providing an interactive simulation of an environment to a plurality of users comprises providing each of the users with a respective simulator station having a display displaying to the associated user video rendered by a computerized image generator from scene data stored in a computer accessible data storage system. An input signal indicative of an interactive command from the user for influencing the simulated environment is received from one of the users at the respective simulator station. Data from the input signal defining the interactive command is derived as a force applied to one or more virtual objects in the simulated environment. Physics processing of the force or torque on the object or objects is performed using a distributed physics farm comprising a plurality of physics engines. At least one of the physics engines is operatively associated with the respective simulator station. Physics notification data on the object and a system time thereof is published to all of the physics engines in the physics farm. The physics notification data is received at a second of the physics engines operatively associated with another of the simulation stations. Physics processing of the notification data of the object is performed at the second of the physics engines. The second physics engine computes a position of the object based on the physics notification data and a difference between the system time thereof and a current system time. The second physics engine accesses locally data defining the positions of other objects in the simulated environment, and the determination of the computed position includes a conflict check that incorporates into the computation any conflict with other objects in the simulated environment. The scene data at the associated simulation station is modified such that the scene data reflects an updated position of the object conforming to the computed position. The scene data is rendered to produce imagery showing the object at the computed position, and the imagery is displayed to the user of the second simulation station.

According to another aspect of the invention, a simulation system comprises a physics farm communications layer comprising a communications backbone and a physics farm layer. The physics farm layer has a plurality of distributed physics engines each communicatively linked to the physics farm communications layer so as to transmit data to the other physics engines and to receive data therefrom. Each physics engine stores physical attribute and location data for all of objects in a virtual environment. A physics farm management system selects the physics engine that performs physics processing for each object in the virtual environment, and a physics-based simulation API communicates with the physics farm management system to allow access thereto by applications. A physics based simulation application layer comprising at least two distributed simulation stations provides interactive simulation to respective users, including displaying to the respective user imagery rendered from scene data stored at the simulation system. The scene data is modified by the physics farm layer to reflect interaction of the users with the objects in the virtual environment.

According to still a further aspect of the invention, a method of providing distributed simulation of a plurality of vehicles comprises providing a plurality of simulation stations each having simulated controls for a respective vehicle being simulated, a display, a storage medium storing scene data defining positions of virtual objects in a virtual environment, and a physics engine. The physics engine stores physics data for objects in the virtual environment, and the objects include an ownship set of objects configured to correspond to the vehicles being simulated. Physics processing of the ownship set of objects for the simulation station is performed using the physics engine of each simulation station, and the resulting physics data is transmitted to the other simulation station or stations. The physics data is received at the other simulation station or stations and the scene data thereof is modified based on the physics data so that the other user or users can see the other station's ownship if appropriate to said user's point of view. The physics data for each ownship is used to control the simulated behavior of the ownship of said simulation station.

It is also an object of the invention to provide a simulation system comprising a plurality of computerized simulation stations connected with each other via a network. Each simulation station has a respective computer-accessible data storage storing a respective version of scene data corresponding to a virtual environment, a respective computerized image generator generating serial frames, each of which is a rendered view for a respective point of view in the virtual environment defined by the respective version of the scene data stored, and a display device displaying said frames. The system further comprises a simulation computer system determining behavior of a virtual client entity in the virtual environment and transmitting client movement data via the network to the simulation stations. This client movement data corresponds to the determined behavior, and it defines at least one location in the virtual environment to which the client entity is to move, as well as time-constraint data indicative of a point in time by which the entity is to move to the location. Each simulation station has a synchronizer that receives the client movement data and, based thereon, causes the virtual object of the client entity in the scene data of the simulation station to be modified so as to reflect movement of the client entity to the location by the point in time by which the entity is to move to the location.

Also, according to the invention, a method is described that provides an interactive simulation of a virtual environment to a user at a simulator station. The method comprises storing physics data on a computer accessible memory coupled with a physics engine. The physics data defines physics parameters of a plurality of virtual objects in a virtual scene, and includes position data reflecting respective positions of the virtual objects in the virtual scene. The physics engine is passed data identifying at least one of the virtual objects and defining a value of force or torque, the physics engine modifies the physics data in the memory so that the position data of the virtual object in the memory reflects a modified position that corresponds to a result in the virtual environment of the force or torque acting on the virtual object pursuant to physics rules of said physics engine. The modified position data is obtained and stored said so as to be accessible to a computerized viewer. An image is rendered corresponding to a view of the virtual scene using the computerized viewer, and the view includes a view of at least a portion of the virtual object in the modified position.

According to another aspect of the invention, a system is provided for providing distributed simulations to one or more users. The system comprises a first computer system linked for communication over a network and having a data storage device storing data and a display. The data storage device stores data defining a virtual scene having a number of virtual objects therein each having a respective visual appearance, position and orientation defined by the data, the computer system includes a viewer generating real time imagery from the data and displaying the imagery on the display, the imagery corresponding to a rendered view at the time the image was rendered of the virtual scene as defined by the data. A second computer system has a data storage device, the data storage device storing data defining the same virtual scene with the same virtual objects as defined by the data on the first computer system. The second computer system executes a program determining movement of a controlled virtual object in the virtual scene. The second computer system further has a master synchronizer transmitting over the network route data for the controlled virtual object indicative of a point in the virtual scene and a future point in time by which the controlled virtual object is directed to reach the point. The first computer system has a slave synchronizer receiving the route data, and responsive thereto, causes the data stored therewith to be modified so that in the data stored at the first computer system, the controlled virtual object moves to the point in the virtual scene by the point in time.

Other objects and advantages of the invention will become apparent from this specification, and the scope of the invention will be set out in the claims.

BRIEF DESCRIPTION OF THE DRAWINGS

FIG. 9 is a diagram illustrating the processing of physics data to produce desired displays at two distributed simulators;

FIG. 10 is an event trace of an exemplary collision in a system according to the invention;

FIG. 11 shows diagrammatically examples of data message formats for physics data transmitted between the physics engines;

FIG. 19 is a diagram of physics networking and entity management in the system;

FIG. 33 is a schematic diagram of the heading control loop for a life form in simulation.

DETAILED DESCRIPTION

Figure 1:
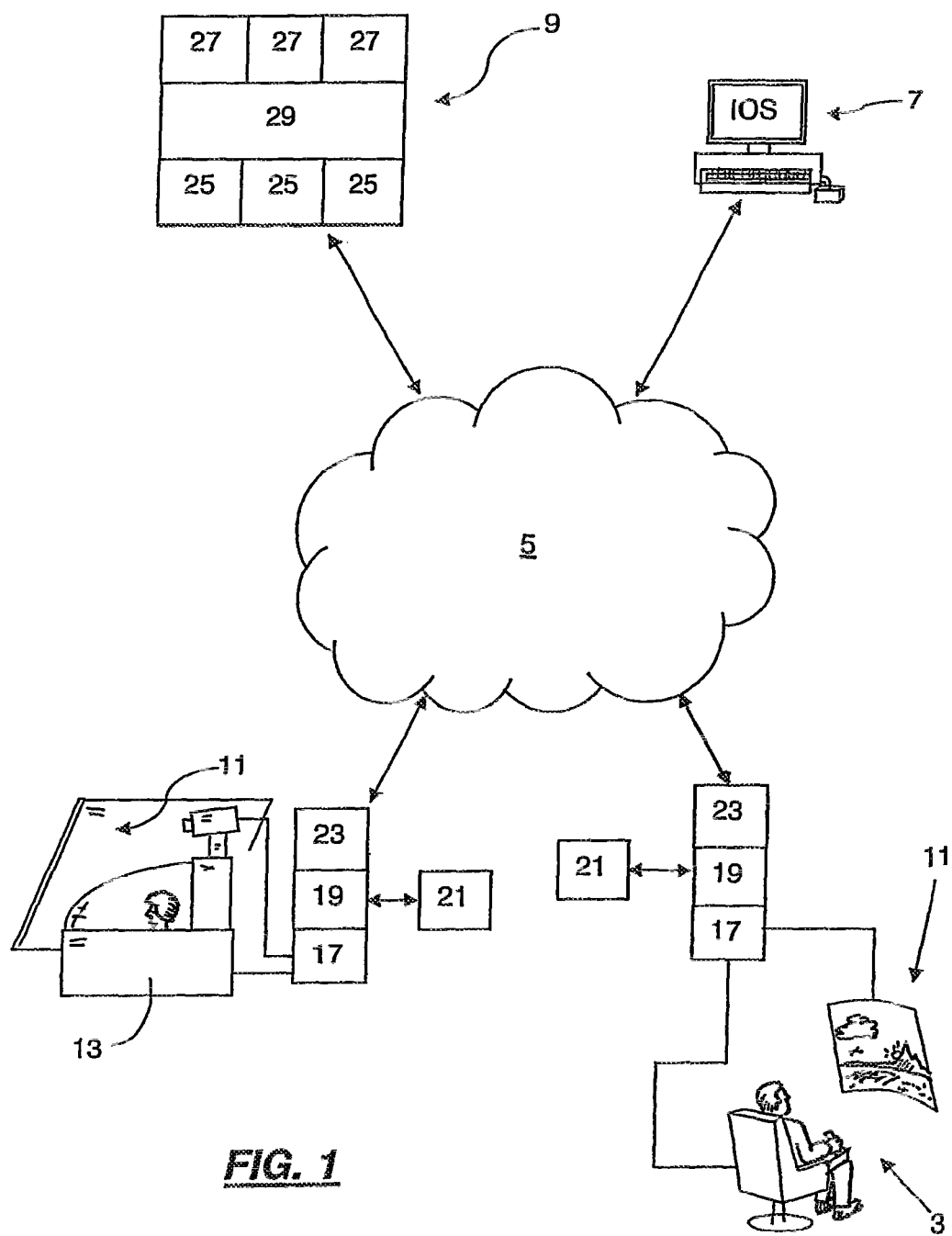
FIG. 1 is a schematic diagram of an embodiment of a distributed simulation system according to the invention.

As best shown in FIG. 1, a simulation system according to a preferred embodiment of the invention has a number of simulation stations 3 each linked to a network 5, either a LAN or the Internet. Instructor station 7 is also linked to the network 5, as is an auxiliary client computer system 9, the operation of which will be discussed below.

Each simulation station is a computerized system that supports an interactive involvement of a respective user. The simulator stations 3 each include a display device 11 of some sort, ranging from a projection sphere to a head mounted display. The simulation stations also include an interactive device that allows a user to input data to the simulator, and where a vehicle is being simulated, this usually takes the form of a simulated cockpit or driver's seat 13 that inputs data but is also controlled by the simulator computer system 15 to afford realism to the simulation, as with functioning gauges and indicators on the control panel of the vehicle. The simulator includes a computer system 15 that manages the operation of the interaction with the user, as is well known in the art.

In addition, the simulator station 3 includes a computerized image generator 19 that accesses scene data stored on a data storage system 21. The scene data stored includes data defining effectively every visible virtual object in a virtual "world" or environment in which the simulation takes place. This scene data includes all information needed to determine the appearance of the objects in the virtual world, including the location, shape, size, orientation, color, texture, and any other visible characteristics that the object may have. Image generator 19 generates video imagery from the scene data by rendering views of the scene data for the point of view of the user from the user's virtual location in the virtual world.

The scene data, of course, can change as objects move in the virtual world, although at start-up of the system, all simulator stations 3 have the same scene data in their mass data storage 21, because they all are in the same world.

Simulator stations 3 also have a physics engine component 23 that communicates with the network or Internet 5. This physics engine component 23 includes at its heart one or more physics engines, which are preferably physics processor units (PPUs), which are dedicated hardware devices with supporting circuitry that can process large amounts of data defining physical parameters of virtual objects in a simulated three dimensional environment world, and determine interactions for those objects expressed as forces, accelerations, position, velocity and various constraints on an objects movement due to contacts with other objects in the simulated world.

Particularly preferred for use in the physics engines are those based on the physics processors sold under the names PhysX or NovodeX by a company named Ageia, having a place of business at 82 Pioneer Way, Suite 118, Mountain View, Calif. 94041. Other dedicated-hardware physics processor systems may also be used advantageously with the invention. At present the computational power of any software system is so far below that of the dedicated hardware physics engines, which can process on the order of thousands of times more objects, that a software system, in terms of present technology at least, would have at best a very limited utility.

The physics engine component 23 also includes a memory system, preferably a RAM memory, that stores physics environment data defining the physical attributes of the virtual objects in the virtual environment, including a detailed model of the ownship vehicle in a vehicle simulator, expressed as an assembly of constituent virtual parts. Each object or entity has physical attribute data and location data stored in this memory, including data indicating the geometry of the entity, its mass, its center of gravity, its inertia, its orientation, its density, and any joints or contacts that may connect it with any other objects. The physical attributes are used by the physics engine to determine movement of the virtual objects based on physical rules of the physics engine, which emulate the physical laws of the real world.

The physics engine component 23 preferably includes a physics manager as well, which controls which physics engine does the physics calculations for any specific object. For example, the objects making up the ownship of the simulator are normally assigned to the physics engine of that simulator, because changes in the physical data are especially important to that particular simulator, and latency in reporting movement in those parts is very undesirable.

Objects in the virtual world that are near the virtual position of the user in the simulation system, such as a building next to which a helicopter simulated by the simulation station is landing, are also preferably processed at the simulator station physics engine, because their closeness makes latency and the resulting inaccuracies in display more undesirable. On the other hand, objects making up a distant building that has little if any effect on the user's view are appropriately processed in a different physics engine, because latency does not have a significant negative effect on the user's view. One exception to this is that if a weapon subsystem is being simulated, a distant object is processed by the local physics engine if the object is being targeted, as the object though distant is critical to the user's view.

The collection of all of the physics engines connected with the network 5 and their managers is referred to as a "physics farm" as it is a distributed system the parts of which cooperate to share the physics data and computational workload for the simulation.

In operation, each physics engine only acts in response to a force applied to an object for which it is responsible. When that happens, if the object is subjected to enough force to cause it to move, the physics engine will calculate its movement and change the local scene data accordingly. It will also broadcast over the network 5 to all other simulator stations 3 or physics engines in the system a message indicating the amount, location and time of the force applied to the object. Those other stations 3 will then receive the message and update their own copy of the world's physics data by applying the physical rules to this data message, with other local processing as will be discussed below to compensate for latency in the transmission.

If the force moves the object so that it contacts another object, then the physics engine resolves the collision to determine where the two objects wind up when it is over. In addition, a slightly different collision message of data is sent out identifying the two objects that collided. The other physics engine that is responsible for the other object contacted also will issue a collision report. The scene data is updated by each physics engine to reflect the end position of the two objects pursuant to the physics engine rules.

Referring again to FIG. 1, in addition to the simulation stations 3, additional physics engines 25 can be provided in a computerized system 9 also connected with the network. These physics engines can assist in computation for the simulation stations 3, but can also provide for physics processing of other objects moved in the virtual world by something other than the users, such as by applications 27 that access the physics engines 25 through physics-based simulation API 29. Examples of such applications are computerized processes that provide an environmental influence, such as a hurricane-force wind, which produces force on a number of objects; and intelligent behavior or SAF modeling, which provides for movements of computer-controlled forces that operate essentially on their own independently of the users or in reaction to events in the simulation, for example, as enemy forces, support forces, or something else in the simulation.

Administrator or instructor IOS stations is a computer system that can access any physics data in the system to set up a desired training scenario, as will be discussed below in greater detail.

Figure 2:
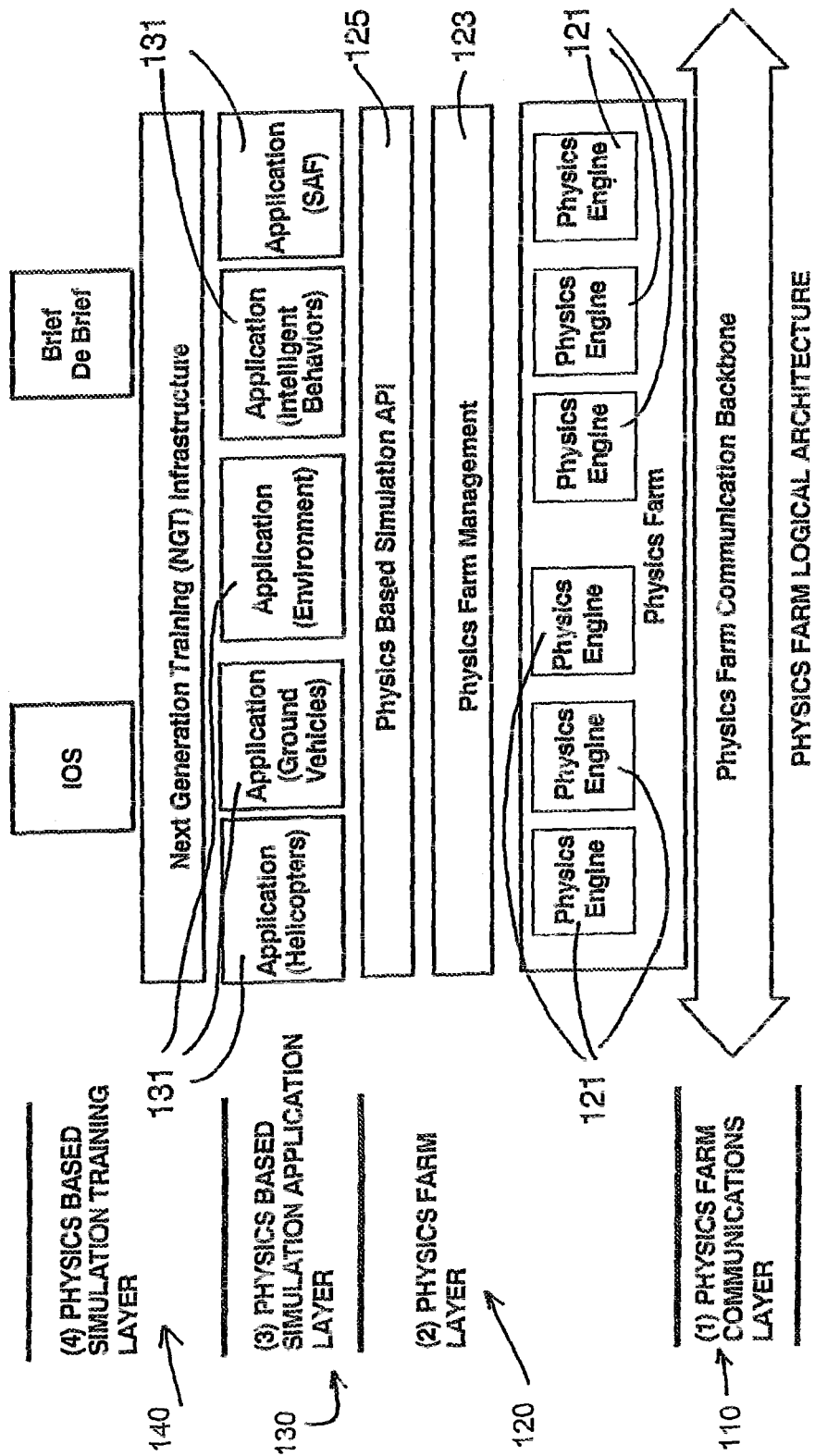
FIG. 2 is a schematic diagram of physics farm logical architecture according to the invention.

FIG. 2 illustrates a general system approach for the logical architecture of a physics-based simulation in accordance with one preferred embodiment. The infrastructure is optimized for synchronization and time delays by providing an optimized network and service layers. This infrastructure includes software management services, physics based APIs and network protocol that is unique to physics based distributed simulation. In this embodiment, the logical architecture is broken down into four primary layers 110, 120, 130, and 140.

The physics farm communications layer 110 is used to communicate and exchange data between the participating physics engines 121, all of which are linked via the communications backbone network to receive and transmit data to and from the other physics engines 121 in the system.

The physics farm layer 120 enables a physics-based simulation to be performed in a distributed environment. The physics farm manager 123 dynamically assigns objects in the simulated environment to one of the physics engines 121 for physics processing, as discussed elsewhere herein. The physics based simulator API interfaces the physics farm data with the other software applications components of the simulation system.

The physics-based simulation application layer 130 is comprised of the one or more applications, or simulation components/entities, participating in the distributed physics based simulation; e.g., typical components/entities might include one or more helicopter, aircraft or ground vehicle simulation stations, computer models that control ground or life form behaviors, managing environment objects, occulting or line-of-sight results, SAF behaviors, or similar modeled functionalities executed on connected computer systems that influence the virtual world of the simulation.

The physics-based simulation training layer 140 enables the introduction of training artifacts typically employed in a training environment into a physics-based simulation. The physics-based simulation training layer is desirable but not strictly necessary to an operating distributed simulation system, and is an alternate embodiment for systems where closely supervised or very flexible training is desired. In another embodiment the physics-based simulation training layer is replaced with a layer that performs the specific system-wide administrative functions required by the particular purpose of the system, such as, in a multiplayer video game environment, layer 140 can process overall management of player accounts, statistics, etc.

The physics farm communications layer 110 provides the communications backbone for the physics-based simulations contemplated by the present invention. Physics-based simulations introduce actions and reactions that can be highly sensitive to time and latency issues that have not been adequately addressed by previous approaches using Distributed Interactive Simulation (DIS) protocol or High Level Architecture (HLA) based systems.

In one aspect of the invention, timing and latency issues are reduced or eliminated by determining the resulting positions, velocities and accelerations when two objects collide using the physics engines, instead of using the applications themselves to represent the colliding objects, as in traditional simulations.

One approach used by current distributed simulation training systems is to incorporate threshold techniques to minimize network traffic; i.e., applications responsible for their own objects won't send data reflecting current positions, velocities and accelerations until some predetermined position, orientation or time delta has exceeded a specified threshold.

Such threshold techniques disadvantageously require the local or receiving application/simulation to extrapolate position and orientation over time, i.e., in the period of time that new data has not yet been received from the remote application/simulation. The result of implementing such threshold techniques is that the same object may be in a different position and/or orientation in one simulator than it is in another participating simulation. The physics based outcome of a collision may produce different results in different distributed participating simulations. Because time and latency may also present issues in the physics-based simulations creating potential inconsistencies, new methods employed by certain preferred embodiments of the present invention are used to resolve conflicts and maintain consistency.

In one aspect of the invention, latency is minimized and communications bandwidth is maximized using the physics farm communications layer 110. Preferably, the physics farm communications backbone 111 is a high bandwidth network that is highly optimized to the protocols used by participating physics engines. In one preferred embodiment, data is packaged, prioritized and shared between physics engines in order to provide realistic and consistent results. According to another aspect of the invention, the physics farm layer 120 is used to obtain realistic and consistent results.

The physics farm layer 120 is a collection of capabilities/sub-layers including, preferably: the physics farm application programming interface (API) layer 125; the physics farm management layer 123; and the physics engines 121 (referred to interchangeably throughout as "the physics farm") participating in a physics-based simulation. The individual physics engines 121 managed by the physics farm management application 123 are preferably treated as a pooled resource where some physics engines may be loosely coupled and others may be tightly coupled (i.e., embedded within a simulation application).

The capabilities of the physics farm layer 120 are preferably distributed with data exchanged via the physics farm communications layer, or backbone. The physics engines are preferably instances of the physics algorithms used to model the physics environment, deployed in either dedicated hardware (e.g., physics processor unit, or PPU) or one or more software routines. Physics-based objects (i.e., objects for which physics based computations are required to allow the object to interact within the distributed simulation) are registered, or instantiated, with the responsible physics engine. Physics-based results are then preferably produced based on the objects' attributes, such as position, velocity, mass, dimensions, and the like.

Physics farm management is responsible for coordinating and managing the activity between participating physics engines. According to one aspect, the physics farm management layer preferably arbitrates/manages/coordinates which physics engine will be responsible for modeling a specific object or request. The physics farm management layer 123 preferably balances network/computational load(s) and resolves conflicts in order to maintain consistency throughout the distributed simulation.

The physics farm management capabilities preferably reside with each instance of a physics engine, whether loosely or tightly coupled, and will use the physics farm communication backbone to exchange or share data. Preferably, each simulation application employs logic allowing the simulation applications to access the physics farm capabilities using the physics farm API to make requests for services to be performed or to implement callback routines to receive results or updates to the distributed simulation state.

Advantageously, the physics farm API provides applications with an interface to the physics engines as well as the physics based simulation environment. In addition, the physics farm API hides the details and nuances involved with distributing and balancing the load across the participating and distributed physics engines.

Figure 3:
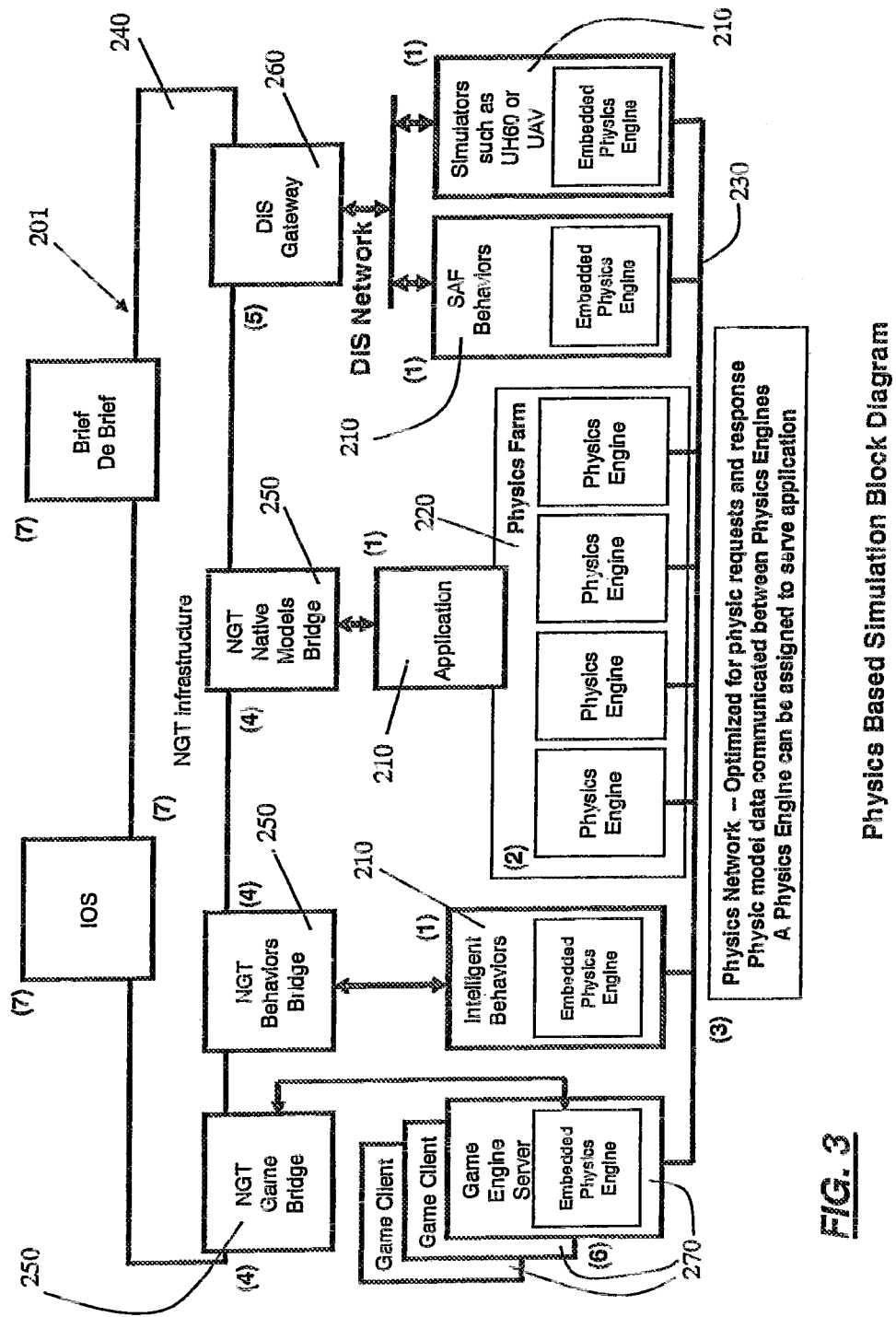
FIG. 3 is a more detailed schematic diagram of the physics based system of the invention.

In accordance with yet another aspect of the invention, the physics-based simulation application layer 130 implements the simulation application logic. Preferably, the logical architecture is designed such that any application logic can reside in the physics-based simulation application layer (FIG. 3 illustrates some representative simulation applications). Preferably, those simulation applications requiring or desiring physics-based simulation use the physics farm API to create, delete, modify and obtain results of actions to be performed by specified objects. Actions can include instruction to move to specific location, instructions to apply a force or acceleration, and the like. Similarly, actions can include instructions to trigger a model to perform an abstract operation, such as to detonate or explode, injecting an impulse force into the physics based simulation. Preferably, any combination or sequence of actions can be utilized.

Where instructor involvement in the training is provided, the physics based simulation training layer 140 can be employed to allow the introduction of training artifacts into the physics-based simulation training environment. This layer 140 may be referred to interchangeably herein as the Next Generation Training (NGT) infrastructure. Preferably, NGT supports a distributed training environment based on commercial web based technologies such as, e.g., XML, Java, Web Services, and the like.

The physics-based simulation training layer 140 may include components for instructor operator services (IOS), brief/debrief, exercise and resource management capabilities, or the like. The functions of the IOS can include: exercise planning, objectives, performance measures, initialization, monitoring, controlling the progression, After Action Review (AAR) of the exercise, etc. For example, the brief/de-brief capabilities may be utilized by the IOS to brief the training audience prior to the start of an exercise and de-brief the training audience on the outcome of the exercise.

In a particularly preferred embodiment, the IOS is an instructor station with a data entry interface and a display. From the IOS station, an instructor can access physics based attributes of objects to initialize or modify the attributes of one or more aspects/objects of the physics model during the exercise. Advantageously, using a physics-based approach in accordance with one aspect of the invention provides a more flexible and simpler approach to insertion of malfunctions and control of the distributed simulation. For example, an instructor can access through the IOS station the physical attributes a support for an engine of a vehicle to cause it to break, creating a custom-designed training scenario.

FIG. 3 further illustrates a physics-based simulation block diagram 201 in accordance with the present invention, and the interconnection of certain components of a physics-based simulation training system in accordance with one preferred embodiment.

Simulation applications 210 can generally have two connections, one connection to the physics farm 220 through the physics farm communications backbone 230 and another connection to the NGT infrastructure 240. The connection to the NGT infrastructure can be achieved by using an application bridge 250, where the purpose of the bridge would be to preferably translate application specific representations/data structures to a common NGT representation/data structure.

Additionally, gateways 260 are employed to convert between disparate protocols and data structures; e.g., DIS to HLA, NGT to DIS, to accommodate distributed simulations that may include legacy systems/networks. Also the incorporation of commercial game engines 270 is shown, these engines having embedded (i.e., tightly coupled) physics engines, into the distributed physics-based simulation.

In FIG. 3, the game engine server component is connected to the physics farm communications backbone 230 and the individual game clients are connected to the game engine server (most present day multiplayer gaming systems employ a client-server network architecture). As discussed in more detail below, the physics farm communications backbone is preferably optimized for physics-based requests and callbacks facilitating communication of physics model/state data between physics engines. Additionally, one or more physics engines in the physics farm can be assigned responsibility of performing physics-based computing/processing for applications 210 lacking their own physics engine.

The computer architecture of the simulation stations 3 is schematically illustrated in FIG. 19. FIG. 19 shows the physics networking and entity management approach employed in a preferred embodiment of the present invention. The physics engine utilized in computing the remote entity's state can either be a locally embedded, tightly integrated physics engine or a loosely coupled physics engine that is allocated to the physics farm and managed by the physics farm manager. In FIG. 19, two simulation applications 410, 420, e.g., simulation stations 3, participate in a distributed interactive simulation by communicating across the physics communication backbone 400. The physics communications backbone 400 is used to communicate or share physics-based state data (e.g., forces, accelerations, orientations, collisions, position, etc.) between physics-based simulation applications 410, 420. This backbone 400 may be a communications protocol system using the network 5 that allows communications between the physics engines.

In the preferred embodiment, host processors' system clocks are synchronized using, e.g., the standard network time protocol (NTP), and time-stamped physics-based state data is preferably communicated over the physics communications backbone 400 for each physics-based entity.

Figure 20:
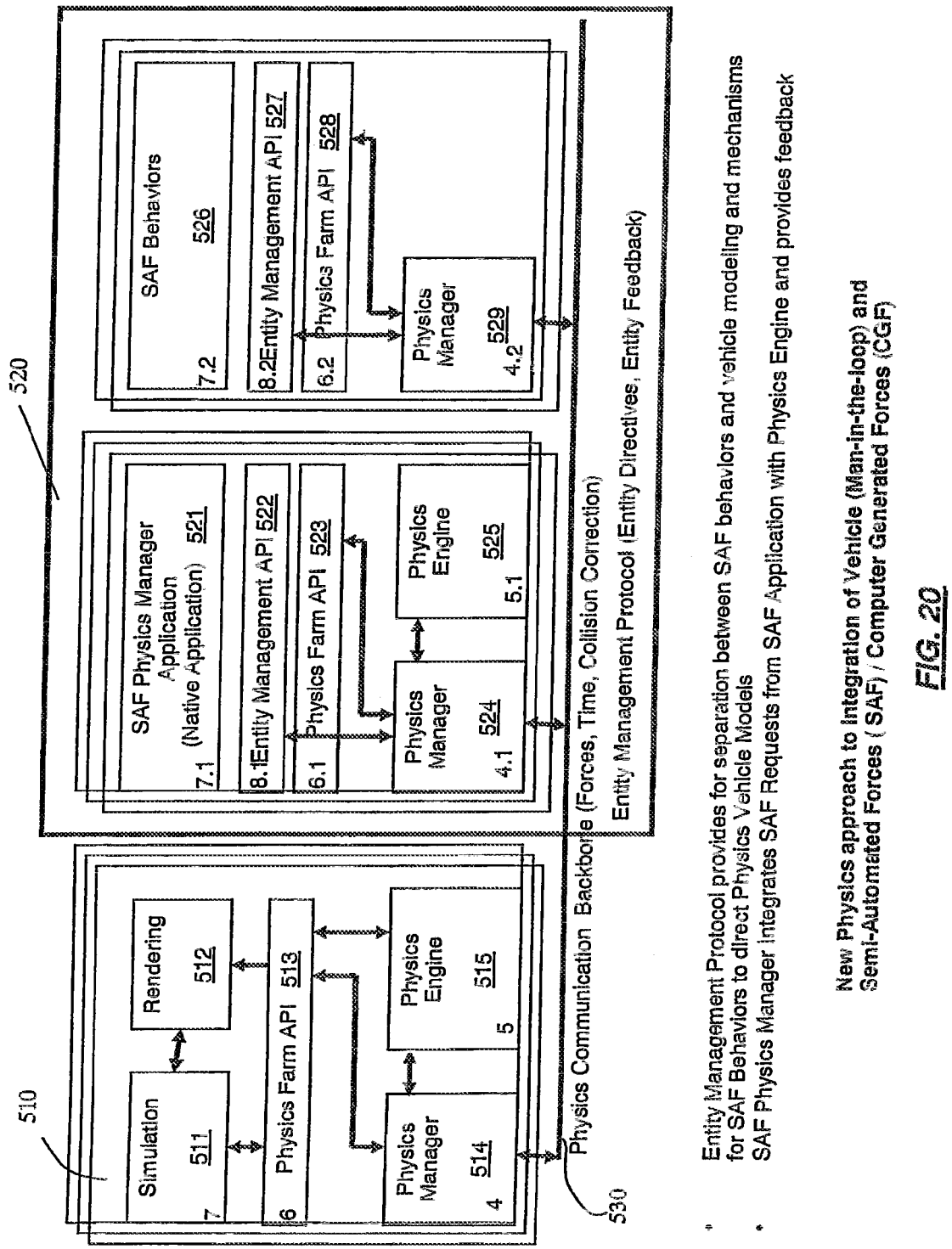
FIG. 20 is a diagram of the physics based system operation for integration of a vehicle simulator with Semi-Automated Forces (SAF) or Computer Generated Forces (CGF)

Each simulation application preferably includes a local physics farm API interface 413 and a physics manager 414. In certain simulation applications, the physics engine may be embedded (as depicted in the simulation applications 410, 420). However, as shown in FIG. 20 and discussed in greater detail below, the simulation application may include only a physics farm API and physics manager. In such an application, without an embedded physics engine, the application can use the physics farm to interact with the physics-based environment. Specifically, the physics manager can request, and be allocated, the services of one or more of the physics engines in the physics farm. In light of the fact that the physics engine may or may not be embedded, the physics farm API is preferably configured to encapsulate both the physics manager and the physics engine since the physics manager should be capable of intercepting local changes to forces when they are applied.

As depicted in the illustrative example of FIG. 19, the local physics manager, e.g., 414, notifies the remote physics manager, e.g., 424, of any new, modified, removed or deleted entities, and vice versa. If a collision event is generated by the physics engine, the physics manager uses the collision event as an indicator that corrective action may be required. If a collision event occurs for the local entity, the local physics manager preferably sends only those new forces resulting from the collision event. Upon receipt of a collision indicator, the receiving physics manager(s) preferably apply any needed corrections for the notifying remote entity. Through use of the physics-based approach illustrated in FIG. 19, extrapolation by dead reckoning is no longer necessary since the physics engine(s) are continuously applying forces acting upon remote entities.

Figure 4:
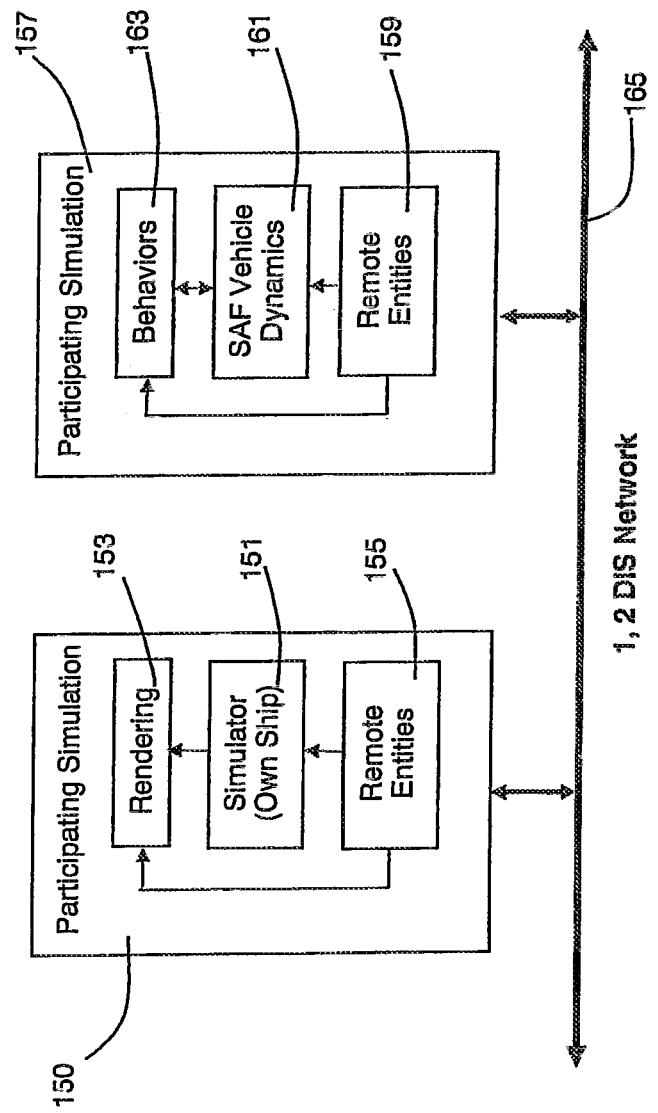
FIG. 4 is a diagram of a DIS network processing theory.
Figure 5:
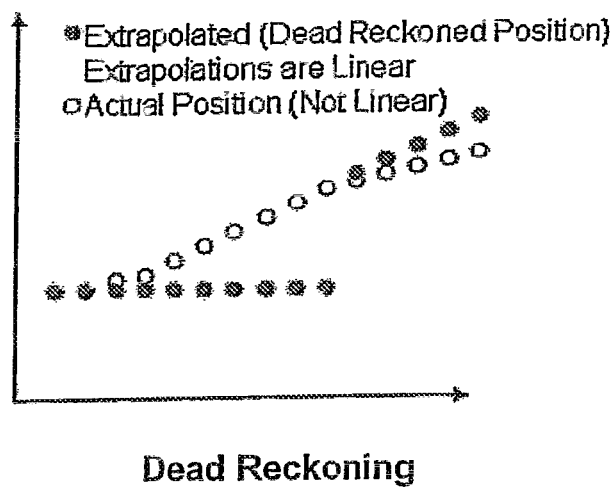
FIG. 5 is a graph illustrating the possible erroneous results of dead reckoning.

The problems of "dead reckoning" extrapolation, which has been used in past distributed systems to try to compensate for latency in the network are explained in FIGS. 4 and 5. In FIG. 4, the current approach of military simulations employing DIS protocols is illustrated. The participating simulation 150 depicts a high fidelity, dedicated simulator 151, e.g., helicopter, and includes a rendering engine 153, and an engine to incorporate remote entities 155. Another participating simulation 157 depicts an SAF application embodying a behaviors engine 159, a vehicle dynamics engine 122 and an engine to incorporate remote entities 163. The SAF application is a program that that models a vehicle or other entity, such as a military unit, that moves on its own. Each participating simulation 150,157, etc. publishes or communicates its entity (i.e., virtual object) state (e.g., position, orientation, linear velocity, linear acceleration, angular velocity, etc.) across the DIS network 165.

Each participating simulation 150, 157, etc., locally computes the position and orientation of the entity states of remote participating simulations until the next entity state update from the remote entity is received. The remote entity's state is computed locally using the remote entity engine 155, 159 by performing linear extrapolation, known in the art as "dead reckoning".

The basic idea underlying the use of dead reckoning algorithms is that rather than each and every entity sending frequent state updates, each entity's remote entity engine 155, 159 estimates the location of the remote entities based on their last reported entity states. A dead reckoning algorithm is typically specified for each entity and each entity publishes its entire entity state only when its actual state differs from that predicted by the dead reckoning algorithm by some delta, i.e., a threshold value is exceeded. As a result, participating simulations render imagery displayed to their respective users based on the dead reckoned remote data for remote entities while using actual data for controlling "ownship"/SAF vehicle dynamics 151, 161. Moreover, the SAF vehicle dynamics used in present day military simulations employ simplified kinematics models.

Figure 6:
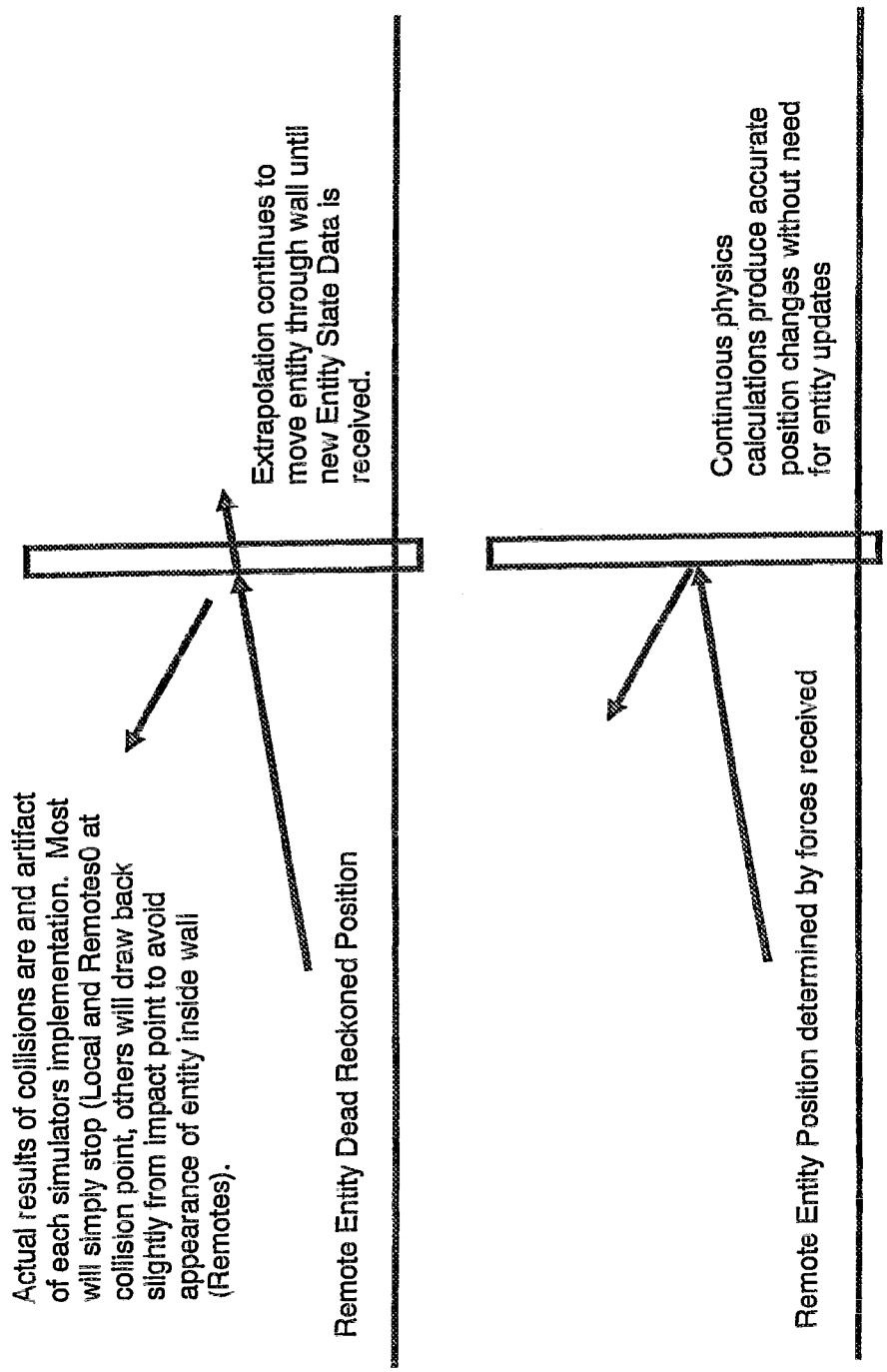
FIG. 6 are comparative diagrams showing how the prior art extrapolation methods allowed for extrapolation through solid objects, while the physics approach of the invention does not.

As can be seen in FIG. 5, the use of dead reckoning algorithms, i.e., linear extrapolation, can result in inconsistencies between local and remote entities in representing the state of the simulation. This results from the fact that the actual position of a remote entity is typically not linear. As best shown in FIG. 6, another problem is encountered in the dead reckoning method. Simply put, the linear dead-reckoning extrapolation can extrapolate the object to a location that it could not reach in reality, such as the far side of a wall or other barrier.

The physics-based approach according to the present invention does not use dead reckoning algorithms but instead specifies that each simulation application locally compute the entity state of physics-based remote entities using a physics engine. The physics information for the moving object is received by the physics engine of the relevant simulator station 3, and the movement of the object under the effect of the defined forces is projected, taking into account the possible obstruction caused by other objects in the scene. This prevents any extrapolation "through" another object. The physics engine will determine the interaction of the objects and process the collision as an event, but the object will not be extrapolated to an impossible location.

Physics-based modeling readily provides for the detection of, and the computation of, resulting forces due to, collision events. Since, as discussed above, dead reckoning is not used by the physics-based approach of the present invention, but instead simulation applications locally compute the state of each remote physics-based entity, collision events can be readily detected. Accordingly, any resulting changes in the remote entity's physical state may also be readily computed.

Nonetheless, collision events handled by the preferred physics-based approach may also suffer from latency issues associated with network communications of physics-based data.

Figure 7:
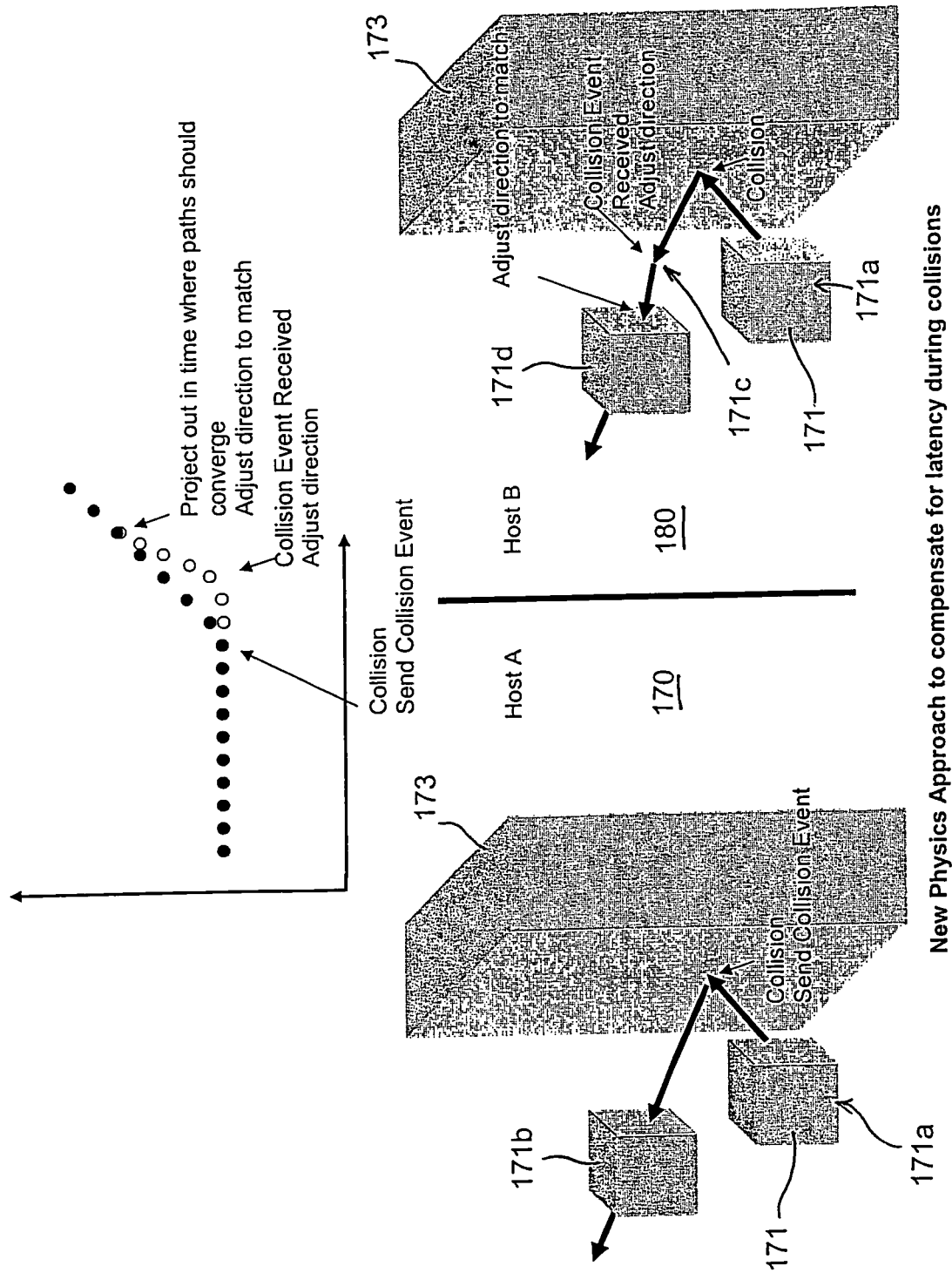
FIG. 7 is a diagram illustrating the physics based method for correcting for latency during collisions.

FIG. 7 illustrates at least one of the issues that may be associated with latency in a physics based system, and also illustrates a preferred approach that may be used to compensate for such latency. In FIG. 7, a local host 170 detects a collision event of entity 171, and 171a and 171b represent the positions of entity 171 before and after the collision event, respectively. According to this embodiment, the local host 170 broadcasts notification of the collision event the moment it occurs. Simultaneously, a remote host 180 also detects or computes the collision event, since it is using a physics engine to compute the behavior of the remote entity 171. However, due to one or more technical considerations, e.g., a latency-created difference in the relative positions of object 171 and the object 173 with which it collides, potentially differences may appear between a local host's 170 computed state and position 171b of a local entity and one or more remote host's 180 computed state and position 171d for that same entity, which is treated as a remote entity on a remote host.

FIG. 7 illustrates the difference that can occur when the locally and remotely computed positions or states differ and a method for reconciling or de-conflicting the results in the event of such difference. To keep the distributed simulation environment synchronized to a certain predetermined, acceptable level, the local host 170 broadcasts the collision event of a locally hosted entity, including the results of such a collision event on the local entity's state. Preferably the entity state information broadcast as a result of the collision event includes a time-stamp of a system time for the collision, or some other useful temporal indicator, such that, when it is received by the remote host 180, the remote host can compute any necessary adjustments that might be required in order to reconcile the entity's state as computed by the remote host and the entity's actual state as computed by the local host.

As can be seen in FIG. 7, at the point in time when the entity's actual state is received by the remote host, the remote host would have already altered the state, i.e., location, of the remote entity based on its own physics-based computations, and potentially a few frames would have been generated during this latency lag period, resulting in the object's position being calculated at point 171c. The remote host 180 then projects out in time some increment to compute the necessary corrections that must be applied in order to converge the remotely computed state of the entity with the entity's actual state. This corrective path, illustrated in the graph, is smoothed and timed so as to prevent corrective jerking of objects in the simulation.

Collision events, in accordance with one aspect of the invention, are preferably dealt with according to the following approach. Within the local simulation application, based on the contact point of a force on a given entity (e.g., box, features, etc.), the constraint forces are computed and sent to the remote simulator(s). Using the constraint forces transmitted by the local simulation application, accelerations, velocities and position can be computed within the remote simulators' physics engine(s). Preferably, forces are only sent when they exceed a certain predetermined threshold value. For example, if we assume that in a simulation, for example, there is an IED explosion that is an instantaneous impulse, then the force is broadcast to all other simulators only one time. Advantageously, this approach does not require the transmission of continuous updates reflecting position, velocities and accelerations. Further, complex extrapolation or dead reckoning computations are not needed.

Figure 8:
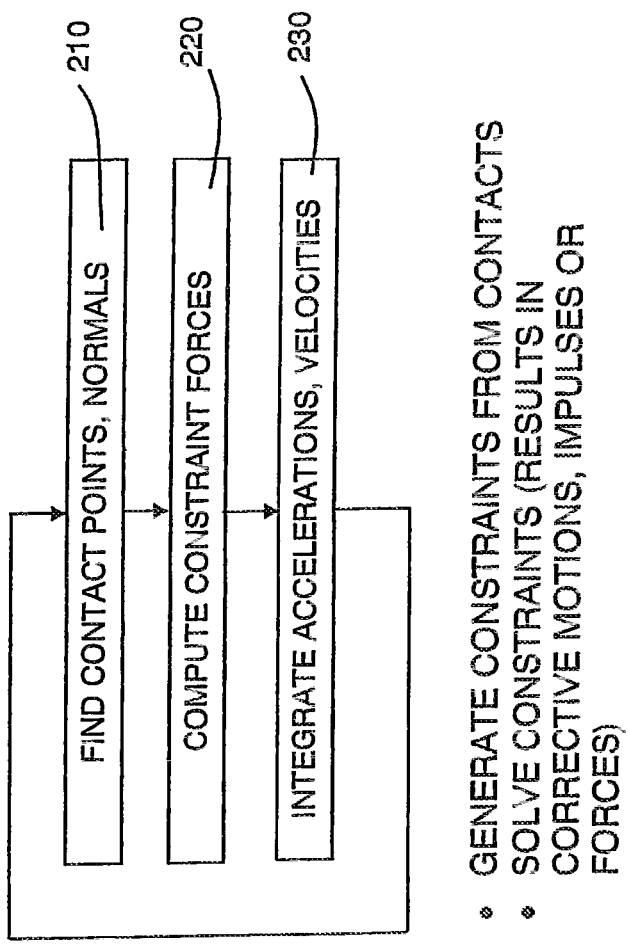
FIG. 8 is a flowchart showing the general steps of physics processing.
Figure 12:
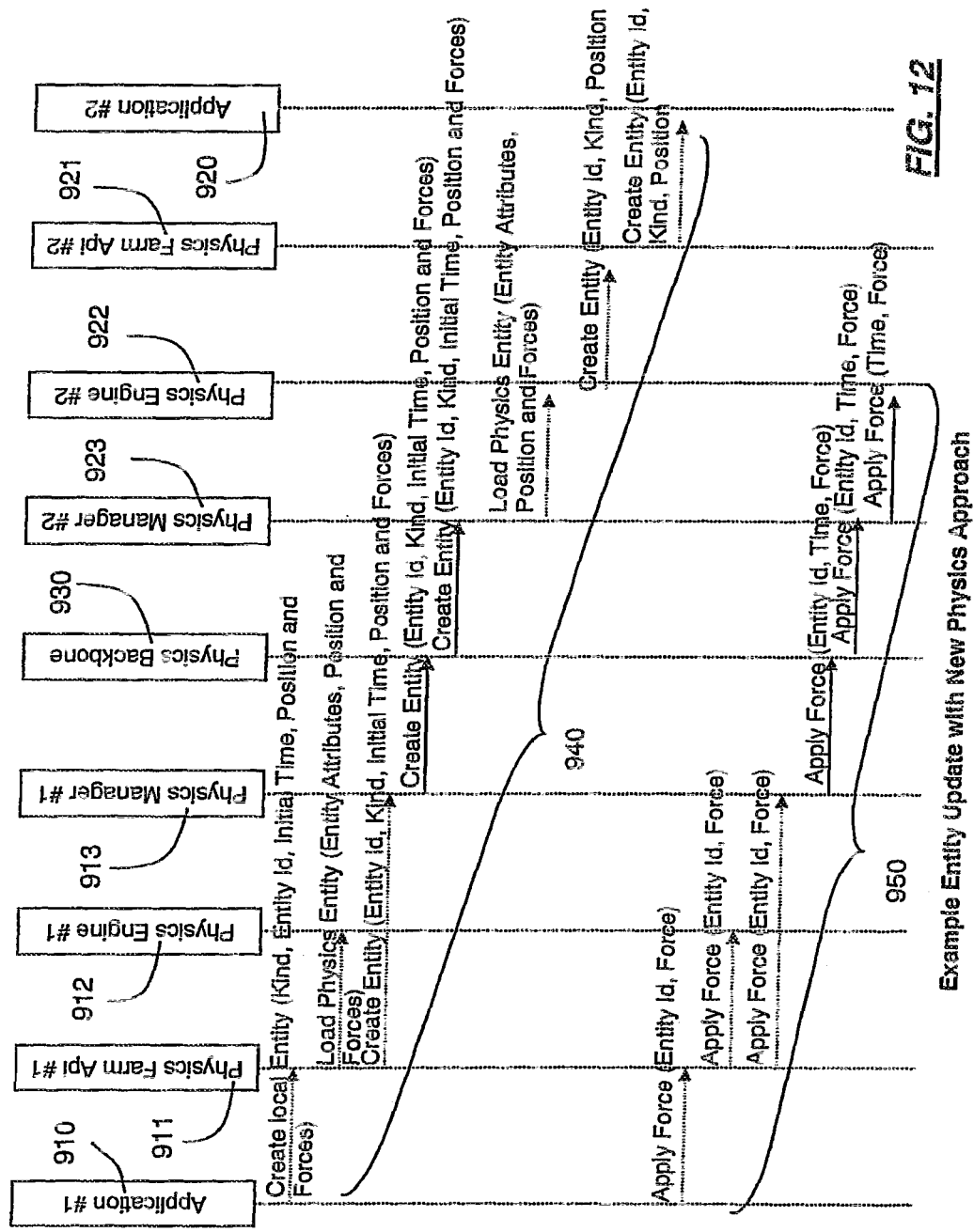
FIG. 12 is an event trace showing creation of an entity and an application of force to an entity.

FIGS. 8 and 9 illustrate the physics engine computations performed according to a preferred embodiment. Essentially, the process involves solving for constraints and then generating the information needed to update an entity's state (e.g., accelerations, velocities and positions). The forces and accelerations are determined with six degrees of freedom, meaning, linear forces applied at the three orthogonal spatial axes and rotational component forces about each of those axes.

As shown, first at step 210, contact points are determined using surface normals. Next, in step 220, the constraint forces are computed based on the determined contact points. Then, at 230, accelerations, velocities and position are integrated to obtain a result in terms of current position of the object. The physics engine continuously carries out this computation at each time step for each physics-based entity registered with the engine, and the scene data of the object in the associated simulation station 3 is updated based on the calculated position of the object.

FIG. 10 illustrates an event trace based on a collision event using the physics-based approach according to a preferred embodiment of the invention. Depicted by way of example are two simulation applications 810,820, each including a respective physics farm API 811, 821, a respective physics engine 812,822 and a respective physics manager 813, 823, with the two simulation stations connected by the physics farm communications backbone 830.

The event trace for the exemplary collision event proceeds as follows.

1. For an entity (i.e., virtual object) hosted by simulation application 810 (i.e., an instance of a participating physics engine owning the entity simulation), a collision is detected by the physics engine 812 and reported to the local physics manager 813. Typical information reported includes, e.g., entity ID, colliding entity ID (entity with which collision occurred), collision position and collision time.

2. The physics engine 812 also reports the same information to the local physics farm API 811, which in turn passes the information along to the local simulation application 810 for updating the local scene data to reflect the end location of the virtual object or entity.

3. The local physics manager 813 broadcasts over the physics farm communications backbone 830 information related to the collision event, including, e.g., entity ID, colliding entity ID, collision time and the new forces computed by the local physics engine 812 as a result of the collision.

4. The remote physics manager(s) 823 receives this information and uses the information to synchronize and de-conflict the results broadcast by the simulation application responsible for the entity which was the subject of the collision with its own results that it has been computing simultaneously on its own physics engine.

5. The physics manager transmits the entity's position and other state data to the physics farm API 821 of its simulator station, to be passed on for incorporation into the scene data stored therein FIG. 11 illustrates a preferred embodiment of message formats for physics data transfers among the physics engines over the physics farm communication backbone. There are three different data formats or packets used for transmitting the physics data.

When an object or entity ids created, the event is broadcast over the physics farm backbone with a data packet 271 containing the entity ID, the entity type (defining geometries and other physical attributes of the entity), the time of creation in system time, the initial position of the entity, and the initial forces on the entity, defined in the six degrees of freedom discussed above.

When a force is applied to an object sufficient to cause it to move above a threshold limit, an applied force data record or packet 273 is transmitted, containing the entity ID receiving the force, the time of the force, and data defining the force in six degrees of freedom.

When a collision occurs, a collision data or data packet 275 is transmitted to the other physics engines over the physics farm backbone. The collision data includes the entity ID of the entity hitting another object, the entity ID of the other object that is hit, the time in system time, the location of the collision, and the forces resulting from the collision.

FIG. 9 illustrates an event trace based on the creation and update of a physics-based entity. Depicted by way of example are two simulation applications 910, 920, each including a respective physics farm API 911, 921, a respective physics engine 912, 922 and a respective physics manager 913, 923, with the two stations connected by the physics farm communications backbone 930.

The event trace for the exemplary collision event proceeds as follows:

1. For an entity hosted by the local simulation application 910 (i.e., an instance of a participating physics engine owning the entity simulation), the simulation application 910 communicates to the local physics farm API 911 a request to create an entity, providing information such as, e.g., kind of entity, entity ID, initial time, initial position and initial forces.

2. The physics farm API in turn then communicates a request to the local physics engine 912 to load the corresponding physics model with the given entity attributes, position and forces and notify the local physics manager 913 of the creation of the entity and its corresponding creation data.

3. The local physics manager 913 broadcasts the creation of the entity and its associated creation data across the physics farm communications backbone 930.

4. The remote physics manager(s) 923 receives the notification of the creation of the new entity on simulation application 910.

5. The remote physics manager(s) 923 proceeds to instantiate the entity within its local physics engine; i.e., instruct its own physics engine 922 to load the physics model/data for the new entity.

6. The remote physics engine 922 then notifies the remote physics farm API 921 of the creation of the new entity.

7. The remote physics farm API 921 in turn notifies the remote simulation application 920 of the creation of the entity.

Similarly, as shown in FIG. 9, an exemplary application of forces to an entity proceeds as follows:

1. The local simulation application 910 communicates to the local physics farm API 911 the request to apply a set of forces to an existing entity owned by that simulation application; typical information included in the request might include, e.g., entity ID and set of forces to be applied.

2. The local physics farm API 911 then instructs the local physics engine 912 to apply the forces and at the same time notifies the local physics manager 913 of the request to apply the new set of forces.

3. The local physics manager 913 in turn broadcasts the application of the new set of forces to the entity across the physics farm communications backbone 930.

4. The remote physics manager(s) 923 receives the broadcast and communicates the information to the remote physics engine 922 so that simulation of that remote entity can now be carried out using the new set of forces.

Figure 13:
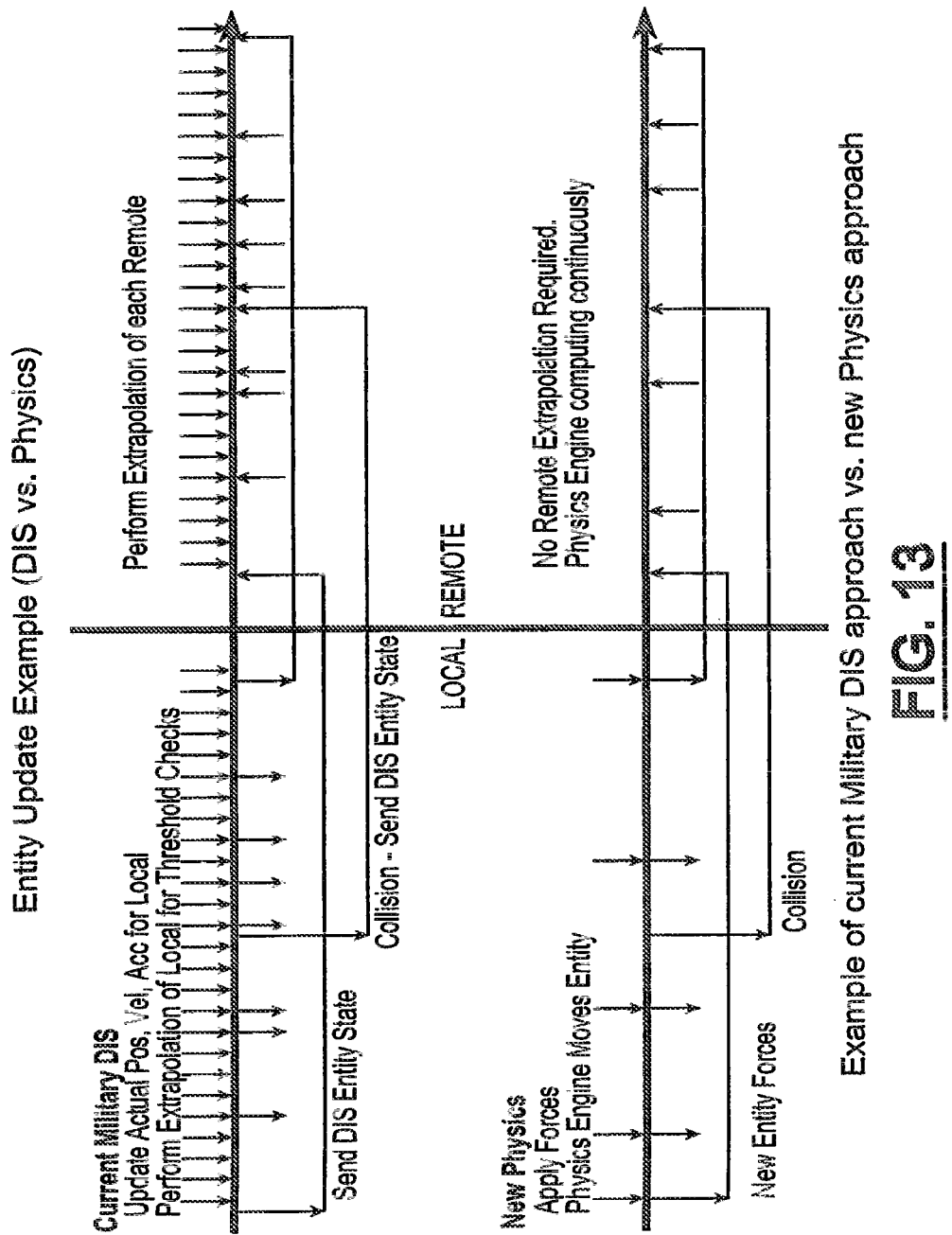
FIG. 13 is a diagram comparing operation of the physics based system of the invention with the current military system.

In the physics based system of the present invention, frequent entity state updates and consequent frequent extrapolation by dead reckoning are not required. FIG. 13 illustrates this with a side-by-side comparison of the current approach used in military DIS based simulations with the approach according to a preferred embodiment of the present invention. The left side of the diagram of FIG. 13 depicts the local host activities and the right side depicts the remote host activities. In the upper half of the diagram depicts the current military DIS approach and in the lower portion depicts the approach according to a preferred embodiment of the present invention.

As can be seen from FIG. 13, in the current military DIS approach, the local host updates the actual position, velocities and accelerations for a locally owned entity fairly frequently, and then performs dead reckoning of the local entity to check for any excursions beyond the predefined threshold value. Only when the local dead reckoning computations exceed the predefined threshold value(s) does the local host broadcast an update across the DIS network. Updates are also broadcast upon the occurrence of a collision event. Therefore, in the absence of entity updates, the remote host continues to compute the entity's state based on the dead reckoning algorithms and needs to execute correction routines when an entity update is received, i.e., when the local/owning host determines that the dead reckoning computations no longer accurately represent the entity's state based on some predefined threshold/tolerance value.

In contrast, in the physics-based approach of the present invention, the local host does not perform any dead reckoning threshold computations, and only updates the entity's state when forces have changed or when a collision event is detected. Similarly, the remote host does not perform any dead reckoning/extrapolation of the local entity's state since it has the same physics model of the entity loaded and is simulating its behavior based on the same set of applied forces and collision events.

Modeling of the ownship for vehicle simulator stations has in the past usually used scripts triggered by events or the instructor, and these provide limited scenarios for training. According to the preferred embodiment of the invention, however, the simulation station has a detailed physics-based model made up of the entities that together form the user's ownship. As such, the physics engine at the simulation station 3 is preferably used to perform physics processing on the constituent parts of the vehicle being simulated. The result is that the physics engine provides a realistic and very flexible simulation of the dynamic operation of the vehicle. Component parts may be damaged by other entities in the virtual world, or influenced by an IOS command entered for training purposes, in which case, the physics engine causes the vehicle in simulation to perform (or fail) similarly to the real vehicle with a similar type of damage.

The simulation based on physics processing of the virtual entity model of the ownship may also be used to supply simulated data to the simulator cockpit or control panel, such as, in an aircraft, providing data defining an artificial horizon or altimeter gauge.

In addition, the physics engine of the simulation station generates force or collision data reports in the processing of the ownship constituent entities or virtual objects. That physics data is published as events on the physics farm backbone to the other physics engines, which use the force or collision data to update their associated copy of the world physics data, which includes the constituent entities that make up the ownship of each simulator station in the system. As a result, not only is the physics data for the ownship components used for simulating operation at the associated simulator station, but it is also used to render the views that other users on the system have of the vehicle. Because these views correspond exactly (except for any latency issues) with the exact operational simulation of the vehicle, reality of the scene is enhanced, as well.

Figure 14:
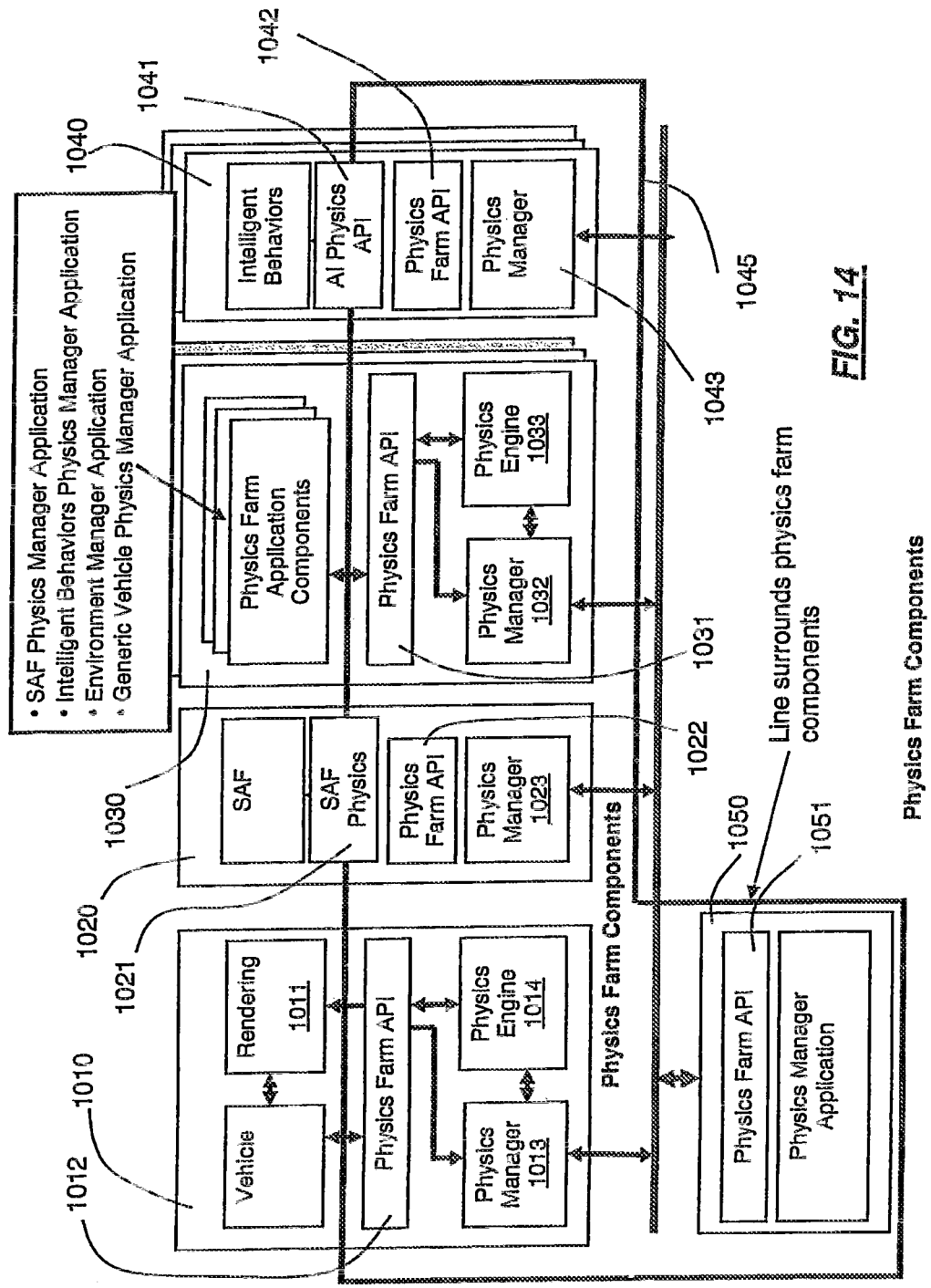
FIG. 14 is a more detailed diagram of the components of the physics farm.

FIG. 14 illustrates an embodiment according to the present invention of the physics farm. The physics farm can be conceptualized as the dynamic pooling of all physics-based resources participating in a distributed simulation. The pooling of physics-based resources is made possible by employing certain physics farm components needed to effectively manage the distributed simulation; e.g., physics farm API, custom physics APIs for interfacing legacy applications, physics managers and physics engines.

In FIG. 14 a dedicated, high fidelity simulator representation 1010 (e.g., a helicopter flight simulator) is participating in a distributed physics-based simulation with a more traditional SAF application. The simulator 1010 includes its own rendering engine 1011, a physics farm API 1012, a physics manager 1013 and an embedded physics engine 1014. A simplified representation of an SAF application 1020 is also depicted.

The SAF application 1020 includes an SAF physics API 1021, a physics farm API 1022 and a physics manager 1023. A simplified representation of an intelligent behaviors application 1040 is also shown, having an artificial intelligence (AI) physics API 1041, physics farm API 1042 and a physics manager 1043.

In generic form, any simulation application can be adapted to work with the physics-based network, not only simply participating, but also using the physics-based processing to govern the behavior of entities hosted by its own simulation. For example, a physics farm application component 1030 can include an SAF physics manager application, an intelligent behaviors physics manager application, an environment manager application or vehicle physics manager application.

In order to effectively participate, communicate and utilize physics farm resources, the physics farm application component application includes a physics farm API 1031, a physics manager 1032 and a physics engine 1033. Alternatively, the physics farm application component does not include its own embedded physics engine (not shown) but instead uses a physics engine in the physics farm 1045, either a tightly or loosely coupled physics engine available as a pooled resource. Another component includes a physics manager application 1050 for managing the resources of the physics farm. The physics manager application includes a physics farm API to communicate and manage the physics farm components.

Figure 15:
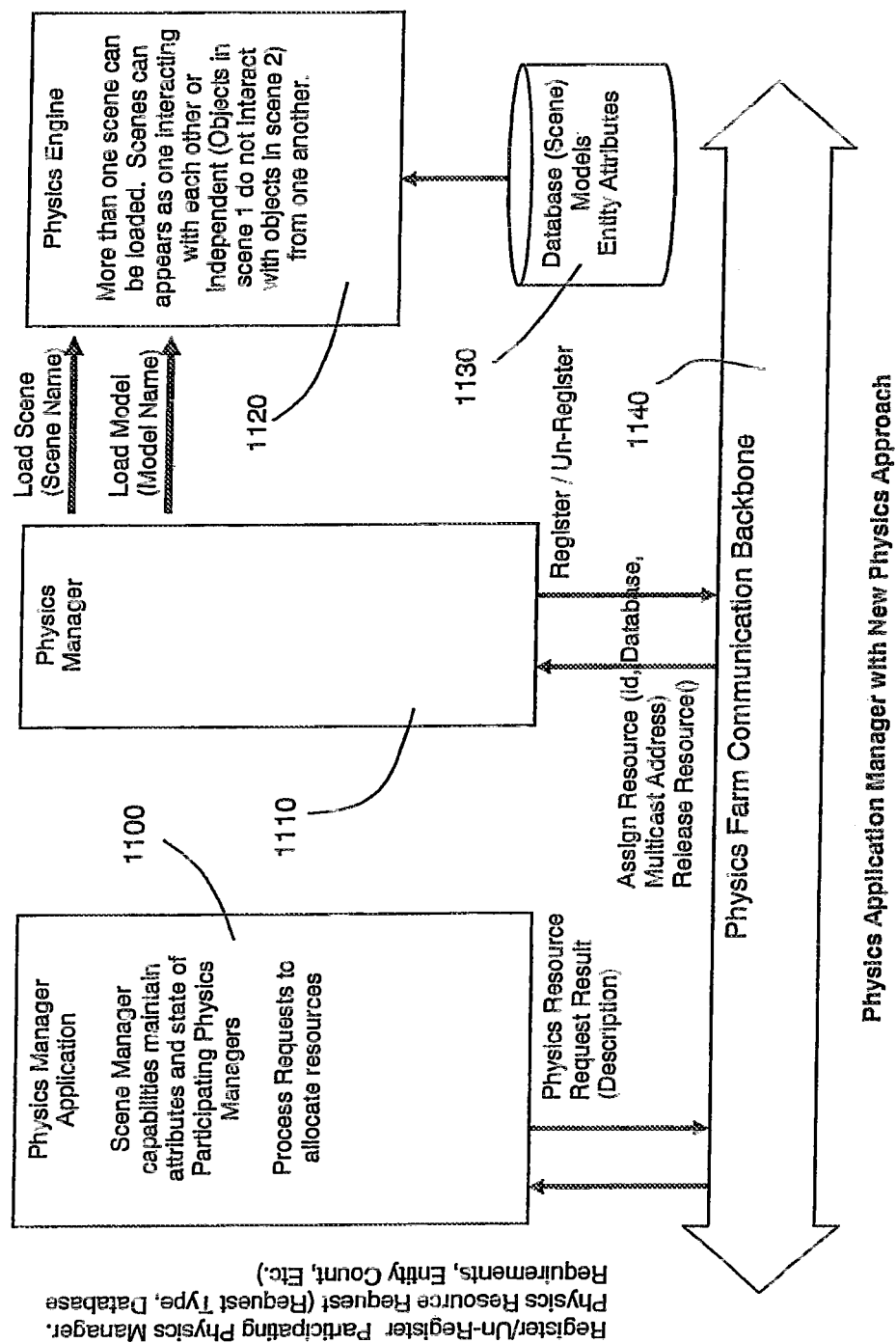
FIG. 15 is a diagram of the operation of the physics manager.

FIG. 15 illustrates the interoperation of the physics manager application 1100 with a simulation application 1110, or generically a physics farm application component, according to a preferred embodiment. In operation, a participating simulation application 1110, or generically a physics farm application component, notifies the physics manager application 1100 via the physics farm communication backbone 1140 of its participation in the simulation. The physics manager application 1100 then registers/un-registers (if a physics manager notifies the physics manager application that it is terminating its participation in the simulation) the new physics manager 1110. The physics manager application also at this time processes any physics resource requests issued by the newly participating physics manager.

One possible data format for the physics resource request might include request type, database requirements, entity count, etc. The physics manager application would then communicate over the physics farm communications backbone 1140 to the newly participating physics manager 1110 the results of the physics resource request (i.e., assign resources). For example, in assigning resources the physics manager application might assign provide the newly participating physics manager an ID, database, multicast address, etc. Similarly, when the physics manager departs or ceases participation, the physics manager application 1100 would release the resources previously assigned. A database would preferably include scene data including, e.g., models, entity attributes, etc.

The physics manager application 1100 preferably includes scene manager capabilities for maintaining attributes and states of participating physics managers 1110. The participating physics manager then communicates with the physics engine (either assigned from the pooled resources or embedded) and provide it with relevant information regarding the simulation which it just joined; e.g., provide the physics engine with the relevant scene data and model(s) to load. The physics engine could load more than a single scene. Scenes could appear as interacting scenes or they could be independent scenes wherein objects in one scene do not interact with objects in another scene.

Figure 16:
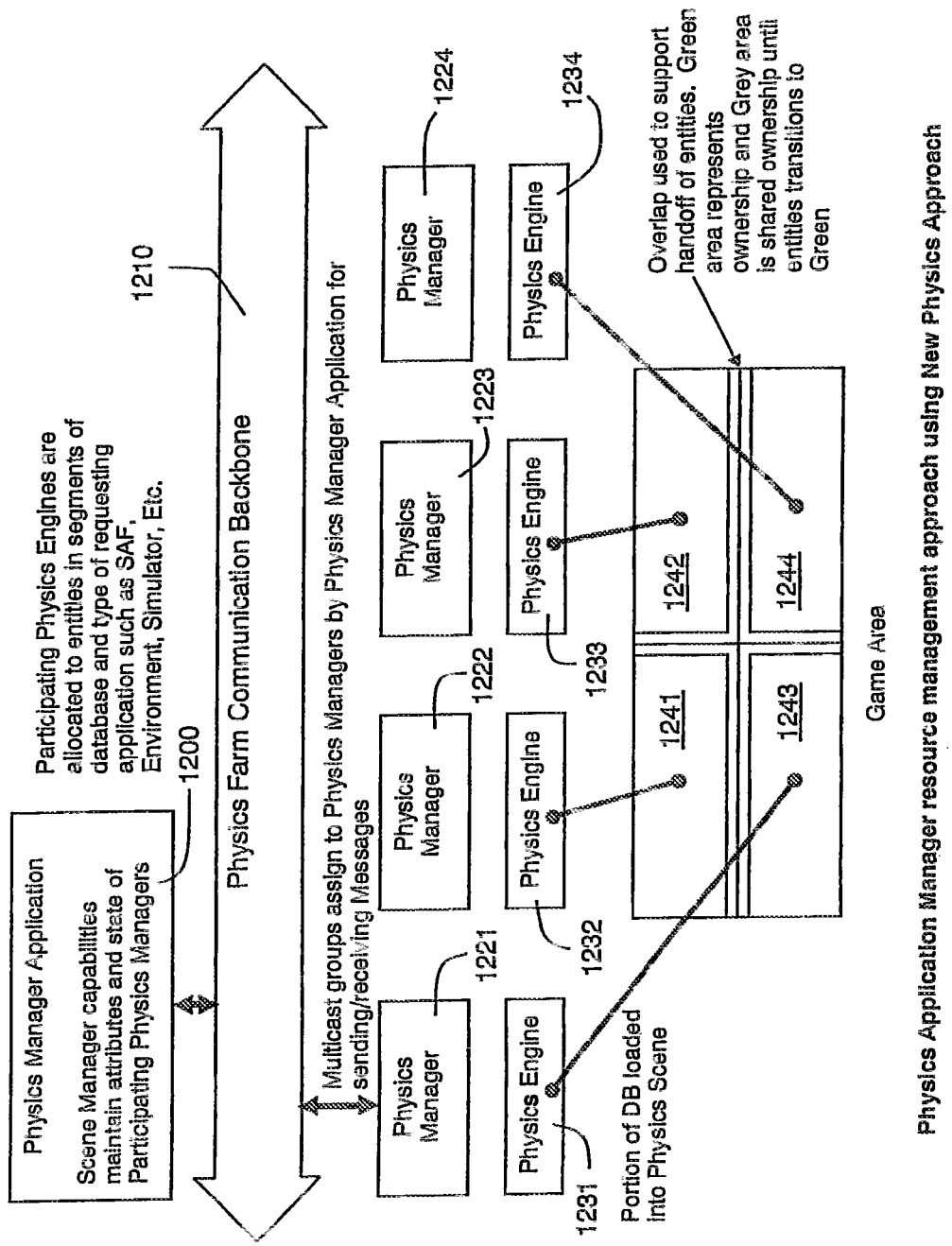
FIG. 16 is a diagram of the resource management operation of the physics application manager in a physics based system according to the invention.

In one embodiment, the physics manager application could manage resources as depicted in FIG. 16, which illustrates a physics manager application 1200 communicating with physics farm components over the physics farm communications backbone 1210. Each physics farm resource available for allocation (i.e., a physics farm component) would include a physics manager 1221-1224 and a physics engine 1231-1234. In the embodiment of FIG. 16, the physics manager application preferably creates multicast groups and assigns participating physics managers to one or more multicast groups; preferably multicast group assignments are implemented so as to optimize network efficiency and/or to improve simulation performance.

Also, in the embodiment shown in FIG. 16, the simulation world is divided into areas 1241-1244, where each area represents a portion of the simulation database loaded into a physics engine. The areas 1241-1244 could be assigned by the physics manager application to the physics farm resources based on any one of a number of factors. Preferably areas are assigned to physics farm resources so as to optimize computational and network performance of the distributed simulation. The areas preferably overlap with adjoining areas of the simulation world so as to support effectively "handing-off" responsibility for simulation entities as they transition from one area under the ownership of a particular physics engine to another area under the ownership of a separate physics engine.

Figure 17:
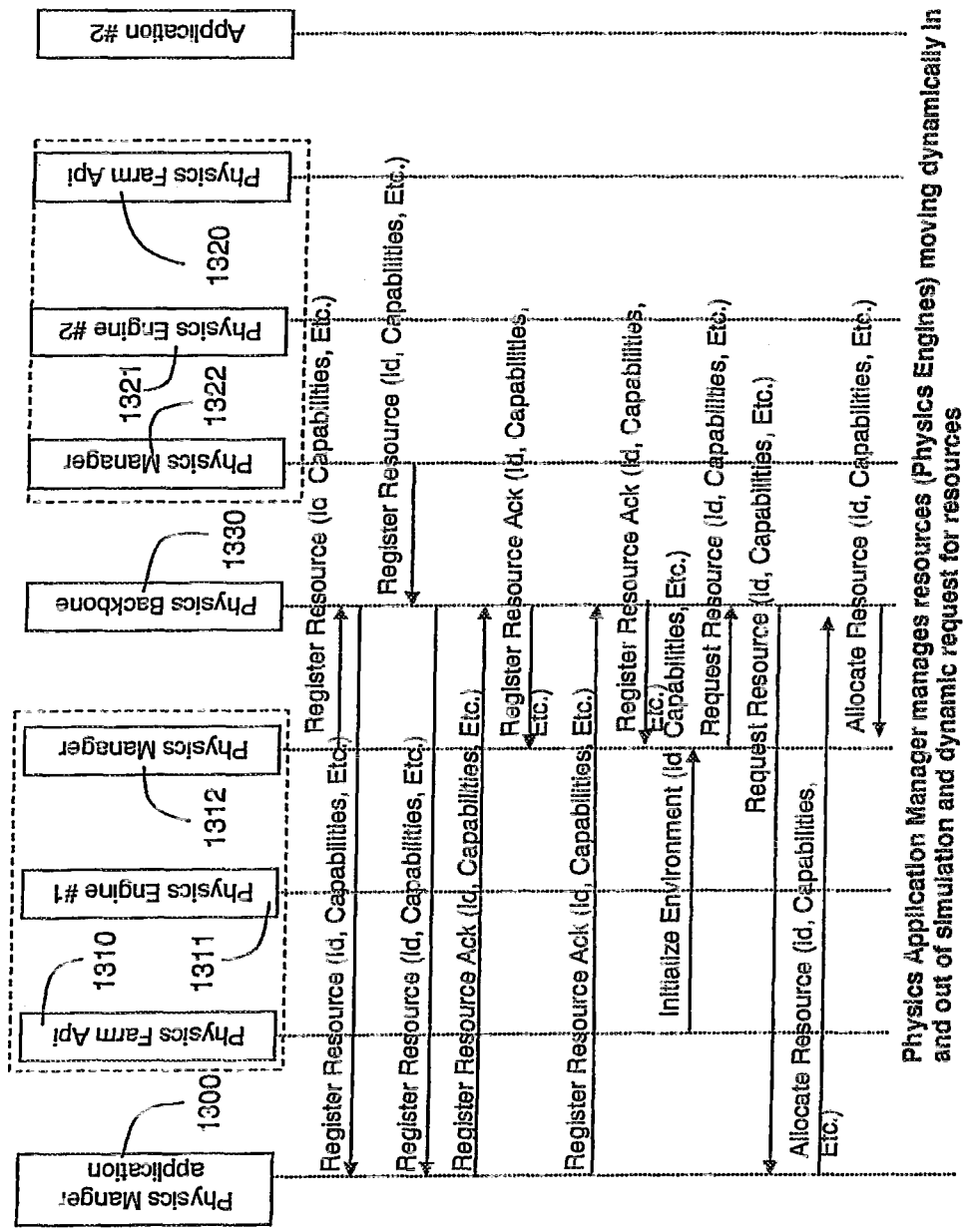
FIG. 17 is a diagram of the physics application manager communications in resource management in a system according to the invention.

FIG. 17 is an event trace illustrating the dynamic allocation of physics resources by the physics application manager. A physics manager 1312 entering the distributed simulation communicates a request to register as a resource over the physics farm communications backbone 1330 to the physics manager application 1300; the registration request includes, e.g., ID, capabilities, etc. of the physics manager. Similarly, other physics managers 1322 broadcast a request to register as a resource upon entering the distributed simulation.

The physics manager application 1300 receives the registration requests over the communications backbone 1330 and issues acknowledgements to the requesting physics managers, confirming registration. Once registered, the physics farm API 1310 can issue a request to the physics manager 1312 to initialize the environment and the physics manager 1312 in turn broadcasts the request over the communications backbone 1330 to the physics manager application 1300. The physics manager application 1300 then allocates the necessary resources to accommodate the request, broadcasting the allocated resources (e.g., ID, capabilities, etc.) over the communications backbone 1330 to the requesting physics manager 1312. Utilization of the allocated resource can then proceed.

According to another aspect of the invention, the errors, differences, inconsistencies, conflicts, etc., that can exist among the individual participating simulation applications are further reduced or eliminated by avoiding coordinate conversions in the computations that are most sensitive to slight variations.

Figure 18:
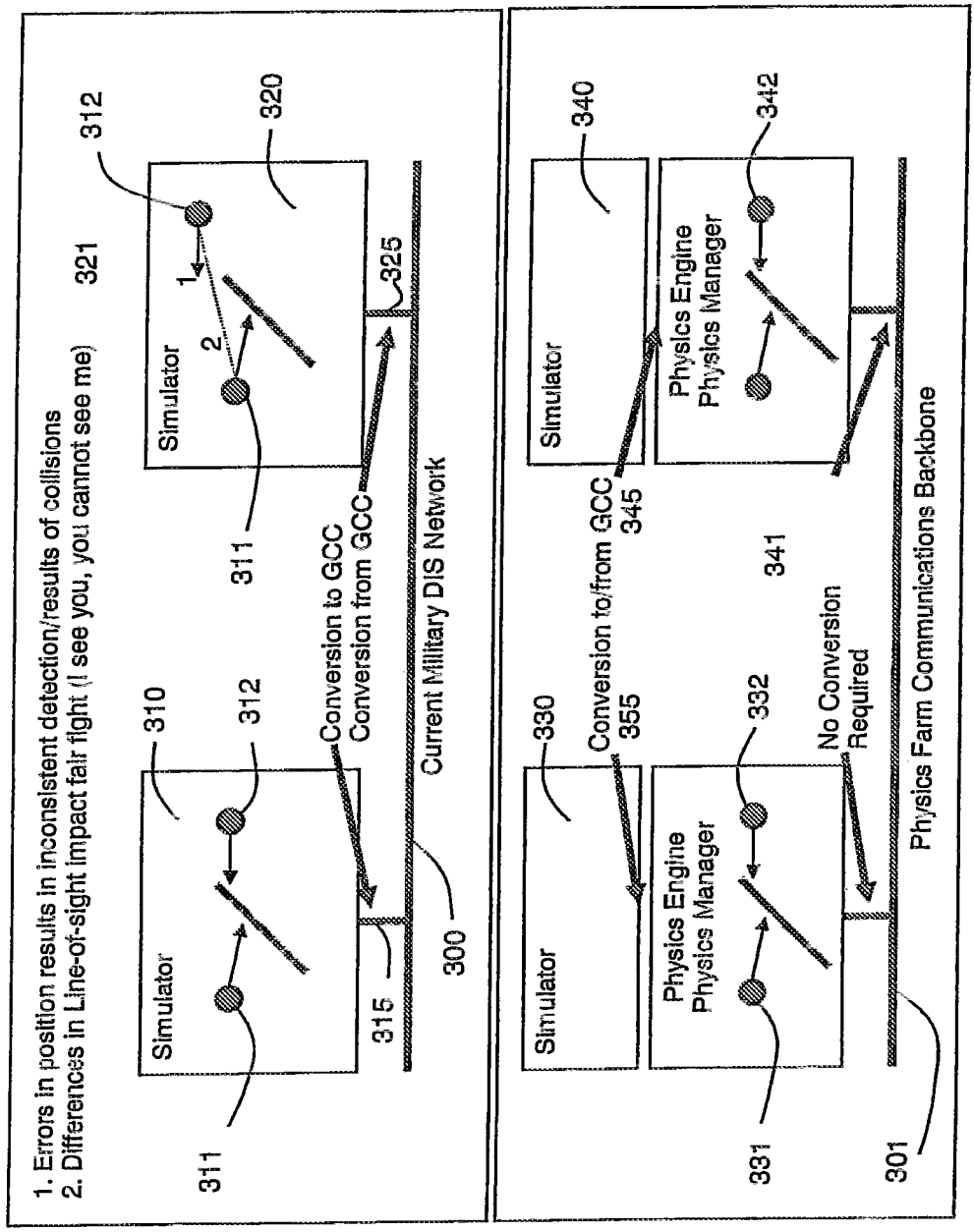
FIG. 18 is an illustration of the problems of coordinate conversion and the elimination of the problem in the system according to the invention.

As shown in FIG. 18, the current approach using the DIS protocols/network 300 requires that all traffic across the network utilize the Geocentric Coordinates (GCC). As a result, each simulator application 310, 320, despite the coordinate system being used locally in the local simulator application, must be converted to GCC 315, 325 when broadcast across the network. The receiving simulator applications then have to convert from GCC 315, 325 into whatever local coordinate system that particular receiving simulator application was using for its computations. This is required even if the receiving simulator application was using the same coordinate system as the remote/sending simulator application.

As can be seen by the different positions of the rendered entities 311, 312 in each of the simulators 310, 320 in FIG. 18, errors in position can result in inconsistent detection or results of collisions. Similarly, differences in line-of-sight (LOS) may exist due to inconsistencies in the different scene data, which impacts "fair fight", because, as an example, entity 312 has a LOS on entity 311 in simulator 320 but in simulator 310, entity 311 does not have a LOS on entity 312.

According to one embodiment of the present invention, conversions are eliminated between physics engine/managers as they would each be operating in the same global coordinate system. The only point at which conversion to a simulator's local coordinate system might be required is when communicating between the physics engine and the associated simulator 335, 345; no conversion is required when a physics engine/manager communicates 336,346 across the physics farm communications backbone 301 with the rest of the physics engines. In such an embodiment, physics engines and physics managers are operating in a common coordinate system thereby eliminating errors due to conversion in the physical representations of entities in local and remote simulators. More specifically, only rendering in the local simulator can be affected by conversion errors, while the physics calculations, which are inherently more sensitive to differences due, for example, to the effects of slight errors on collisions or lines of sight, do not experience this issue because all of the physics engines use the same coordinate system.

In the prior art, SAF entities are used to fill in the battle space with friendly, neutral and opposing forces. SAF forces in prior art systems are generally controlled as simple kinematical models, primarily to reduce computational loads. As a result, the SAF entities of the prior art are not influenced by physics-based forces, and the result is that the SAP entities lack realism. According to the invention, however, an SAF application relies on the physics farm to allow for additional functionality of SAF entities, as, for example, to allow for the SAF forces to influence and be affected by physics based events.

FIG. 20 shows one approach for integrating vehicle man-in-the-loop (MIL) simulators and SAF/computer generated forces (CGF) with the physics based system of the invention. The system includes one or more user simulation stations generally indicated at 510, comprising a simulation 511 with a display for the user (not shown), that receives imagery from rendering system 512 responsive to real time scene data modifications from the physics farm received through physics farm API 513. Physics farm API 513 communicates with the physics farm via physics manager 514, physics engine 515 and physics farm communication backbone 530, as has been discussed above.

The physics backbone 530 is linked with SAF computer system 520 which supports thereon an SAF application. Using the current military approach employing the standard DIS protocols, SAF behaviors are bundled with vehicle dynamics where the vehicle dynamics are based upon kinematics (new positions computed for each frame) and the SAF behaviors are based upon defined echelon hierarchy and standard military doctrine.

The SAF application is divided into two separate applications, the SAF Physics Manager Application (the native application) 521, and a separate SAF behaviors application 526. Each application has a respective interface with the physics farm via entity management APIs 522 and 527, and Physics Farm APIs 523 and 528. These APIs communicate with a respective physics manager 524 and 529 for each SAF application. The physics manager integrates the SAF requests from the SAF applications with a physics engine 525, and provides feedback to the SAF physics manager application 521 or the SAF behaviors application.

The requests of the SAF applications result in creation or movement of physics-based entities in the virtual world, and those entities can affect users or the simulated environment based on the physics based interaction of entities discussed above, e.g., SAF forces may be able to shoot, to put weight on objects and cause them to fall, or to engage in any kind of activity that produces force on the entities in the virtual world. In addition, the SAF entities can be the recipients of forces that affect them, and that alter their conduct based on their strategic rules.

According to the preferred embodiment, behaviors are separated from vehicle dynamics, requiring position data feedback to the SAF behaviors application only when the SAF directed request is complete, the request is interrupted or a collision occurs. As can be seen, the proposed entity management protocol and entity management API permit the SAF behaviors to be separated from vehicle modeling. Additionally, the entity management protocol provides mechanisms for SAF behaviors to direct the movement of physics-based vehicle models. The SAF physics manager is configured to integrate SAF requests from the SAF application with the physics engine and for providing feedback/callback routines.

Figure 21:
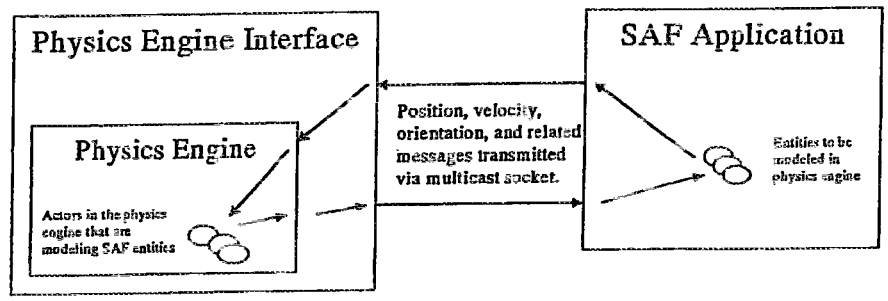
FIG. 21 is a diagram of data flow between a physics engine and an SAF application.

The data flow of the physics interface with the SAF application is schematically illustrated in FIG. 21. A simple message protocol is used as the interface between the physics engine interface and SAP application, and the messages are transmitted via multicast socket.

During the creation of SAF entities, the SAF application sends out data indicative of the initial position, orientation, and entity type to the physics engine interface for those entities that will be modeled in the physics engine. Based on the entity data received, the physics engine interface then creates a physics model in the physics engine for each SAF entity, so that it begins to exist in the simulated environment.

The SAF application periodically sends an update to the physics engine interface to update the physics models of the SAF entities.

When the physics models of the SAF entities interact with other objects in the virtual environment, creating a collision in the physics engine, any position, orientation, and velocity changes to the physics models of the SAF entity involved is sent back to the SAF application, which updates its corresponding entity based on the updated position, orientation, and velocity.

Behavior of the SAF entities in the simulated environment follows the behavior of the corresponding entity defined in the SAF application and processed therein. Complex SAF behaviors resulting in realistic interactions with the physics based simulation are made possible by this interface.

EXAMPLE

Figure 22:
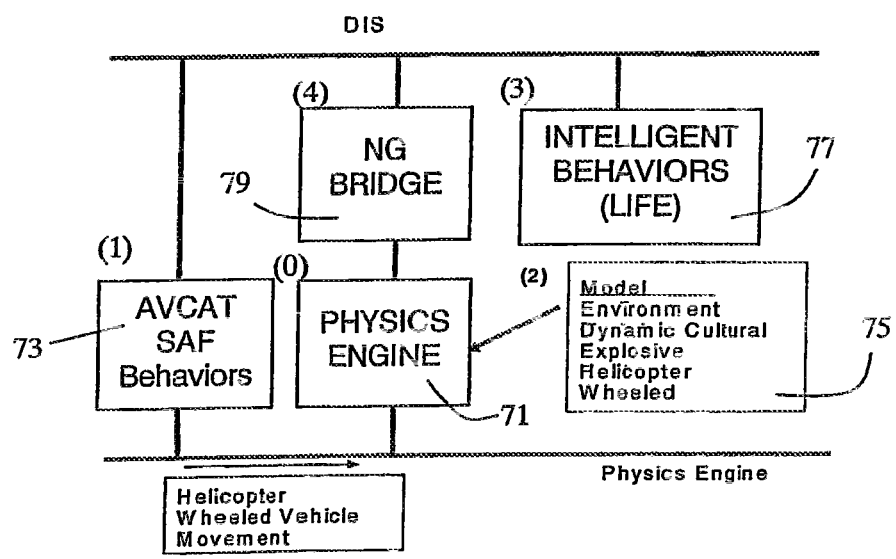
FIG. 22 is a simplified block diagram of a simple example of a physics based system constructed to test feasibility.

FIG. 22 is a simplified block diagram of a demonstrator used to prove the feasibility of applying physics-based modeling for applications that currently rely only on kinematics modeling. Additionally, physics-based modeling was used to incorporate dynamic "cultural features," which, if provided for at all, have typically been modeled statically.

The demonstrator provided higher fidelity models, increased quantities of vehicles and new dynamic cultural features. In addition to the inclusion of vehicle models, dynamic cultural features were incorporated into the simulation by loading cultural feature models into the physics engine. This allowed for interactions between the cultural features and vehicles in the simulation. For example, using the physics-based approach, a vehicle was now able to push a barrel out of the way, with both the barrel and the vehicle responding in a realistic manner to the forces generated by the interaction.

The key components in the example shown in FIG. 22 included a physics engine 71, a Semi-Automated Forces (SAF) application supported in an Aviation Combined Arms Tactical Trainer (AVCATT) 73, a dynamic environmental model 75 for cultural features, intelligent behaviors 77 and an NGT bridge 79.

The physics engine 71 used in the demonstrator of FIG. 22 was a commercially available software product that provides a software development kit (SDK) and algorithms for modeling a physics-based virtual world. Objects in the physics engine 71 can be created, attributed and registered with the physics engine. The physics engine's algorithms can either be implemented in software or hardware via a PPU.

The legacy based AVCATT SAF application 73 was adapted to work in the physics-based proof of concept demonstrator by first removing the existing dynamic models from the behaviors that direct the movement of the vehicles. In particular, the SAF helicopter and wheeled vehicle models were replaced with helicopter and wheeled vehicle models developed using the physics engine SDK and registered/executed on the physics engine 71.

As adapted, the SAF behavioral commands (e.g., "move") directed to the vehicle dynamics are sent to the dynamic models hosted on the physics engine 71 and the results or progress are/is sent back to the SAF behavioral logic to continue reasoning in accordance with the behavioral artificial intelligence implemented in the SAF application 73. In accordance with a preferred embodiment of the present invention, the SAF application 73 sent the physics engine 71 the type of model to be created (e.g., helicopter, wheeled vehicle, etc.) along with its required attributes such as mass, inertias, dimensions, etc.

Once the model is instantiated and registered with the physics engine 71 the SAF application 73 directs the physics-based model behavior (e.g., directs it to move). Preferably, position updates are periodically sent from the physics engine 71 to the SAF application 73. In order to enable the SAF application 73 to direct requests and receive results from the physics engine 71 hosting the physics-based objects/entities (e.g., helicopter, wheeled based vehicle, etc.), the demonstrator utilized communications protocols, message formats and APIs (developed to process SAF application 73 requests and communicate results) in accordance with a preferred embodiment of the present invention, the details of which or discussed in greater detail below.

In addition to the physics-based dynamic models (i.e., helicopter, wheel based vehicle, etc.) that are directed by the SAF application 73, cultural feature objects (e.g., dynamic buildings) can be created and registered on the physics engine 71 by the dynamic environmental model 75. Advantageously, the cultural feature objects, e.g., barrels, crates, boxes, barricades, and the like, can be seamlessly integrated into the environment and will interact with other physics-based objects, such as helicopters, ground vehicles, life forms, etc. The dynamic buildings may be assembled from objects that interact with the physics environment individually and can break apart based on forces being applied as opposed to scripted events. The forces can be generated by explosive detonations, impacts, from other dynamic objects, etc.

Life form behaviors have traditionally consisted of virtual representations of people participating in a simulation. The intelligent behaviors component 77 can model life forms using a physics-based approach so that the life forms may be treated like other dynamic objects, such as air or ground vehicles. In accordance with a preferred embodiment of the present invention, feedback mechanism would be required to communicate requests and to receive results of the effects of forces from the physics engine 71 that computes the physics based interactions/operations.

In order to interface the physics engine with other more traditional simulations based on the DIS protocols, an NGT bridge 79, as discussed above, was employed. The NGT bridge 79 enabled entities modeled by simulations external to the physics engine application to be incorporated/injected into the physics-based environment; these external simulations are preferably injected as kinematics objects since their motion/behavior is governed by external forces. Accordingly, according to a preferred embodiment of the present invention, entities natively modeled by the physics engine 71 would be distributed to the external simulations using the DIS protocols.

Synchronizer System

The system as described so far provides some substantial advantages. However, three potential problems should be addressed when using physics coprocessors to simulate objects in a distributed environment. One is the problem of network latency. A second problem arises from the fact that multiple physics engines that have been provided with identical initial conditions will, over time, inevitably provide solutions that diverge from each other. The third potential issue is that objects in the physics environment will interact with other objects in the virtual environment and may move in a manner not intended by the controlling simulation. For example, a computer controlled vehicle may be influenced or damaged by a collision created by latency and move in an erratic unintended path in certain of the simulations affected by that latency.

These problems can be addressed using periodic positional updates that allow the various simulator systems to synch up and match their respective versions of the scene data of the virtual world. Although this is workable, the periodic positional updates consume network bandwidth and computer processing resources in proportion to the number of simulated objects. This bandwidth demand makes it increasingly difficult to perform distributed simulation exercises that include thousands of objects, which means that it is less practical to attempt exercises with the tens of thousands of objects desired for certain virtual environments, such as dense urban scenarios.

Figure 23:
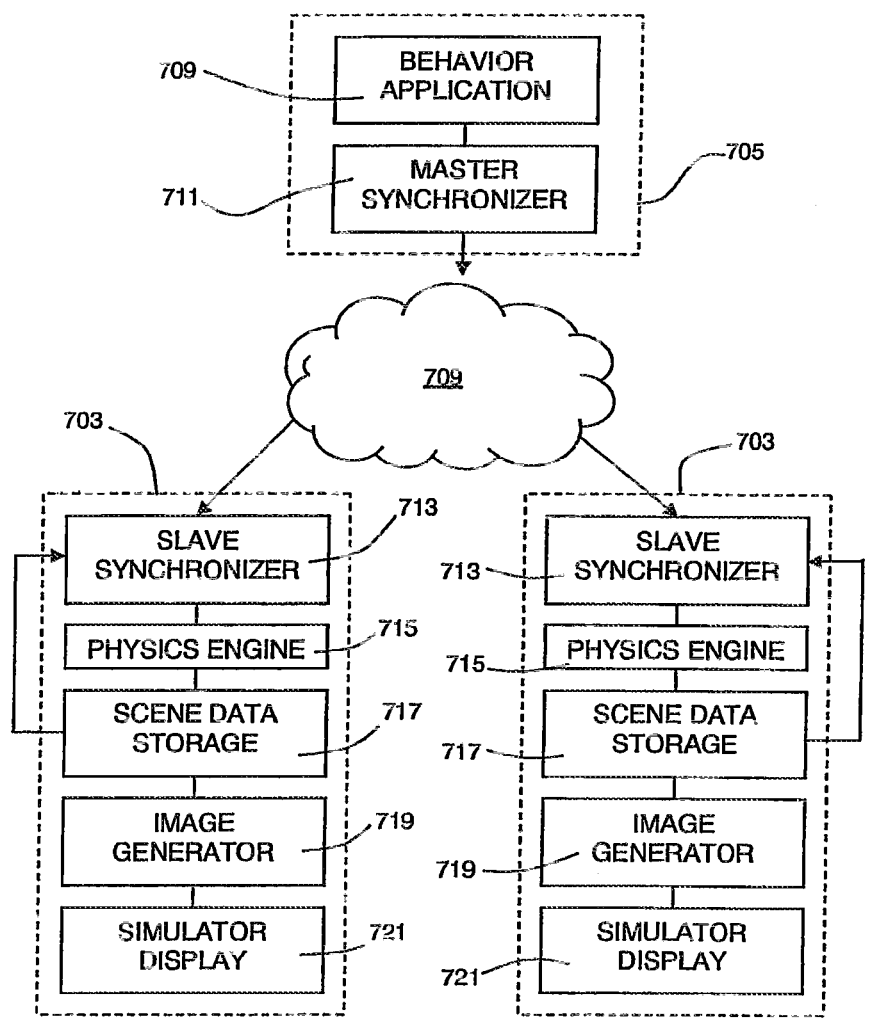
FIG. 23 is a diagram of a synchronizer system according to the invention.

Referring to FIG. 23, a system of master and slave synchronizers or controllers is provided that may be used with the physics based system of the invention to enhance the synchronization of the system of the invention with less of a bandwidth load. This system implements an approach to distributing simulated objects across networks simulations that reduces the impact of network latency and also allows for a much larger number of objects in the virtual environment without a concomitant consumption of network bandwidth and computational resources. The system also preferably relies on physics coprocessors and/or the physics farm discussed above for the associated control of objects simulated in the virtual environment of the simulation, as will be described below.

The system comprises a plurality of simulation stations 703, which are simulation systems similar to systems 3 as discussed above with respect to FIG. 1. The system also includes one or more client entity or object simulation computer systems 705, which are computer systems such as SAF controlling computer systems 9 discussed above. The simulation stations 703 and simulation computer systems 705 are connected via a network 707, which is preferably the network 5 of the system of FIG. 1, e.g., the Internet or a WAN. Only two simulation stations 703 and one simulation computer system 705 are shown in FIG. 23 for illustration purposes, but the system preferably encompasses a substantial number of each type of station 703 or 705 to support a number of trainees and also a relatively large number of computer-controlled client objects to enhance realism of the simulation.

Simulation Computer Systems

The simulation computer systems 705 are systems that control the behavior of client objects in the virtual world of the simulation, particularly SAF entities (such as enemy forces, vehicles or weapon systems), the simulation of which is discussed above, and illustrated in, e.g., FIG. 14. Essentially, each simulation computer system 705 is a computer system with a connection or access to a data storage device storing a respective version of the simulation scene data. A behavior software application 709 runs on the computer system, and determines, based at least in part on the scene data, the behavior of the client objects, e.g., SAFs or intelligent entities assigned to that system 705.

Generally, the behavior is movement of the simulated client entity or object, but may include any sort of self-actuated or reactive behavior, as discussed above, and is well known in the simulation art. For example, the behavior can include behaviors such as, e.g., a device exploding (usually expressed as extremely high speed movement of the discrete parts of the exploding object).

Within the behaviors appropriate to the client object, the behavior is calculated by the behavior application software so as to yield behavior data defining the behavior. Because the behavior data is usually data defining an intended projected path or movement of the client object, the behavior data for most objects simulated, especially vehicles or simulated humans, constitutes client route data.

In the preferred embodiment, the client route data includes at least a desired speed, one or more route points defining the route that the client object is to pass through in the movement, a desired ETA at the end of a route, and an append flag.

The route points are preferably two- or three-dimensionally expressed points in a client coordinate system. Where the client object is one that moves along the ground in the virtual simulation, such as a vehicle, an animal or a walking person, the coordinates can be two-dimensional, because the client object moves in two dimensions, with the vertical movement of the client controlled by the height of the terrain it is situated on. Where the client object is one that is able to initiate its own movement in three dimensions, such as a submarine, a fish, a helicopter or a bird, then the route is expressed in three dimensionally defined points.

The ETA is expressed using a system-wide time clock system, such as the system-wide network time protocol (NTP). From the standpoint of the master synchronizer, the ETA defines a future point in time by which the client object should reach the point at the end of the defined route. In addition, data defining an ETA for intermediate points along the defined route may also be provided in the client route data.

The append flag is a flag of data that is set to indicate whether the route being requested is to be appended to the existing route for the client object, or if the new route is intended to simply replace the current route for the client object.

The Master Synchronizer

The behavior or client route data from the behavior application passes or is otherwise communicated to master synchronizer or controller application software 711, which preferably also runs on simulation computer system 705. The master synchronizer 711 receives the behavior data and based thereon handles the creation of the virtual components of the simulated client object within the physics engines, as well as the low-level control and synchronization of the object within the distributed environment.

Figure 24:
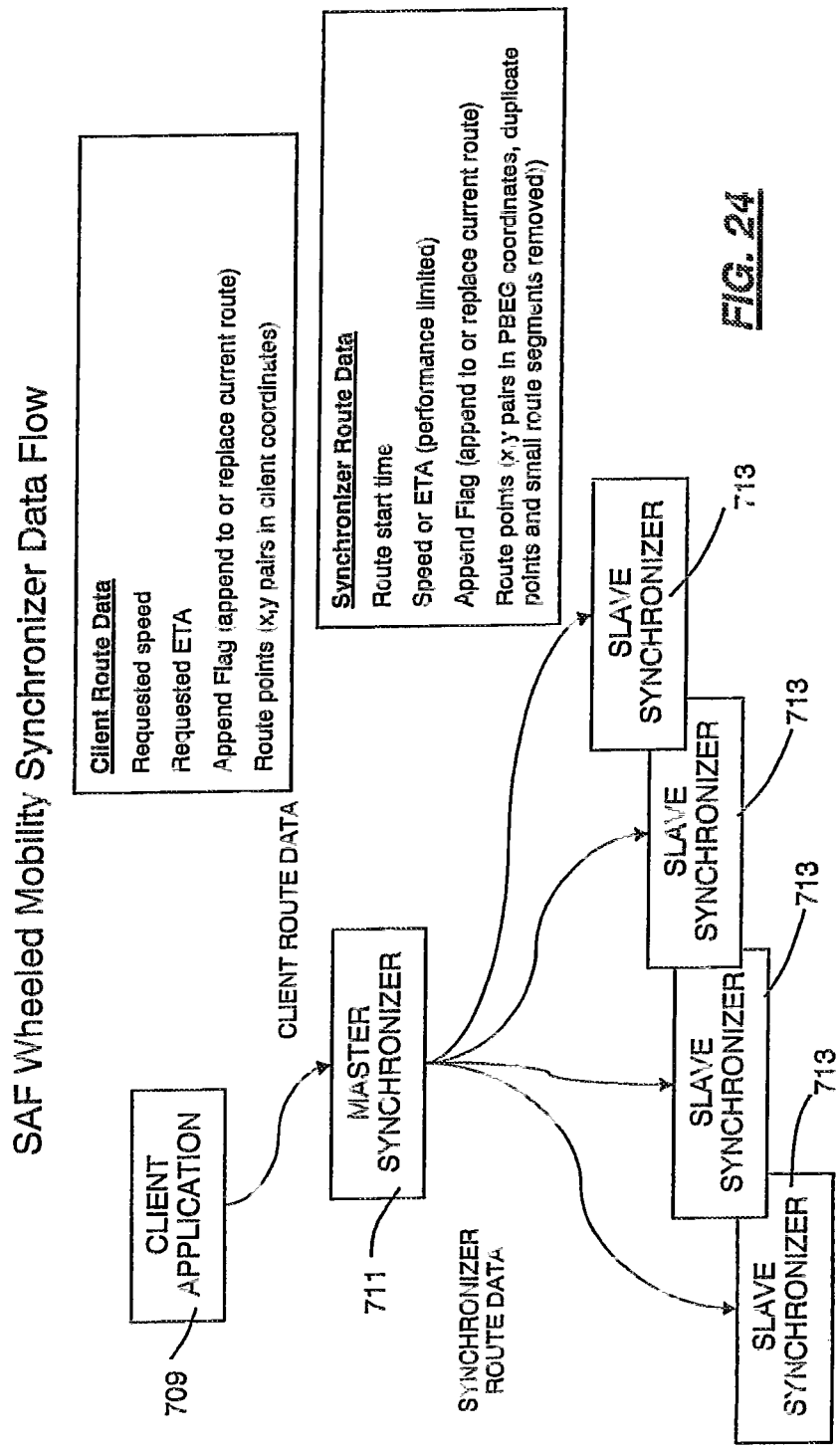
FIG. 24 is a diagram illustrating the synchronizer system of the invention as implemented for a SAF vehicle.

Each client object simulated within the physics environment has one, and only one, master synchronizer 711 that communicates with the application that is simulating the client object. Client behavior application 709 provides behavior or client route data to the associated master synchronizer 711. Distributed control and synchronization of the client entity or object over the system is then accomplished using synchronizers in a master/slave relationship as shown in FIGS. 23 and 24.

The synchronizer route data for a client object is derived from the behavior or client route data received by the master synchronizer 711, and is configured for distribution over the network. Generally, the synchronizer route data typically includes data defining a goal and a start time. The data defining the goal may be a destination point, or it may be data that defines a route and a desired speed that the client object is to proceed along the route, or it may be another combination of data defining some time-dependent locations and/or orientations for the client object. For example, the synchronizer route data may contain data defining a route and an ETA at an endpoint of the route, i.e., a point in time that is at least a short time in the future from the standpoint of the master synchronizer at which it is desired that the client object reach the endpoint of the route.

The synchronizer route data according to the preferred embodiment also includes an append flag indicating, on or off, whether the route transmitted is to be appended to the currently in-place route, or if it should replace the current route.

Where the goal is defined using one or more route points, the points are preferably are defined in two or three dimensions depending on whether the object is capable of flight or simply surface movement, and are preferably x,y,z or x,y points in the internal coordinate system of the physics environment data accessed by the physics engines. In addition, duplicate points and small route segments in the behavior data, both of which represent unnecessarily transmitted data, are removed.

While there is one and only one master synchronizer for each client object in the virtual world of the simulation, the master synchronizer 711 spawns, in each simulator station computer system 703 to which the simulated entity or client object is relevant, creation of a respective slave synchronizer 713 for that station's physics environment. As a result, for each client object relevant to the simulator station 703, there is a respective instance of the slave synchronizer program 713 that controls the client object. Master synchronizer 711 transmits synchronizer behavior or route data for the associated client object over the network 707 to slave synchronizers 713 at the various distributed simulation stations 703.

The Slave Synchronizers

At each simulation station 703, the slave synchronizer 713 receives the synchronization route data, and interacts with the physics engine 715 of that station 703 to cause the client object to follow the directed route in the stored physics-based environment so that, in the associated simulator system 703, the client object meets the goal or goals specified by the synchronization route data within the specified time or time-dependent constraints. The slave synchronizer 713 is preferably a software program running on the computer system of the simulation station 703, and one copy of the program runs on each simulation station in which the client object is relevant to the local simulation. The physics engines 715 of the simulation stations 703 are preferably connected as parts of the physics backbone discussed above, exchanging physics data over the system as discussed above, with physics management software running on the simulation system assigning the responsibility for physics of the objects as has been set out previously herein.

The local slave synchronizer program 713 receives the synchronizer data as input from a link to the network, and controls movement of the client object in the local physics environment simulation by passing or transmitting to the physics engine 715 physics data reflecting appropriate forces to be applied to the client object or to its component virtual objects, e.g., the drive wheels of a vehicle, or the parts of an exploding device, that will cause the client object to move to reach the goal at the appropriate time. The physics engine 715 in turn calculates the solution of the physical forces introduced that reflects the consequences under the internally-define physical laws of the physics engine 715 of the forces from the slave synchronizer (and any other synchronizers in the station 703), meaning changes in location or orientation or velocity of one or more objects in the virtual scene. The physics engine modifies the physics data stored therewith, and aspects of the physics data, i.e., the new locations of objects in the virtual scene, are passed or moved to be incorporated in the scene data 717 stored at the station 703, similarly to the procedure described above. The image generator 719 accesses the scene data or data derived renders imagery from the scene data which is then displayed to the user at the simulation station 703 at whatever display device 721 is associated with the station 703. In addition, the slave synchronizer 713 accesses the scene data to determine the updated location of the client object after the physics data transmitted to the physics engine is implemented in the virtual environment, as will be expanded upon below.

A key aspect of the synchronizer system is that the local slave synchronizer 713 has direct access to the client object as it is modeled within the local physics environment and can therefore provide tightly-coupled, high-frequency control of the physical model used at the simulation station 203. Due to this local control, the simulating application 709 does not need to attempt to provide this high frequency control across the network.

Master synchronizer 711 in this illustration is part of a server 709 without an image generator or viewer. However, the master synchronizer may be on a system such as stations 703 that has a physics engine and image generator. In that case, the master synchronizer transmits force data to the physics engine, which calculates the effect of the force data on objects in the scene according to its internal physical rules, resulting in a modification of its internal physics data defining the world. The changes to the physics data of the physics engine are transmitted to the local computer system of the station 703 and the scene data used to generate the imagery on the simulator display is updated, and the local image generator displays the modified virtual world based on the physics data.

In addition, as will be expanded on below, the client computer system that is running the slave synchronizer is configured to, under the appropriate conditions, to load appropriate software and become the host computer that runs the master synchronizer for a virtual object.

Operation of the Synchronizer System

The behavior applications 709 of the system determine the timing and route of movement for the associated client object according to the type of object it is.

Generally, there are two classes of simulated client objects and associated synchronizer algorithms that are the basis of most synchronizer implementations: (1) simulated objects that exhibit behavior, and (2) simulated objects that do not exhibit behavior. Examples of objects that exhibit behavior are vehicles and personnel. These objects generally conduct themselves with a purpose and toward the achievement of a goal. Examples of objects that do not exhibit behavior are buildings or shipping crates. Objects such as those tend to remain in their initial state unless acted upon by some external force.

Synchronizers for objects that exhibit behavior implement algorithms with two characteristics. First, a deterministic algorithm defines the immediate goal of the object behavior. Second, a closed loop control algorithm that understands the nature of the physical model drives it toward the immediate goal. This provides the advantage that once the goals, relevant time parameters for the goal, and a start time, have been communicated between master and slave synchronizers, no further network communication is necessary for the objects to achieve their goals and to remain in synchronization. Network latency ceases to be an issue, because the deterministic goals allow the objects to move without constant control over a latency-affected communications link.

The closed loop control solves the possible issue of divergent physics engine solutions at different simulation stations that could result if left to run under open loop control. The closed loop control also addresses the possibility that an object in the local physics environment may not follow the path that the controlling simulation intended. The closed loop control quickly corrects any perturbation from the intended path due to interactions with other objects within the local physics environment.

Generally expressed, the slave synchronizer operates according to a closed loop to cause the client object to achieve the goal at the correct time. In the closed loop, the slayer synchronizer receives the route data and derives from that data a current set of physics data for the client object configured to cause the client object to advance toward the goal, and that data is passed to the physics engine, which implements the physics data for the client object in the virtual physics environment data according to the physics rules, resulting in change of the scene data. The scene data is also accessed by the slave synchronizer, which calculates a new set of physics data based on the updated position of the client object in the scene data and on the most recent route data that has been received from the master synchronizer, and new physics data is derived for the client object to cause it to reach the currently specified goal at the currently specified time. This new physics data is passed to the physics engine, and the scene data is again updated. The cycle is completed within the duty cycle for the image generator in refreshing the rendered video images displayed to the user at the simulation station, e.g., 1 Hz, and is preferably substantially faster.

The slave synchronizer 713 at station 1 performs a process in which a determination is made whether there is a conflict in the physics-based environment preventing or delaying the client object moving according to the desired synchronizer route data, and, where there is such a conflict, the synchronizer adjusts its physics data for the client object to compensate for the obstruction or delay to try to cause the client object to reach the goal point at the appropriate time.

According to the preferred embodiment, at each cycle of the slave synchronizer, a calculation derives the appropriate point in the virtual world where the client object should be if proceeding along the identified route at the prescribed rate and with the directed starting time. This is compared with the current actual virtual location of the object according to the scene data. The difference is used to compute appropriate physics data that is configured to cause the client object to accelerate (or decelerate if it is moving too fast for the rate) and to get the client object on to the route if it has gone off the prescribed route.

Compensation for Delay

Figure 30:
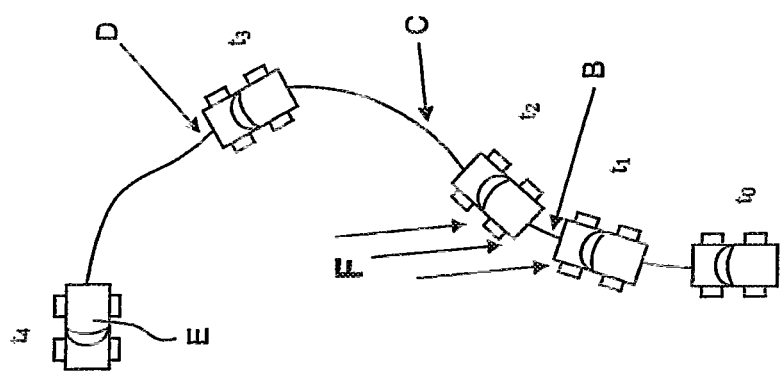
FIG. 30 is a diagram of the synchronizer control of the simulated vehicle where delay occurs in the prescribed route.
Figure 29:
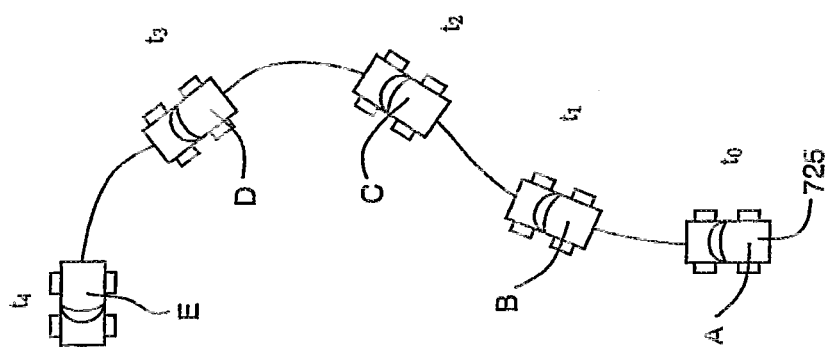
FIG. 29 is a diagram of a desired route for a client object vehicle in the virtual world of the simulation scene data.

Operation of the synchronizer system of the preferred embodiment is illustrated by an example shown in FIGS. 29 and 30.

FIG. 29 shows a desired route for the client object vehicle. The synchronizer data for the client vehicle 725 includes the definition of the destination point E, and the intervening points B, C and D through which the vehicle 725 is directed to pass, as well as timing data that preferably includes data defining a rate for the route or arrival times for at least the end point ($t_4$), starting at time $t_0$. Based on the specified rate, the slave synchronizer calculates that vehicle 725 is to be at points B, C, D and E at times $t_1$, $t_2$, $t_3$ and $t_4$, respectively, and/or optionally arrival times $t_1$, $t_2$, $t_3$ and $t_4$ for points B, C, D and E on the route may be present in the synchronization data. The synchronization data includes at a minimum the time and place data on which the slave synchronizer can derive that the vehicle 725 is to arrive at point E at $t_4$ after passing through the intermediate route points defined, and from that derive the appropriate timing of the intermediate arrivals.

FIG. 30 shows a scenario that may arise in the physics environment, and the consequent local scene data, at a given simulation station 703 remote from the behavior application computer system 705. In the local physics environment, an external force F interacts via the local physics engine 715 at the simulation station 703, delaying the vehicle 725 in its timely progress along the route.

At time $t_1$, the local slave synchronizer 713 determines that the client vehicle has been delayed and has not yet reached point B, as directed by the synchronization data. The local slave synchronizer 713 therefore acts on the physics engine of the station 703 to accelerate the client vehicle 725, i.e., increasing the forces moving the vehicle forward or increasing torque on the drive wheels of the vehicle, after $t_1$ so that the vehicle can make up for the delay.

At time $t_2$, the vehicle in the example is not yet at point C where it should be, so further acceleration (up to an appropriate limit for the simulated vehicle) is applied to the vehicle 725. At time $t_3$, however, the vehicle being simulated has not yet, within the physics rules constraints of the physics eng, been able to reach the scheduled point D. The slave synchronizer applies further acceleration as permitted by the simulated vehicle constraints stored therein, and gets the rate of the vehicle above the appointed rate, so that the vehicle reaches the endpoint of the route E at the proper point in time, $t_4$. As a result of these accelerations, the vehicle proceeds at a higher rate along the route segments CD and DE than originally scheduled by the synchronization data illustrated in FIG. 29.

Figure 31:
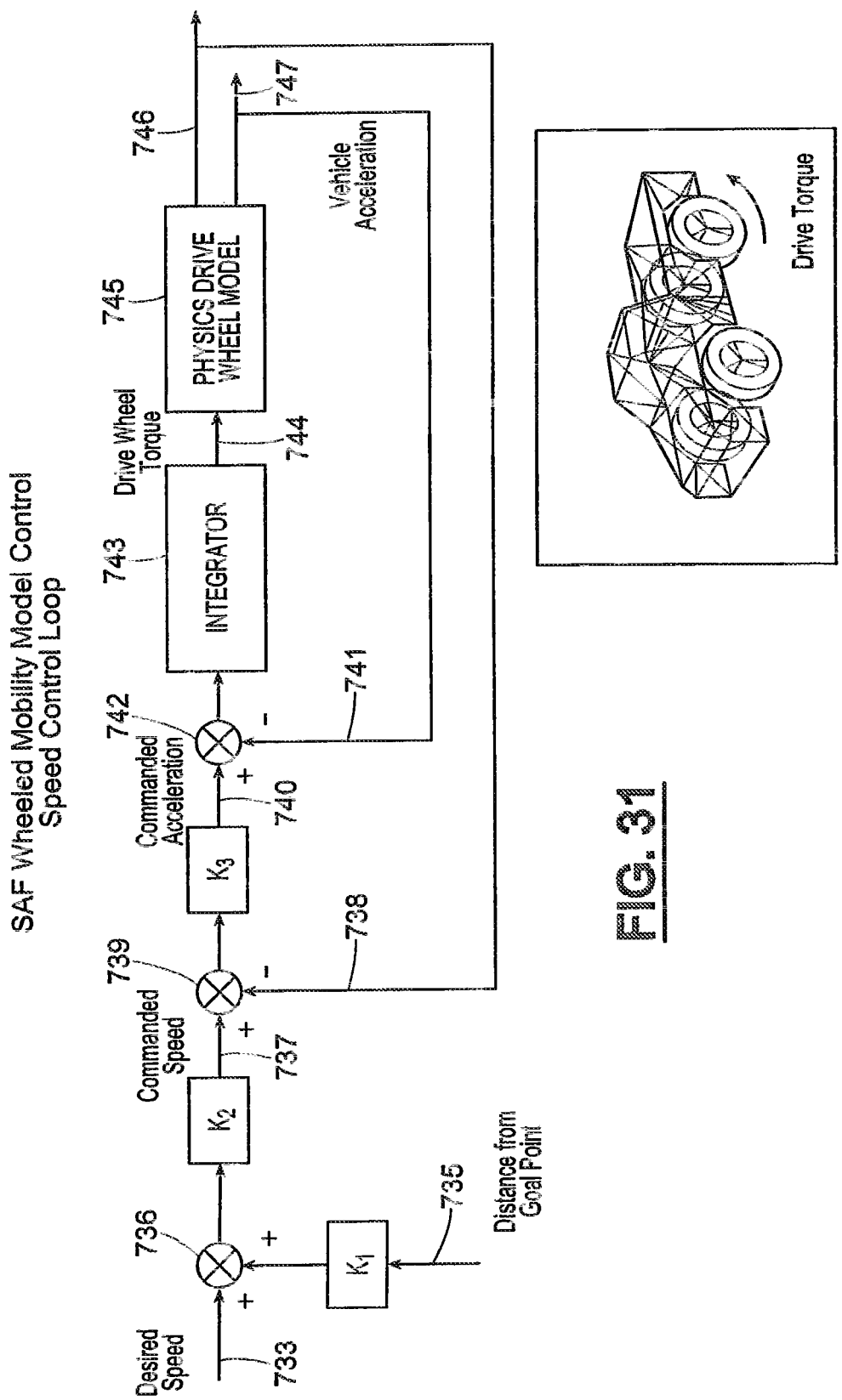
FIG. 31 is a schematic diagram of the speed control loop for a vehicle in simulation.
Figure 32:
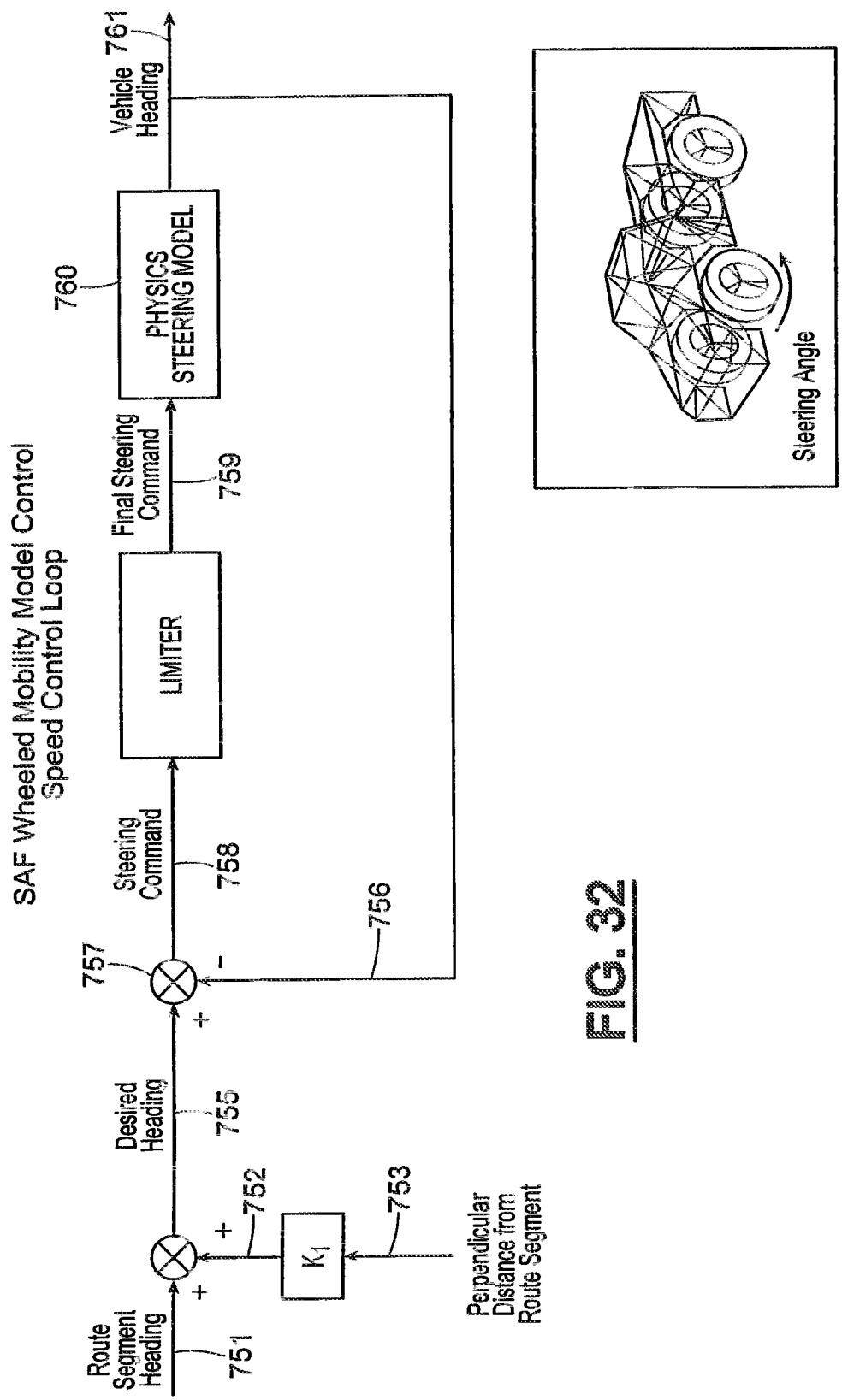
FIG. 32 is a schematic diagram of the steering control loop for a vehicle in simulation.

Vehicle Speed and Steering Control Loops

Where the client object is a vehicle, the slave synchronizer applies the control loop and method diagrammatically expressed in FIGS. 31 and 32 to control its movement. This illustration is expressed in analog format, but the preferred embodiment implements to the logic of the diagram using software recorded on a computer-accessible data storage medium and operating on a digital computer at the simulation station, which computer may share in other activities, e.g., providing the communication link of the physics engine with the physics backbone, or the local portion of physics management of the physics farm.

In this specific vehicle application, the slave synchronizer receives or calculates for a route two values: the distance from the next goal point (e.g., as in FIG. 29, the appropriate point on the route for the current time) indicated at line 733 and the rate at which the vehicle is to proceed to reach that endpoint at the point in time prescribed by the behavior application, indicated at line 735. The distance to goal is then scaled by control gain or constant calculation $K_1$ to yield a data value scaled to the data value of the desired speed, which is actually a distance value for a unit of time, such as the duty cycle. These two values are compared at comparator 736 to yield a difference value, i.e., a speed value indicative of the rate needed to reach the goal point at the appropriate time. This speed value is further scaled by control gain or constant calculation $K_2$ to yield a commanded speed 737. This commanded speed 737 is compared by comparator 739 with the current vehicle speed (line 738) to yield, after control gain or constant calculation $K_3$, a difference value corresponding to a commanded acceleration 740. Commanded acceleration 740 is compared with current vehicle acceleration 741 at comparator 742 to yield a data value that is integrated in step 743 to produce a data value indicating drive wheel torque 744 to be applied to the drive wheel or wheels of the vehicle, which are physically modeled in the physics environment data as independent parts of the vehicle. The drive wheel torque data value is processed by a physics drive wheel model 745, which is configured to determine the specific data values to be defined for application via the physics engine to the physics of the client vehicle, i.e., the vehicle speed 746 and the vehicle acceleration 747. These data values are then implemented in the physics engine so that the client vehicle accelerates or decelerates to reach the indicated goal point at the correct time. The data values are also looped back and the desired acceleration is re-calculated for the next cycle of the loop.

To keep the vehicle on the defined route of the synchronization data, or on a revised route created by the slave synchronizer to avoid an obstacle on the route, the steering direction of the client vehicle is also controlled in the slave synchronizer by a closed loop. FIG. 32 illustrates the operation of this aspect of the slave synchronizer, which is also implemented in the preferred embodiment in software recorded on a computer accessible data storage medium and running on a digital computer system.

In the process disclosed, data defining the route segment heading 751, meaning data defining the direction that the client vehicle is to follow according to the route defined by the associated behavior application, is combined with a data value 752 derived from a control gain of a determination of the distance 753 of the client vehicle perpendicularly from the route by comparator 754, to yield a data value corresponding to a desired heading 755 for the vehicle to follow the route. This desired heading 755 is compared with the current vehicle heading 756 at comparator 757 to yield the raw steering command 758. This data value 758 is limited to a permitted range of steering directions to yield a data value corresponding to a final steering command 759, which is processed by a physics steering model 760. The physics steering model 760 generates a vehicle heading data value 761, which is implemented in the physics engine. The implementation may correspond, as illustrated, to turning the independently modeled steering wheels of the client vehicle, with resulting movement of the vehicle being guided thereby according to the laws of the physics environment. The heading is also looped back and the desired heading is re-calculated, yielding a new steering command for the next cycle of the loop.

Analogous control loop processes, i.e., speed and direction, can be used to control movement of virtually any client entity in the virtual environment of the simulation.

Life Form Movement Control Loop

Life forms, such as human beings, are modeled in the physics world as a column supported on a wheel, for purposes of movement. The column is configured as always vertical, so there is no balance involved in the movement of the life form. The scene data associated with the life form, however, is a more realistic detailed image of the person or animal that reflects its position as defined by the physics environments data but has the other visible attributes of the life form, e.g., head, legs, arms, clothing, fur, etc. The speed of movement of the life form is controlled as above for a wheeled vehicle, with the drive wheel being the wheel of the physics model. The direction of movement of the life form is controlled by applying rotational speed and acceleration about the vertical axis.

The method illustrated in FIG. 33, preferably implemented in software as discussed above, uses a joystick input 771 for the life form, as when an instructor controls a SAF movement in the virtual world. The joystick input is passed through control gain $K_1$ to yield a desired angular velocity 773, which is compared with the actual angular velocity value 774 of the life form from the last command to the physics engine to yield a difference value that is passed through control gain $K_2$, to yield the desired angular acceleration 775. This desired angular acceleration 775 is compared with the actual angular acceleration value 776 of the life form from the last command to the physics engine and is integrated to yield a value representing body torque 777 to be applied to the life form model column. This body torque value 777 is used by a physics life form model 779 to yield an angular velocity value and an angular acceleration value 781, which are sent to the physics engine and implemented in the scene data. These values are also returned and used for comparison as actual values 774 and 776.

Where the control of the life form is by a software application running on a simulation computer system, and not by human input, as by a joystick, a similar process of control loop is employed, but where a desired angular rotation and velocity are calculated by the slave synchronizer using the synchronizer route data. A comparison of the desired heading and the desired rate are made as with the vehicle above, and are implemented similarly to keep the life form on route and on schedule per the synchronizer route data.

Human input controlling entities in the physics based environment is normally accomplished by input from an instructor station equipped with an input such as a joystick, and a display showing the virtual environment to the instructor. Instructor control of virtual entities is not limited to SAF entities or life forms. The instructor can assume control of any virtual entity in simulation where that entity is capable of movement. Furthermore, the compute system local to the instructor will become the system that supports and hosts the master synchronizer for the object until the instructor relinquishes control.

Other Operational Aspects

Figure 25:
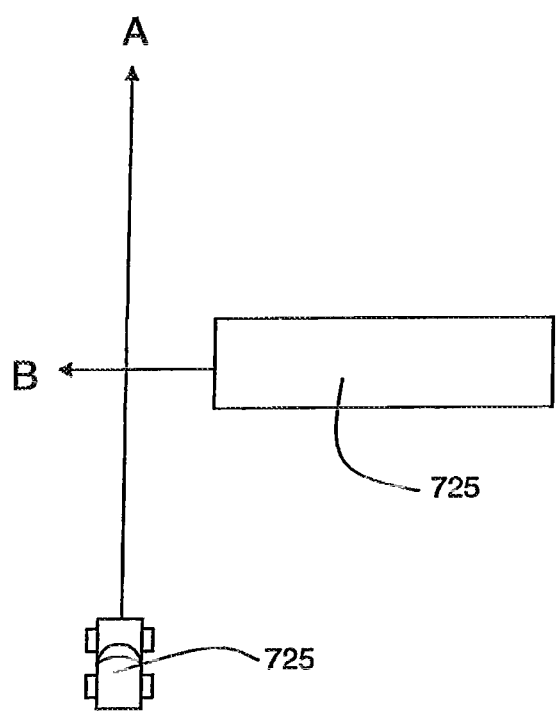
FIGS. 25 and 26 are illustrations of exemplary object movements that can produce divergent solutions in the scene data of simulators that are separated by a network connection that introduces latency.
Figure 26:
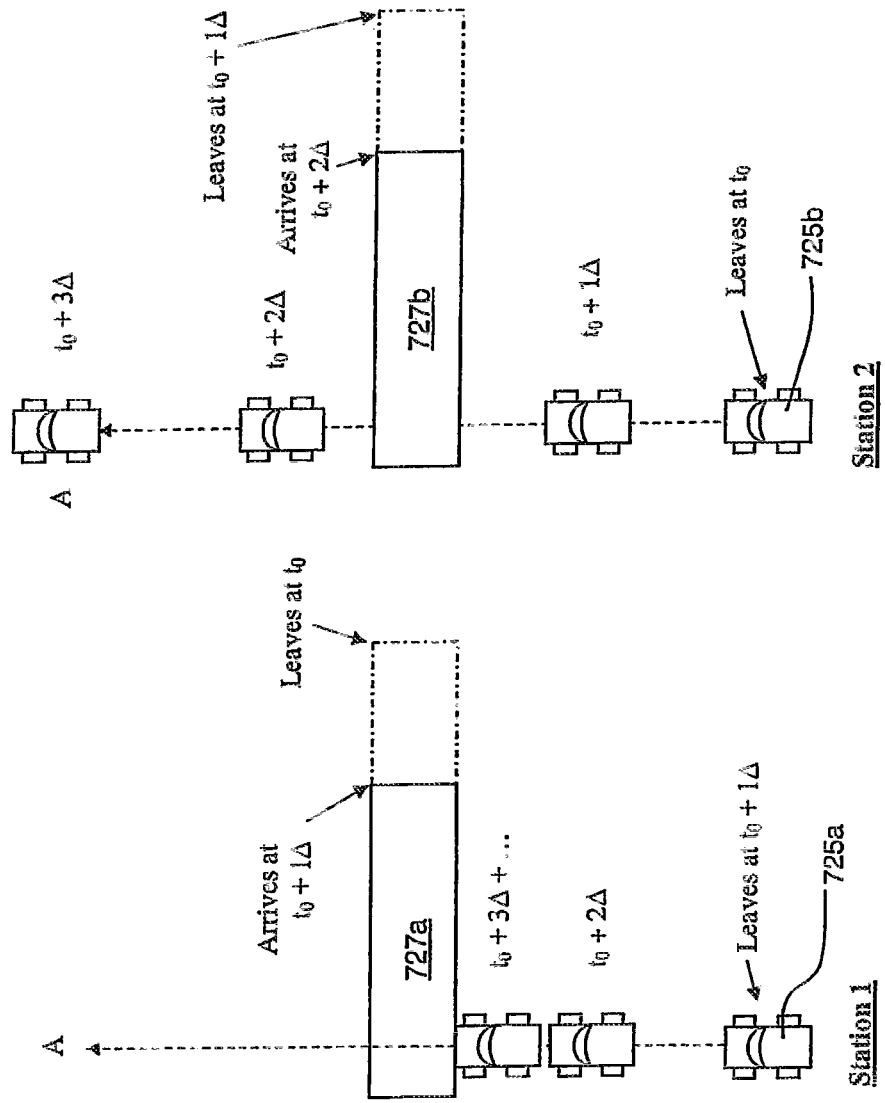

A simple example of one of the potential problems that can be encountered with the physics engine system, e.g., differing physics-based conflicts among the distributed simulation systems, is illustrated in FIGS. 25 and 26.

Referring to FIG. 25, the exemplary virtual world includes two objects: a SAP vehicle 725 that, according to its associated behavior application, is instructed to proceed immediately to point A, and a virtual object 727 that is being propelled by some force to move to point B. In the example here shown, both of these movements are to occur in roughly the same time window in the overall system simulation. However, if the instructions to objects 725 and 727 are delayed differently at different simulation stations due to a latency $\Delta$, then the results may be divergent.

As best seen in FIG. 26, according to this illustration, in a system without the synchronization here described, at station 1, the vehicle 727a in station 1 leaves at $t_0+\Delta$, while the block 727a starts moving at $t_0$, reaching an obstructing or blocking position at $t_0+1\Delta$. The vehicle 725a meets the block 727a at $t_0+3\Delta$, well after the block has arrived, and is prevented by the physics rules from proceeding to point A as directed, because of a conflict with the block 727a.

On the other hand, at station 2, the latency delays block 727b, but not vehicle 725a. Vehicle 725b starts out on its route at $t_0$, but at station 2, due to latency, block 727b does not start to move until $t_0+1\Delta$, only reaching its position blocking the route at $t_0+2\Delta$. By that time of $t_0+2\Delta$, however, the vehicle 725b has already passed the location of the obstruction, and proceeds to point A without obstruction as directed.

As a result, the scene data defining the two virtual worlds of station 1 and station 2 reflect two divergent solutions, one in which the vehicle gets to A, and the other in which the vehicle is obstructed by the block and never reaches point A.

Where the master-slave synchronizer system is applied to the systems of the illustration in FIG. 26, this problem of divergent solutions is avoided. The master synchronizer for the vehicle 725 transmits synchronizer data to the slave synchronizers at stations 1 and 2 that directs the vehicle 725 to proceed to point A, and that includes data defining a start time $t_0$ for the movement, defining the route by coordinates of at least point A, defining a rate of travel along the route certain rate so that vehicle 725 arrives at point A by a certain point in time, e.g., $t_0$+x, and, optionally, defining the specific desired ETA $t_0$+x at point A.

At station 2, the slave synchronizer transmits or passes physics data for the vehicle to the physics engine at that station that causes the physics engine to move the vehicle, or its constituent virtual parts, in the physics environment data at an appropriate rate and reach A at the appropriate time. Due to the latency delay in the start of the movement of block 727, by the time that the block 727 arrives at an obstructing position, the vehicle 725 has already passed the obstructed part of the route to A. The vehicle proceeds to point A by $t_0$+x at the specified rate along the route. Because there is no conflict with the block, the movement is essentially the same as the movement of the vehicle 725 at station 2 in FIG. 26.

At station 1, in contrast, due to latency in the communication of the desired vehicle movement, the vehicle 725a starts moving, but, due to the absence of latency for the block at station 1, the block 727a arrives quickly enough to block the route of the vehicle 725a to A, resulting in the conflict as illustrated in FIG. 26. This is implemented in the scene data and rendered by the image generator, and the user at station 1 sees the contact of the vehicle with the obstruction on his simulator display if it is part of his appropriate view of the virtual world.

In the next cycle of the local slave synchronizer 713 of station 1, the local slave synchronizer 713 compares the obstructed position of the vehicle 725a (against the block 727a) to the position in which the vehicle 725a is scheduled to be in, based on the start time and the rate data values from the synchronizer data (on the other side of the obstruction 727a). Based on the determination that the vehicle is delayed, the closed loop control of the synchronizer 713 transmits physics data to the physics engine to move faster. This will result in an increase of force from the vehicle pushing in the physics environment on the obstruction 727a.

If the vehicle is able to generate enough force, pursuant to its model in the local synchronizer 713, it will eventually push the block 727a out of the way. The result of the pushing is resolved by the physics of the conflict, e.g., by how heavy the virtual object 727a is supposed to be in the simulation. Ultimately, there are three possible outcomes: the block is pushed out of the way, there is a deflection of the vehicle from the route, or the vehicle is obstructed.

Where the block is simply pushed out of the way, to the extent that the block has delayed the vehicle, the vehicle will push the block out of the route, and then accelerate to reach the goal point A by the prescribed time.

Where the block is partially pushed out of the way, but the vehicle is deflected from the route, a similar result will follow: the steering control loop of the synchronizer will guide the vehicle back to the route, and the vehicle will accelerate to the goal point A to get there in time.

In either of these two cases, the physics farm will subsequently resolve the position of the blocks 727a and 727b (and of the block in any other simulation stations across the system) to conform to a single position in the virtual physics environment and the virtual world defined by the scene data by a positional update over the entire simulation system. As a result, after a short period, the solutions of stations 1 and 2 will not be divergent if the vehicle can push the block 727a out of the way in its route.

In contrast, where the vehicle is obstructed and unable to push through the block, a different remedial action is taken by the synchronizer to ensure that the vehicle arrives at the goal point at the appropriate time. The inability of the vehicle 727a as modeled to generate enough force to move the obstruction 727a out of the way, will result in a delay that will continue for a period of time with the vehicle effectively obstructed by the block 727a. The synchronizer in this situation determines that a delay has been created that is not remedied by acceleration of the client object.

The determination of obstruction may be made in a number of ways. For one, when the client object should be moving, but its rate of movement is zero or below a predetermined threshold value, for a single cycle or for a time period that is longer than a predetermined time period or a threshold number of cycles of the synchronizer loop, it is concluded that the client object is obstructed. Alternatively, the conflict may be determined based purely on the contact event and an analysis thereof.

In a further alternate embodiment, the determination of obstruction may be accomplished by extrapolating the route of the vehicle ahead by one, two or more duty cycles of the slave synchronizer and noting if there is any obstruction thereof in the physics engine without permitting the scene data to be modified until the actual intended movement is determined.

Whatever the way the conflict is detected, responsive to the determination of the obstruction of the route, synchronizer 713 takes remedial action to ensure that the vehicle 725a reaches point A in time.

Figure 27:
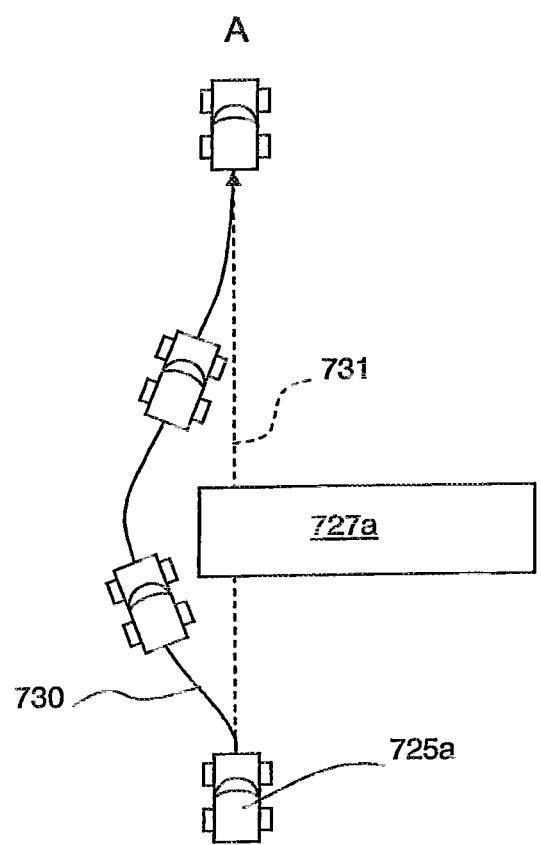
FIG. 27 is an illustration of remedial action taken by the slave synchronizer of the invention to circumvent an obstruction.

One possible type of remedial action is accomplished by the synchronizer by causing the client object to move in reverse for a short period, e.g., a duty cycle of the synchronizer, to disengage from the obstruction, and then extrapolating a new path of movement for the vehicle that circumvents the obstruction. This new path, identified by reference character 730, allows for the vehicle to proceed to point A, circumventing the blockage of the originally intended path 731, and then rejoins the original route 731 after the obstruction, as illustrated at FIG. 27. The new path is determined based on the scene data defining the object that obstructed the route and simply extending a route around the object that meets the original route on the other side of the obstructing object by any route planning program known to those of skill in the art.

A similar action may be taken where the obstruction is detected by projection of the client object route without moving the client object in reverse to disengage from the obstruction. This is done by the slave synchronizer itself, as opposed to determining a conflict using the physics engine. The slave synchronizer accesses data stored at its client system that defines the locations of objects in the virtual environment, e.g., the local physics data or object state data, and determines if any obstructions are in the path of the client object. Responsive to a determination of the presence of an obstruction on the route, a new route is prepared that avoids the obstruction and allows the client object to reach its goal point in time. The route is prepared using any of a number of route-making algorithms, as are well known in the art.

Figure 28:
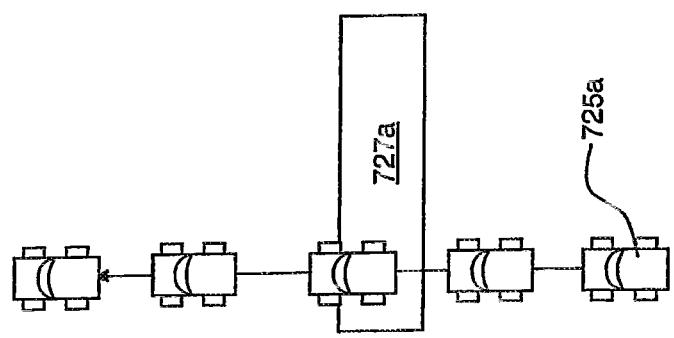
FIG. 28 is an illustration of another remedial action that may be taken by the slave synchronizer of the invention to circumvent an obstruction.

As another alternative, or as a second option where an unobstructed alternate route, such as that of FIG. 27, cannot be found by the slave synchronizer, the synchronizer 713 may direct the physics engine to suspend the physical rules that create the obstructing conflict. As a result, the obstructing effect of the intervening object, e.g., block 727, disappears, which allows the vehicle 725a to proceed to point A as if there were no block of the route. This is illustrated in FIG. 28. Vehicle 725a simply proceeds to point A without regard to the presence of block 727a. In the image generator output, which is based on scene data derived frame by frame from the physics data, including the position of the vehicle, the result will appear to violate the laws of physics somewhat, in that the vehicle goes straight through the obstruction, but this brief appearance of unrealistic imagery is preferable to the greater problem of diverging virtual environments. This suspension of the physics rules may be applied only when certain prerequisite conditions apply, e.g., that a conflict exists, and also that there is no route that can be calculated around the conflict in compliance with the physics rules of the physical objects in the local version of the virtual physical environment.

The suspension of the physical rules is preferably accomplished by the slave synchronizer interacting with the physics engine to make the physics engine act as the obstructing object was not there, but with the restriction that this temporary disappearance of the obstructing object from the physics environment data does not affect the its consequent presence in the simulation imagery generated at the simulation station.

For objects that do not exhibit behavior, the closed loop control aspect of the synchronizer system is ordinarily not necessary but is still available. In such an application of the synchronizer system to a non-behaving object is moved due, e.g., to the application of a force from the physics environment, each physics engine of the physics farm independently solves for the motion of the non-behaving object. When the non-behaving object has come to rest, or has achieved some intermediate position, if the master-slave synchronizer system will cause the slave synchronizer 713 to synchronize the state of the object across the network with a single positional update from the master synchronizer 711 for the non-behaving object to each of its slave synchronizers 713.

Figure 34:
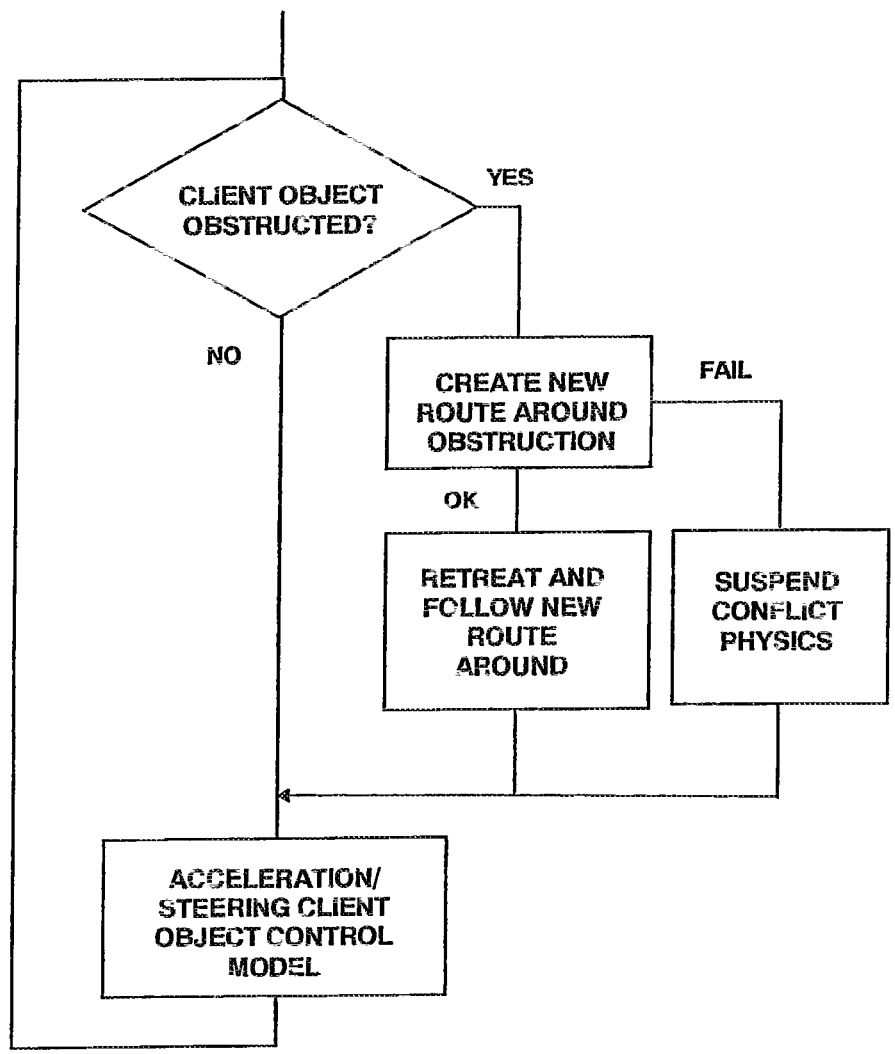
FIG. 34 is a flowchart of the general operation of a slave synchronizer according to the invention.

FIG. 34 shows a flowchart illustrating the operation of the slave synchronizer according to the above process of the preferred embodiment. First, the software determines whether the client object is obstructed. If not, then the synchronizer performs the control loop adjustments of the client object speed and direction as discussed above, and then the loop repeats in another cycle. If there is an obstruction detected, then the synchronizer tries to determine a new route around the obstruction using the physics environment and/or scene data. If it is possible to calculate such a new route, then the synchronizer causes the client object to backup to disengage from the obstruction, and then proceed along the new route using the new route to guide the client object using the client model acceleration and steering control loop. If the synchronizer is unable to calculate a route around the obstruction, then the synchronizer suspends the physics of the conflicting object or objects that are blocking the client object, so that the client object can proceed through the interfering objects without conflict or complying, for a brief period, the physics rules of the physics engine in regard to those obstructions.

Details of Synchronizer System Architecture

Figure 35:
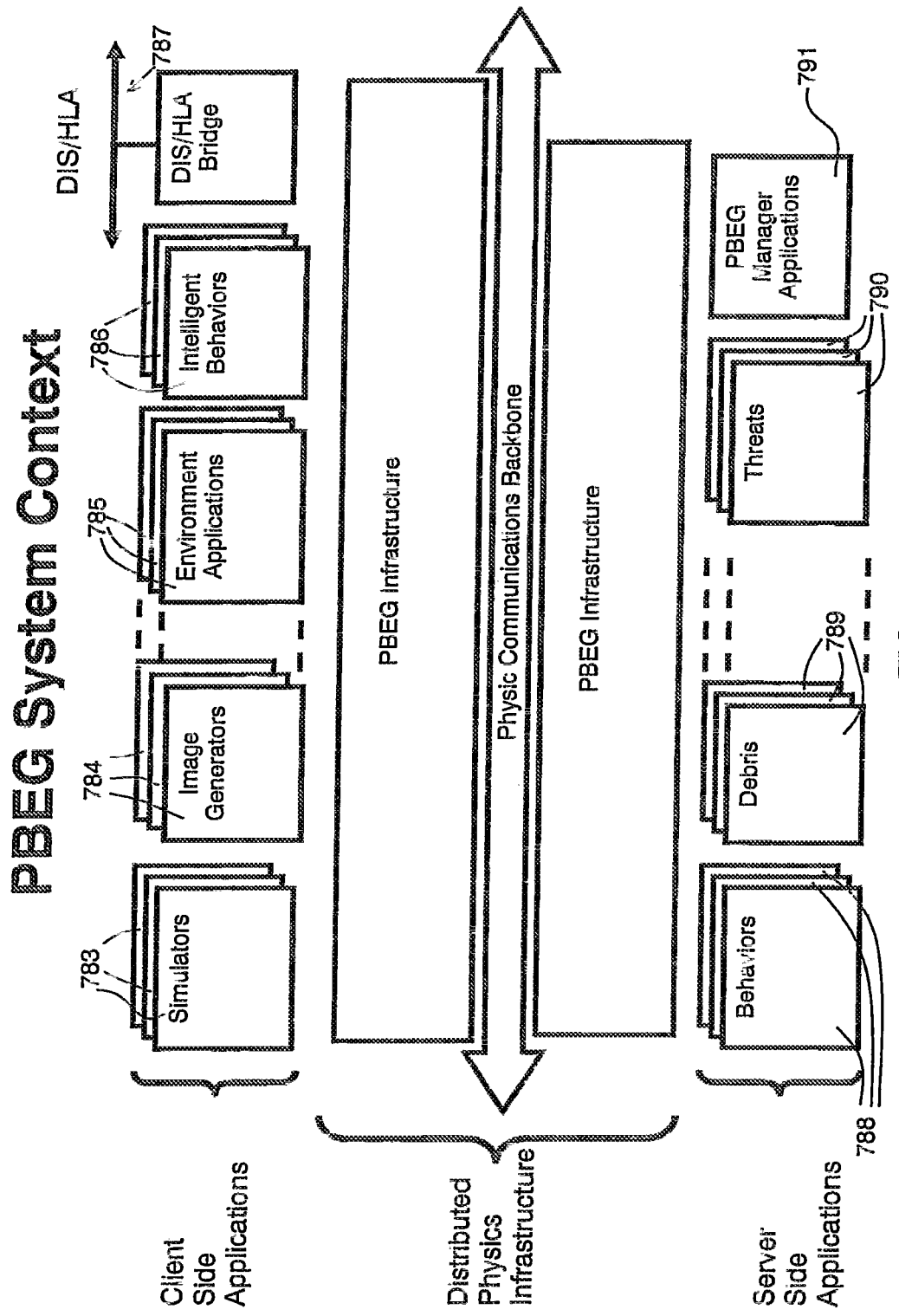
FIG. 35 is a schematic diagram of the physics-based environment generator infrastructure system according to the invention.

The details of the architecture of the system of the preferred embodiment employing the above described synchronizer system is illustrated in FIG. 35 et seq.

As best seen in FIG. 35, the system comprises client side applications and server side applications each connected a physics-based environment generator (PBEG) infrastructure, which is distributed over the system using a physics communications backbone similar to the network discussed above. The client side applications include the simulators 783 of the system, the image generators 784 associated with simulator stations, environment applications 785, applications controlling intelligent behaviors 786, as well as distributed interactive simulations 787 connected via a network bridge, all of which interact with the PBEG infrastructure, providing data to it and/or receiving data from it.

The server side applications, behavior applications 788, debris simulations 789 and threat simulators 790 are supported on one or more servers connected with the PBEG infrastructure, and these also communicate with the PBEG infrastructure. In addition, a PBEG manager application 791 is connected with the PBEG infrastructure, and provides for management of the PBEG infrastructure. The PBEG manager applications embrace a number of modules performing system wide functions to manage the distributed physics-based environment, such as load balancing, exercise control, failure recovery object or synchronizer state, etc.

The various applications are supported on a number of distributed client computer systems, each of which supports a part of the PBEG infrastructure, and are connected via a network, i.e., the physics communications backbone network. Generally, the PBEG infrastructure comprises, at least, at each client computer system associated with it, a memory resident data storage that stores data representing the version, local to that computer system, of a physics-based definition of the shared virtual environment that is updated as described herein.

Figure 36:
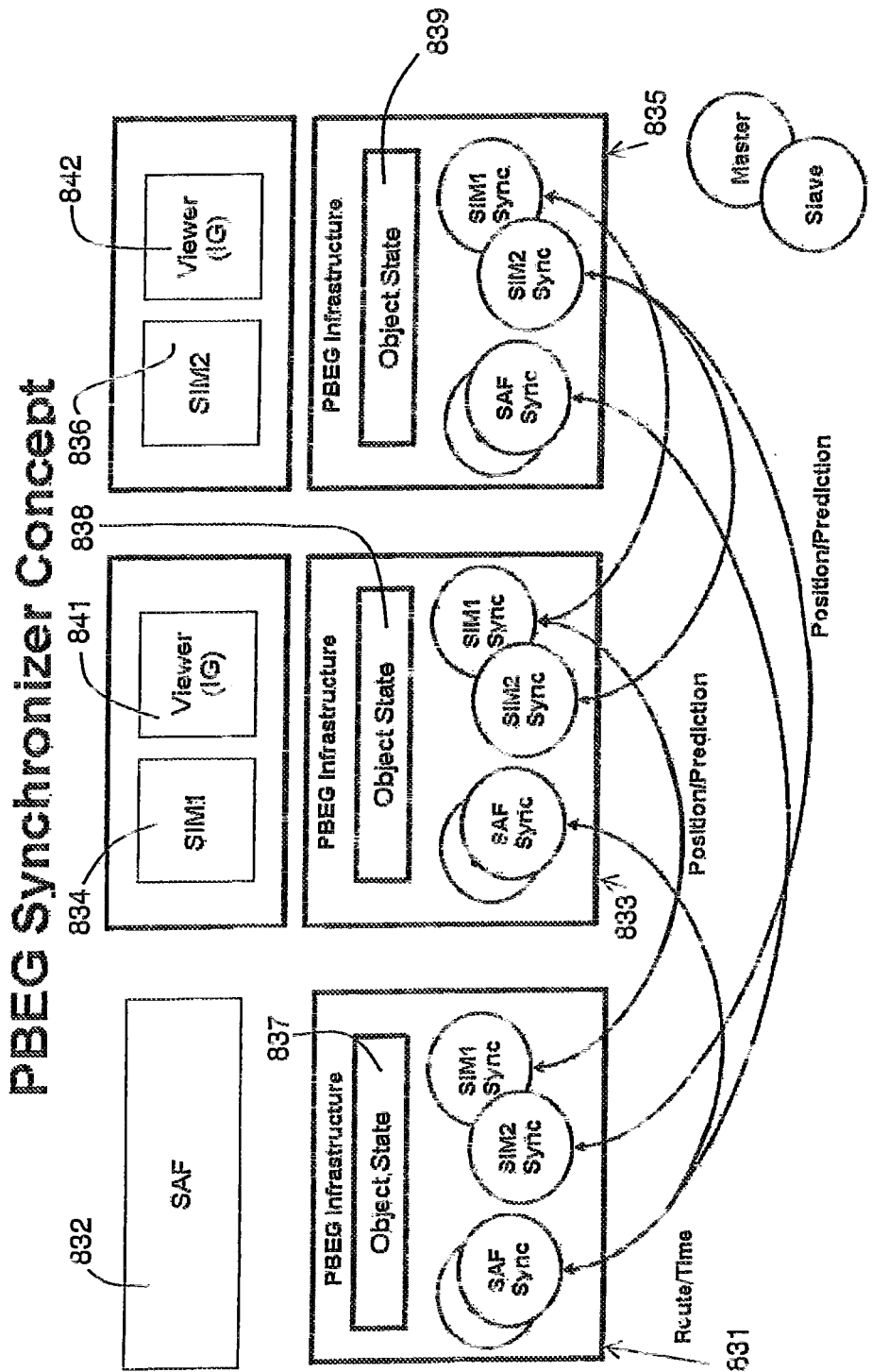
FIG. 36 is a schematic diagram of the synchronizer concept of the invention in a physics-based environment generator (PBEG) infrastructure system.

FIG. 36 shows diagrammatically the general components of the PBEG infrastructure in a distributed system with one SAF client computer system 831, and two simulator stations 833 and 835. Client system 831 includes SAF 832 software controlling operation of a SAF client entity in the virtual environment shared by the distributed systems. The computer system 831 has a PBEG infrastructure 837 that stores in rapid access memory data constituting an object state list, which is made up of data records, one corresponding to each virtual object in the virtual environment, organized for rapid access by an appropriate data structure known in the art, such as hash addressing. Each data record includes data identifying the virtual object by a unique handle, identifier number or label and data defining its location, orientation, and dimensions, this being the data necessary to define the location and condition of the object for generating its image. Color and texture of the object may be part of the data record as well, but are preferably stored elsewhere by the image generator, which accesses that information when needed.

The client system further has a set of synchronizers that are software programs running on the client system 837. One is a master synchronizer ("SAF Sync") that transmits route data for the SAF client being simulated. Also included are synchronizers SIM2 Sync and SIM1 Sync, which are slave synchronizers that receive and implement in the object state data position/prediction data from the simulator stations. The position/prediction data is data indicating movement of the ownships of the vehicles simulated by the simulation stations 833 and 835. The data is derived from the movements of the ownships as defined by master synchronizers SIM1 Sync in station 833 and SIM2 Sync in station 835. The movement of the ownship is generally controlled by the trainee at the simulator and supportive software, and the data reflects this man-in-loop input as well as any physical consequences on the associated ownship in the PBE.

The simulator stations each have respective controlling software 834 and 836 that runs the simulator station to provide realistic interaction with the human user, and also to receive input from the human user, as from simulated cockpit controls. The simulator stations each also have a respective viewer or image generator (IG) 841 and 842 that renders a view of the three-dimensional world defined by the respective stored object state data 838 and 839 of the PBEG infrastructure. The viewers are rendering programs that render images as serial frames of appropriate views from the point of view in the PBE of the respective simulator station, which frames are serially displayed as video at a rate of approximately 60 Hz to provide realistic imagery in the simulator.

In the preferred embodiment, the viewer renders its imagery based on scene data stored on a computer-accessible data storage device, which scene data contains data for each object that defines its location, orientation, appearance, e.g., color, texture, etc. and any other data needed to generate an image of the object. The scene data is kept absolutely up to date by constantly, i.e., at least once every frame cycle (60 Hz in the preferred embodiment), querying the PBEG infrastructure and deriving information regarding the location, orientation and other conditions of the objects therein, and updating the scene data accordingly. This information is stored in the object state list data, which generally is a list of every object in the PBEG environment or scene, with that physics data that is relevant to its representation in the image generator, meaning its location, orientation, and condition (e.g., exploding or dead), which will also affect its appearance in the rendering. The viewer at the simulator station communicates directly with the PBEG infrastructure independently of the other simulator control applications 834 and 836, and can be considered, as illustrated in FIG. 35, as a separate application connected with the PBEG infrastructure.

Figure 37:
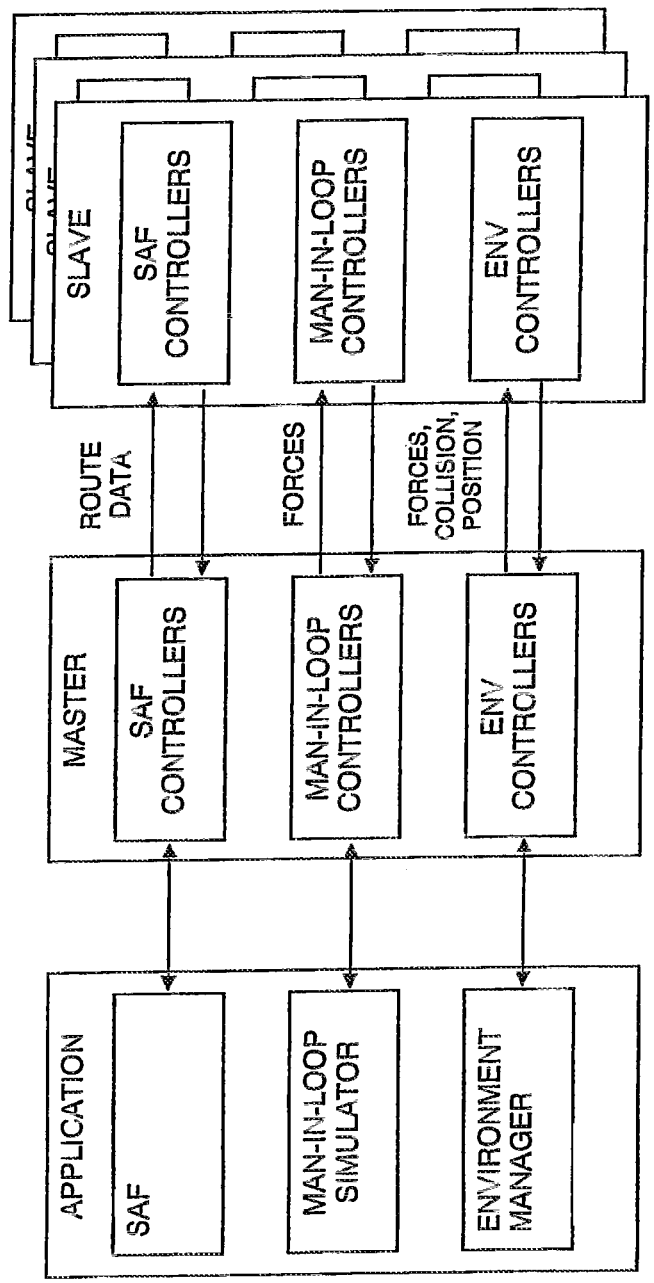
FIG. 37 is a schematic diagram of another aspect of the synchronizer concept of the invention in a PBEG infrastructure system.

Referring to FIG. 37, the operation of the system is illustrated by layers of functionality. The application level may include one of three possible types of application that makes an object in the PBEG environment move: a SAF application that causes one or more vehicles or life forms to move; a man-in-loop simulator, in which a human interacts with controls and causes the objects that make up the ownship of the simulation to move in corresponding ways in the PBEG environment responsive thereto; and environment manager applications, which inject and manage physics based culture features (e.g., barrels, boxes, etc.) as well as activation of intelligent behaviors, such as the movement of life forms or a crowd of civilians), and generally move objects based on instructor input or any of a number of other automatic or scheduled events that cause movement of objects in the PBEG environment.

These applications each interact with the PBEG infrastructure using a respective master controller. There are three types of master synchronizers: SAF controllers, man-in-loop controllers, and environmental controllers. SAF controllers transmit route data to slave SAF controllers across the physics communications backbone network, as has been discussed previously. Man-in-loop controllers transmit force data to slave man-in-loop controllers across the physics communications backbone network, which translates the simulator application output to cause the ownship client objects in the various PBEG environment versions to move as directed by the simulator application. The environment controllers transmit data to slave environment controllers over the physics backbone that represents forces and also collision data and positional update data, which is derived and applied generally as discussed above with respect to the first embodiments of the invention, i.e., by moving objects and resolving conflicts locally, and updating the positions of the client objects, which are then moved locally by their slave controllers to the proper location, which is uniform over the entire distributed system.

Figure 38:
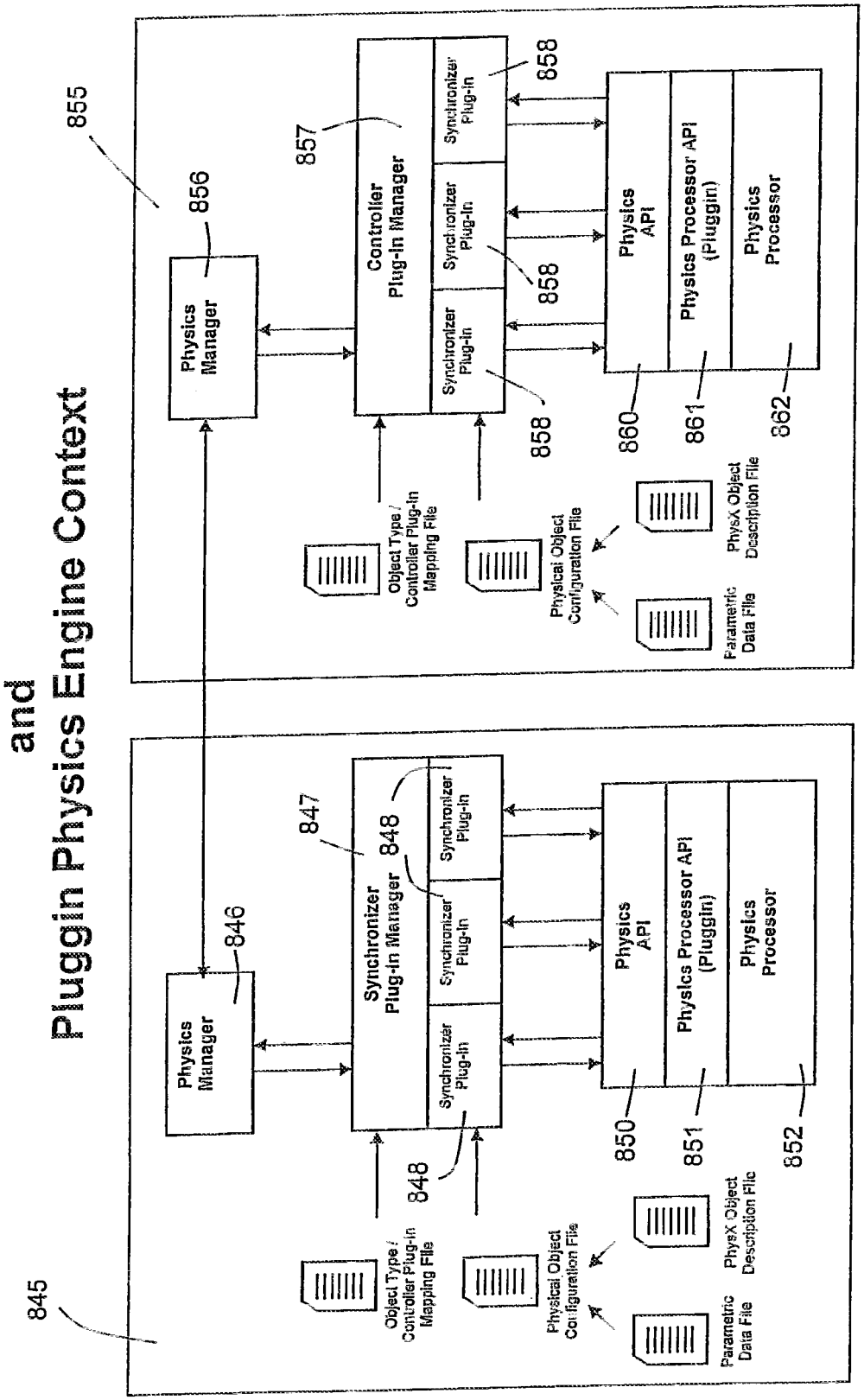
FIG. 38 is a schematic diagram of a plug-in aspect of the synchronizer concept of the invention.

The synchronizers, both master and slave, are essentially the same program module loaded as a plug-in. As illustrated in FIG. 38, the client system 845 that is assigned to be the master synchronizer system has a physics manager 846. The physics manager 846 is a software application that manages the local version of the PBEG object state data. The physics manager 846 communicates with synchronizer plug-in manager 847. Plug-in manager 847, when a client object assigned to it is instantiated, accesses an object type controller plug-in mapping file is accessed, which contains data that causes the plug-in manager to load the correct type of synchronizer (SAF, man-in-loop, or environmental), which is a plug-in that fits any client object of the specified type. Once the correct type of synchronizer plug-in 848 is loaded, it accesses a physical object configuration file that contains data identifying a parametric data file and a PhysX object description file that provides the synchronizer with physics-based data that causes the plug-in to properly manage the physics operation of the object, such as the steering and acceleration of a vehicle.

Each plug-in then begins acting as a master synchronizer, and communicates with the local physics engine, which in the illustrated embodiment comprises a physics API 850 that communicates with the synchronizers and with a physics processor API plug-in 851 that links the physics API with the physics processor 852, i.e., the hardware physics engine of the client system 845.

The physics backbone of the PBEG infrastructure connects with another client system 855, and when the objects are instantiated, the physics manager application 856 of that system activates controller (i.e., slave synchronizer) plug-in manager 857, which loads an appropriate slave synchronizer plug-in 858 based on the object type/controller plug in mapping file for the type of client object that is to be controlled. The slave synchronizer plug-in then accesses the physical object configuration file, and through that file the parametric data file and PhysX object description file, which provide the slave synchronizer plug-in with data that is used to configure the plug-in to control the type of client object. The slave synchronizer plug-ins 858 communicate with the local physics engine, which in the illustrated embodiment comprises a physics API 860 that communicates with the synchronizers and with a physics processor API plug-in 861 that links the physics API with the physics processor 862, i.e., the hardware physics engine of the client system 855.

Subsequent to the initial loading, the master synchronizer 848 continues to transmit the data appropriate to the type of object controlled, e.g., for a SAF, route data, for a man-in-loop object, force data, etc., which is received by the slave synchronizer 858 and used via the local physics engine, to modify the local PBEG environment data stored in the local memory at the client system 855, in a manner described above.

Figure 39:
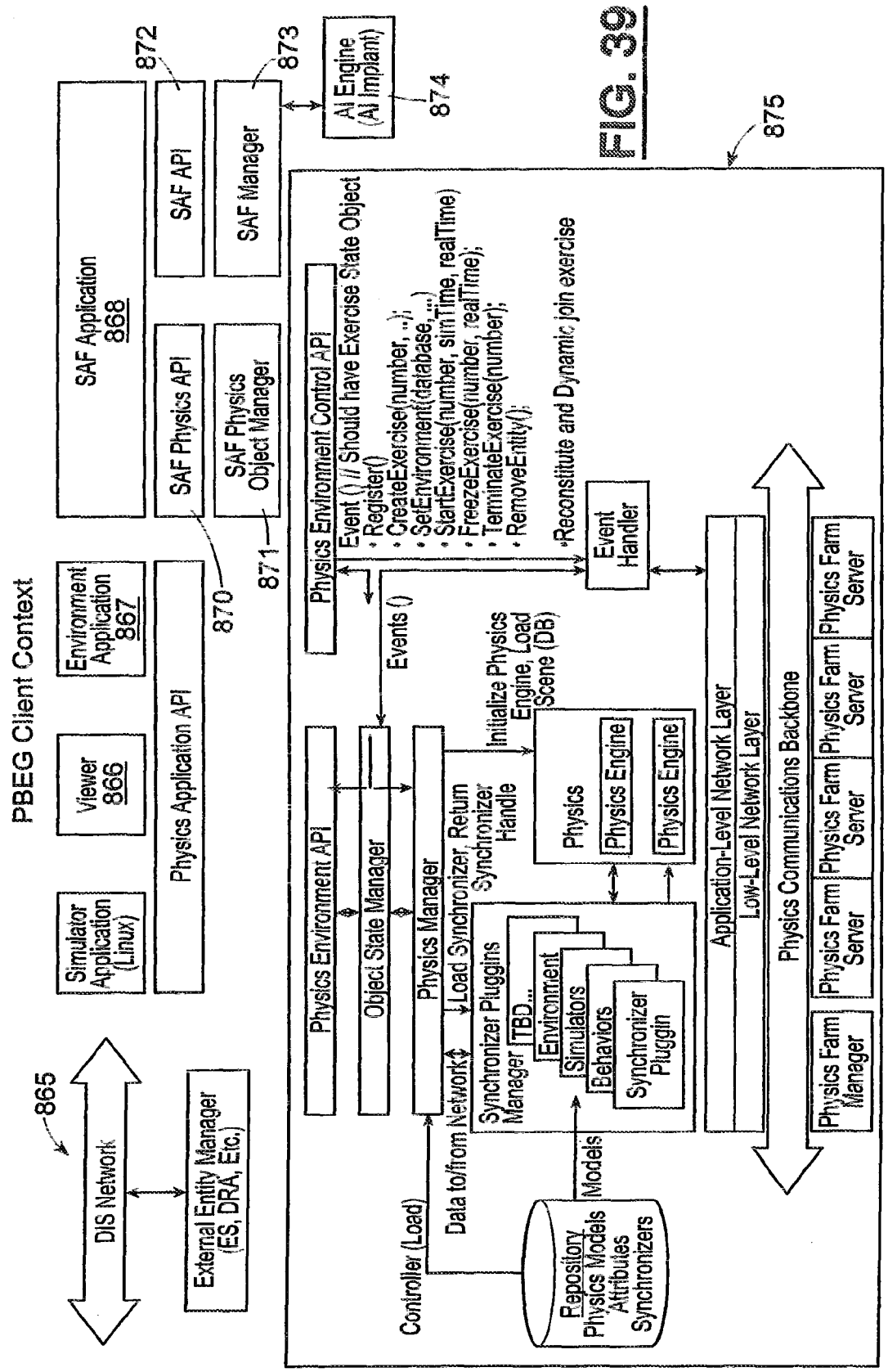
FIG. 39 is a schematic diagram of a PBEG infrastructure system according to the invention.

Referring to FIG. 39, the context of a client system is shown schematically. The client system comprises at least one of a simulator application 865, a viewer 866, an environment application 867, or a SAF application 868, optionally connected with a DIS network 869 linking the client system with an external entity manager using military standard protocols. The external entity manager sends and receives entity data to and from applications that are not physics-based applications, most notably DIS and HLA.

The SAF application is often a traditional military computer generated force modeling application that has been modified or enhanced as necessary to allow it to define modeled forces that can be introduced into the PBEG environment. These types of SAF applications also involves some additional packages, preferably, these being a SAF Physics API 870, a SAF Physics Object Manager 871, a SAF API 872, a SAF manager 873 and an artificial intelligence engine 874 for modeling intelligent behaviors of SAF entities, all of which cooperate to provide for a class of computer generated models to be injected into and managed in the PBEG environment.

All of these modules preferably link directly to the PBEG infrastructure of the client system, indicated at 875, or indirectly to the PBEG infrastructure via physics application API which interfaces to the PBEG infrastructure 875. The PBEG infrastructure 875 part of each computer system is similar in each system, server or simulator station in the distributed simulation system. It should also be understood that not all of the illustrated applications are used in every system. A simulator station, for example, may have only the simulator application 865 and the viewer 866 in addition to the PBEG infrastructure 875. On the other hand, in a server system with no operator, for example, only the SAF application and SAF modules are used with the PBEG infrastructure 875.

Figure 40:
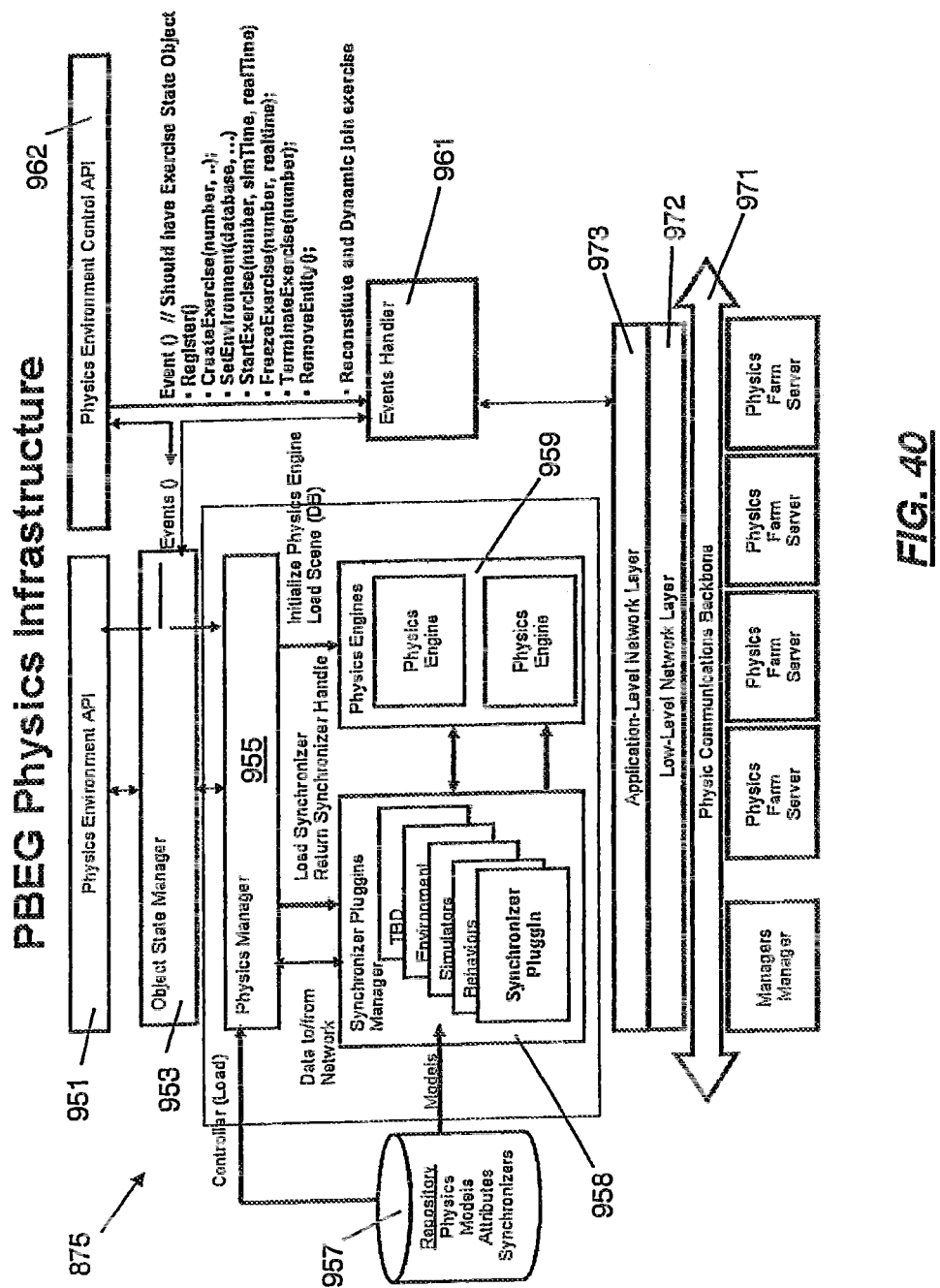
FIG. 40 is a detail view of a portion of the schematic diagram of FIG. 39.

As best seen in FIG. 40, the PBEG infrastructure part 875 of each system preferably comprises a physics environment API 951. The physics environment API 951 provides the application interface to the PBEG infrastructure 875, allows the applications accessing the PBEG infrastructure 875 therethrough to create, remove, apply forces and torques to virtual physical objects, and query virtual physical objects instantiated in the PBEG infrastructure via a handle or pointer usable to access the record via the object state data manager. The physics environment API 951 also provides for initializing the PBEG environment and registering for simulation events and managing event callbacks. Events may be object events, such as creation of the object, deletion of the object, or change in object appearance, or warfare events such as fire event for a weapon or detonation events for explosive devices.

The physics environment API 951 also provides for creating an object in the PBEG environment, responsive to which the physics environment API 951 returns a handle or pointer linking to the object state data record in the object state data list. In addition, it provides for directing an entity object in the PBEG environment, as by giving the object a goal or applying a force to it. It also responds to queries by applications, returning data corresponding to the object state for the object queried.

The object state manager 953 is an executable software module that is responsible for managing an object state data structure or list stored in resident computer accessible memory. The object state list has a record for every virtual object in the virtual scene, and is updated by the object state manager continuously, e.g., once every calculation cycle of the physics engine, or once every rendering cycle of an associated image generator. This update is performed by receiving from the synchronizers or the physics manager data reflecting the purely physics-based data stored for use by the physics engines, and by combining data derived from that physics-based data that is useful in generating an image of the object, such as position and orientation, with other non-physics simulation data, such as health or appearance changes, and attributes set during creation of the object in question, such as the type of entity that it is. The result is a constantly up top date list that contains an organized data structure or list accessible by the viewer application or any other application, that includes a complete object state data record for each object in the PBEG environment. The object state manager 953 also processes object and warfare events, and generates synchronizer requests based on synchronizer requests. The object state manager also modifies the PBEG environment data at the given station to apply, for example, forces indicated by the SAF or man-in-loop application that move an object in the virtual world, via the physics manager 955.

Each object in the PBEG environment has a unique identification number or code, using which the object manager can be queried to return its object state data. The object state manager includes utilities that allow for efficient access of the object state data record for any virtual object in the PBEG environment. This may include the use of a hash table that convert complex entity types to integer, or organization of classes of objects to describe appearance thereof.

The object state manager 953 also provides for initializing the PBEG environment and the objects therein. Objects are created when the object manager receives a create object instruction from the physics environment API, and remote objects are created when a create-object event is received from the PBEG Environment Event handler, which will be discussed below. The object state manager 953 notifies subscribing applications of created, removed, or objects changed in appearance as an object state notification event.

The object state data is directly based on the current physics-based environment data stored in the local computer-accessible memory, which is the foundational data that gives rise to the displayed views of the PBEG virtual environment prepared by the image generator or viewer, and also is the data accessed by the physics engines to ensure that physical laws are followed in the simulated environment. Unlike other systems that rely on the rendering engine and its appearance-related scene data as the foundation of the system that defines the appearance of the virtual world, the present system relies on the physics-based environment data, and then, based on the physics-based environment data, accesses data defining the appearance of the virtual world being viewed at any particular simulation station.

Physics manager 955 is preferably an executable software module that manages physics data and activities of the system, i.e., it manages the system components that create and interact with the physics based environment. Physics manager 955 initializes the physics-based data stored for access by the physics engines by loading the entire physics-based scene database inform a repository 957, i.e., a computer-accessible mass-storage device accessible from the computer system in which the physics manager runs. The PBEG repository contains data that defines the layout of synchronizer objects, physics models, and attributes needed by the PBEG environment to load and manage physics models. The repository provides a utilities package to access the repository.

In addition, the physics manager causes the PBEG synchronizer manager to load the synchronizers for the synchronizer system described above. The physics manager maps the modeled object type and synchronizer class (e.g., man-in-loop, SAF, etc.) to repository naming conventions so that the physics manager, when setting up synchronizers for an object, and directs the synchronizer manager to load the appropriate synchronizer for the given object. The physics manager also acts similarly to the physics farm manager discussed above in that it will assign which synchronizer is to be the master synchronizer.

Once the synchronizers are loaded, the physics manager transfers to the local master synchronizers the movement or force data received from the controlling application, which implement it directly to the physics engine. For example, the simulation application of a simulator station transmits or passes to the local physics manager a pilot's cockpit inputs, which are then passed on to a master synchronizer for the ownship, or for an object that is a part of the ownship, of the simulator station.

The physics manager or the object state manager also communicate the route data for an object that is received over the network or physics backbone to the appropriate slave synchronizer responsible for the object, which processes the route data as set out above.

For efficiency, the virtual world that is shared among the simulator stations is preferably broken up into separate scenes. If a user moves from on scene to another, the physics manager will load a new scene database to the local physics engine, and unload the former scene database, as necessary.

Also, the physics manager receives warfare events from the object state manager, and creates forces corresponding to them in the physics environment stored for access by the physics engines. The physics manager uses stored warfare data, munitions types, and other data regarding weapons in the simulation to determine the magnitude of any impulse force and inputs this to the physics-based environment data. The scale of munitions impulse may be precise, or it may be simply classed as small, medium or large.

Synchronizer pluggins manager 958 receives requests to load synchronizers from the repository, and the proper type of synchronizer specified by the physics manager is loaded. The synchronizer pluggins manager 958 then schedules the loaded pluggin to run and load the appropriate physic module for the client object of that synchronizer. Once the physics model is loaded, the synchronizer pluggins manager 958 is set up and runs in the shell of the pluggins manager 958. The synchronizer pluggins manager 958 schedules the synchronizer to run, and unloads the synchronizer and associated physics models responsive to receiving or detecting that there is a request to remove the object.

The three general types of synchronizer pluggins discussed above are shown in the diagram of FIG. 40, but there are normally a very large number of synchronizers, both master and slave, managed by the synchronizer pluggins manager 958 in each system, since there is one synchronizer per object.

These synchronizers operate as described above in detail, and they communicate with the physics engines 959, which are a wrapper around the COTS physics engines such as described previously, such as the PhysX engine sold by Ageia. The wrapper supports plug and play, and can be used with a variety of different COTS physics engines 959. The synchronizers provide force or torque data to the physics engines, which then calculate a solution that reflects the physical consequences, pursuant to the physical laws of the physics engines, of the forces or torques introduced by the synchronizers on the objects defined by the physics data. The physics engines calculate this solution periodically, preferably at least once per image rendering cycle (preferably about 60 Hz), and the result is modifications to the physics data stored in the physics engine memory reflecting movement of the defined virtual objects.

The synchronizers and the physics engines exchange data back and forth to accomplish movement of the objects as directed by the associated application, and in compliance with the physical laws of the physics engines 959. The interaction preferably includes a closed-loop control of the parameters of the client object of the synchronizer, as was discussed above. In addition, the synchronizers, whether master or slave, transmit at least some of the physics data back to the object state manager, which takes the position, orientation, and possibly velocity or other physical qualities of use in determining the appearance of the object, and stores that viewer-relevant data in the object state data structure or list. As a result, the object state list is an immediate reflection of the location of all the objects defined by the physics data defining the virtual scene as stored in the physics engine memory. In turn, the scene data used by the image generator or viewer to render the imagery displayed reflects the current state of the object state data. The result is that the viewer displays to the simulator user imagery that reflects the virtual environment exactly as it is defined at the moment by the local physics data in the physics engine memory.

PBEG Event Handler 961 provides an interface for the PBEG environment to generate and distribute event messages. It provides for creation and distribution of war events, e.g., fire, or detonations. The event handler 961 also creates object notification events, such as creation, removal, and change of appearance of an object. It also creates simulation management events, and provides a way for components of the system to register for event callbacks, object state, simulation control, and other event notices. Also, the event handler manages registered callbacks, and distributes events based thereon.

The event handler 961 communicates the events, which are the real transactional elements of the system, to the local physics manager 955 and to the network link. Events are any occurrence within the system for which it is helpful or advisable to alert other client systems to, such as the creation of an object, or its transformation, as by explosion, into something else. The event handler also receives the broadcast route data from all the master synchronizers in the system and transmits it to the object state manager 953, which communicates the route data to the appropriate slave synchronizers or controllers for processing into the physics engine as has been described above.

Physics environment control API 962 provides the functionality that allows an instructor to design, implement and/or edit a training exercise by registering client applications, setting the environment, starting or terminating the exercise, or removing the entity. It is similar to, or even redundant with, the exercise management module discussed above.

Events and synchronizer data transmissions go to other client systems over the physics communication backbone 971 to which the client is connected by link layers. Low-level network layer 972 is responsible for opening connections, closing connections, sending data, and receiving unreliable data. Reliable data is processed at the application level network 973.

The network support is based on UDP, the standard Internet protocol for unreliable, connectionless communication. Because of this, the network layers are needed, to be responsible for maintaining a list of connections and handling their time-outs. The network layer is packet-oriented, meaning that all data sent and received via the network later exists in discrete packets.

The network will send the packets of data unreliably. A packet sent from one client system to another might not arrive, might arrive once, or might arrive multiple times. The packets might also arrive out of order needing reassembly. The network layer takes steps to ensure that packets are not corrupted. These include checking the packet that its size and contents are identical to what was sent.

Preferably, the network layer is portable and multi-thread capable. It connects all of the client systems and servers, and any distributed PBEG management applications are routed therethrough. Its essential function is to optimally send PBEG messages on the PBEG communications backbone 971 these services employ multicast schemes to partition traffic, as by exercise, by scene, to pack and unpack messages, and other communication services to optimize the overall data sharing and communication of the network of the backbone.

The application-level network 973 layer sits on top of the low-level network and provides services such as reliable message handling, multicast, message-compression, network statistics, and other message packaging optimizations.

Figure 41:
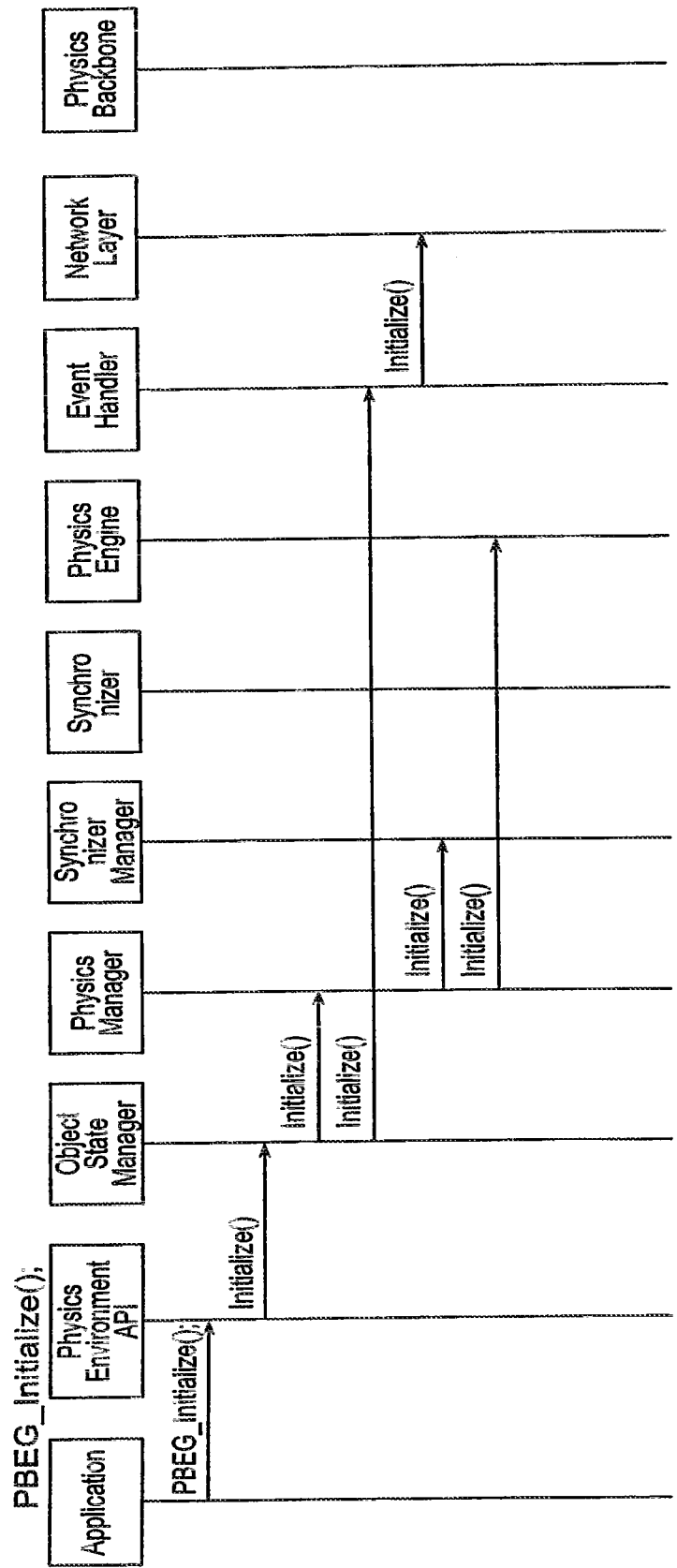
FIG. 41 is a schematic diagram of the flow of data in an initialization phase of the operation of a PBEG infrastructure system according to the invention.

FIG. 41 illustrates the flow of commands in certain types of system actions, in this case, initialization of the system. The application, the simulator application or an administrative startup for a client system, starts a routine named PBEG Initialize, which transmits a request to the physics environment API to initialize. The physics environment API transmits the instruction to the object state manager, which tells the physics manager to initialize the station. The physics manager initializes the synchronizer manager so that it loads the appropriate synchronizers, and the event handler, which sends out a notification over the network. The physics manager also initializes the physics engine, which normally involves loading the physics-based scene data into the resident memory associated with the physics engine or engines in the client system.

Figure 42:
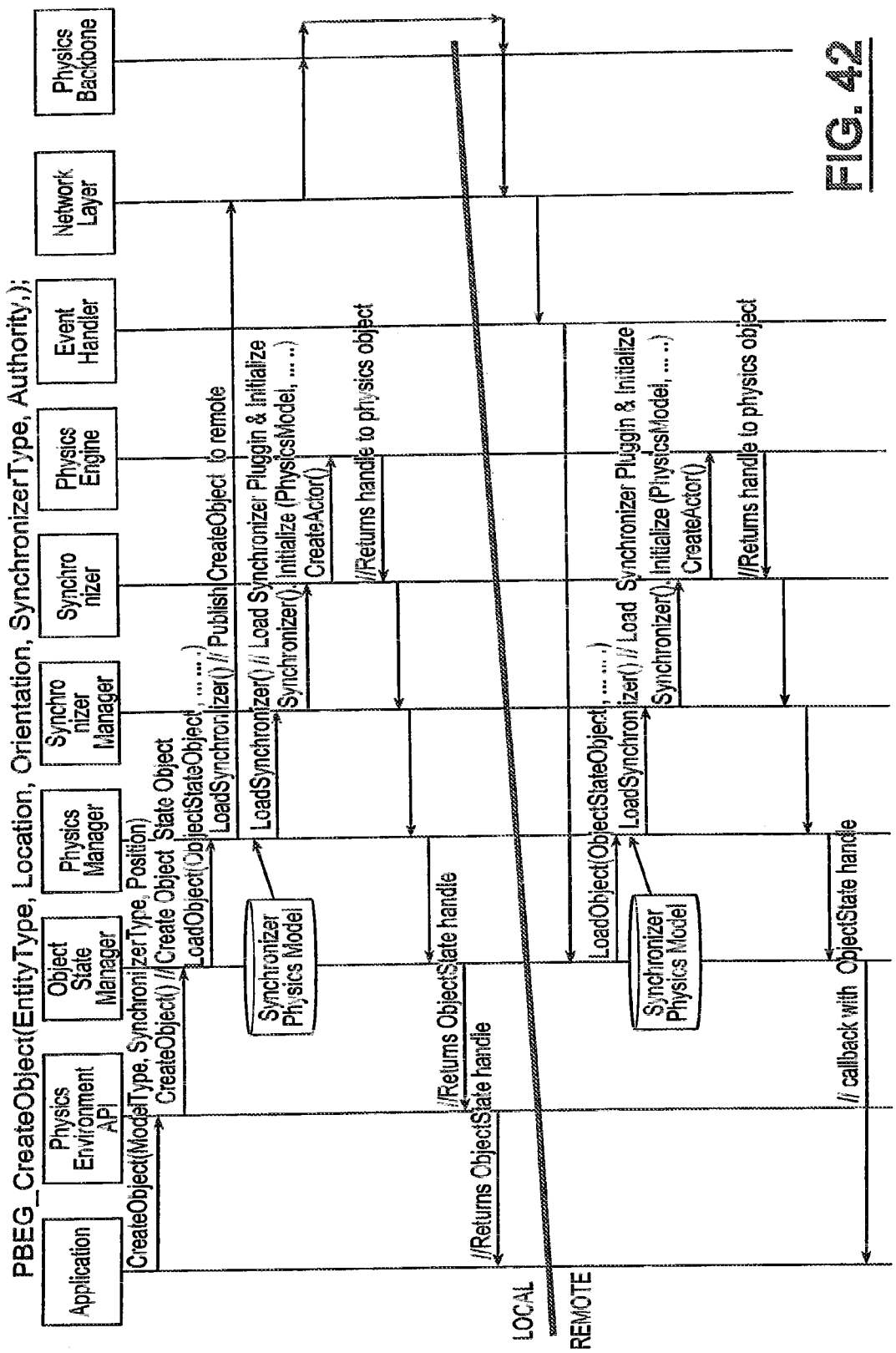
FIG. 42 is a schematic diagram of the flow of data in the creation of a physics-based virtual object in a PBEG infrastructure system according to the invention.

FIG. 42 illustrates the creating of a new vehicle in the system of the invention.

The application, which has adequate administrative capabilities to create an object, starts the CreateObject routine, which communicates with the physics environment API, which in turn communicates with the object state manager to create the object. The object state manager causes the physics manager to load the object from the synchronizer physics model repository connected with the client system on which the programs are running. The physics manager determines the appropriate type of synchronizer, and publishes the notice of a created object to all the other systems over the network, here illustrated as the remote, below the black line. In addition, the physics manager directs the synchronizer manager to load the proper synchronizer plug-in and initialize. The synchronizer for the new object initializes, creating a new master synchronizer for the object, and loads the physics model from the repository into the physics engine memory, and creates the new object in the physics engine, an action which provides in response, a handle to the physics object in the PBEG environment data that the physics engine accesses. This is returned through the physics manager to the object state manager, which creates a record for the new object's object state, and transmits a handle for that object state data record back to the physics environment, which is passed back to the application, or another local application as well, such as the viewer at the local simulation station.

The published create-object instruction goes through the physics backbone to the remote system, where it is received by the event handler, which directs the local object state manager to create the object. In reaction, the local object manager issues a load object instruction to its physics manager, which in turn tells its synchronizer manager to load the plug-in and initialize. The synchronizer loads the synchronizer, which initializes as a slave synchronizer, and a physics model from its repository, and creates the object in the PBEG environment physics data, with routine CreateActor, accessing the physics engine and the version of the PBEG environment data that is stored at the remote system. The physics engine returns a handle (meaning a unique pointer, identifier or address) to the created physics object in the physic engine resident memory, which is passed back to the remote object state manager, which places a record in the object state data at the remote, and transmits a handle linking to that object state data in the object state database. The two client systems, local and remote, after this process, will display the new object in synchronization, provided the object is in the virtual field of view of the respective viewers.

Figure 43:
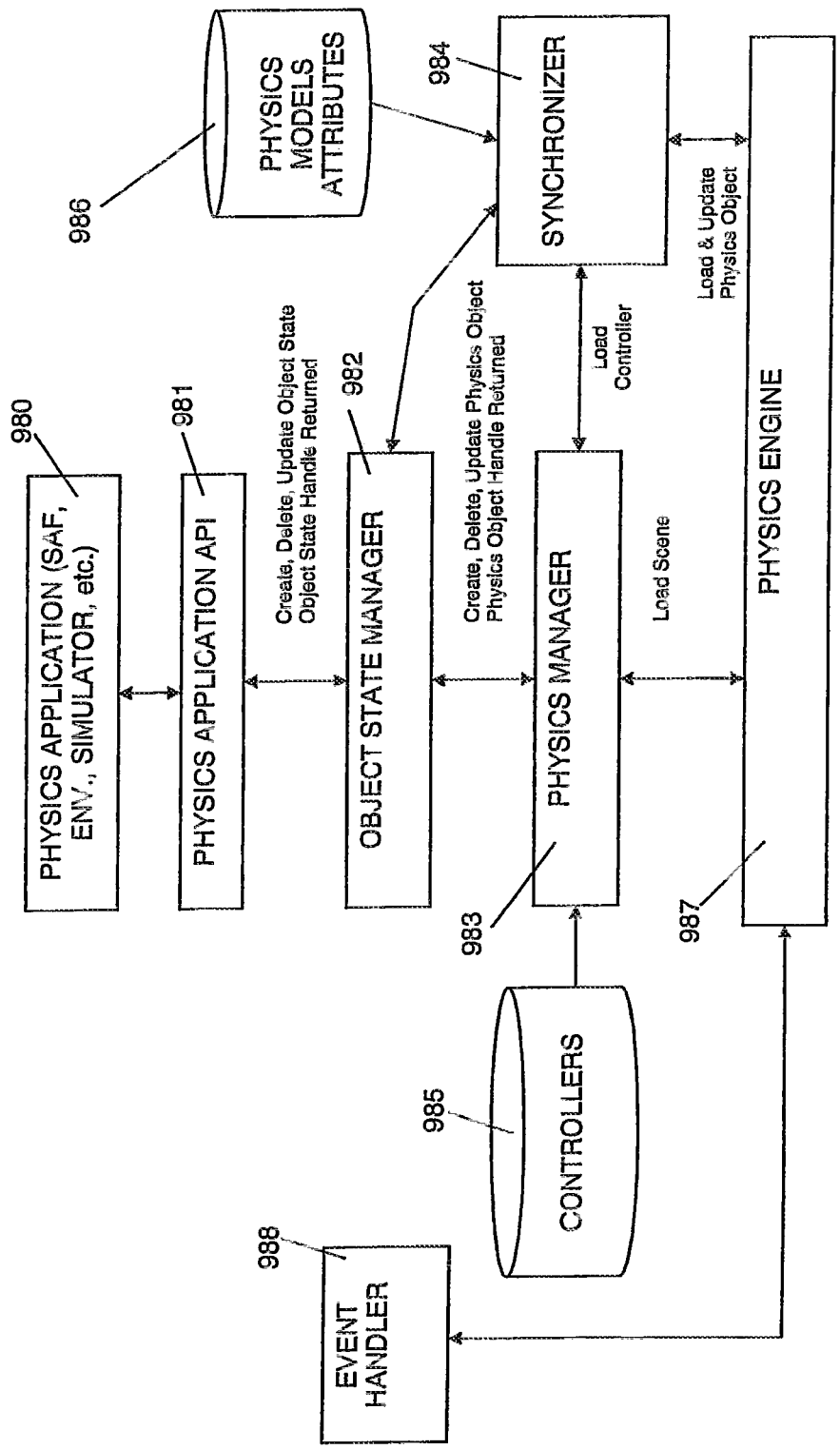
FIG. 43 is a diagram of the flow of data in a client system using a PBEG infrastructure system according to the invention.

The relationship of these components on a given server or client system is illustrated in FIG. 43. The application 980, which may be any type of object-controlling application, e.g., a simulator, a SAF model, an environmental model, etc., interacts with the surface interface application of the PBEG infrastructure, physics application API 981, transmitting to it data indicative of movement or change of the client object affected by application 980. Physics application API 981 receives that information and transmits or passes instructions create, delete or update the object state manager 982. The object state manager 982 receives this data and transmits to the physics manager 983 data containing the instructions to create or delete the object, or to the synchronizer 984 data containing instructions to update the physics object. If the instruction is to create the object, the physics manager 983 loads a controller or synchronizer plug-in from a repository 985, and this becomes the synchronizer 984, which loads into the resident data memory of the physics engine 987 a physics model for the object from a stored repository 986, which may be the same device as the repository 985. If the instruction is to update the object in terms of forces or position, that data is also routed through the synchronizer by a closed loop control to the physics engine memory. Physics manager 983 only accesses the memory of the physics engine if the instruction is to initialize the physics engine 987, in which case, a full scene of physics data is loaded into the physics engine 987 memory. In the event that the update to the object is a transformative event like an explosion, the object state manager 982 passes the instruction to the event handler 988, and also to the synchronizer to transmit the appropriate physics data of the transformation.

Data also flows in the reverse direction. There is the reverse flow of data to the synchronizer 984 from the physics engine 987 as part of the closed loop controller process thereof. This data is returned from the physics manager 983 or the synchronizer 984 to the object state manager 982, together with a handle for accessing the physics of the object if a query is to be made to the physics engine memory. This data is combined with other information to yield the object state data record in the object state list, in which the object's data record includes data storing the handle identifying it. In turn, a handle or address identifying the object's object state data record may be returned to the application via the interface of physics application API 981 to the physics application 980.

Figure 44:
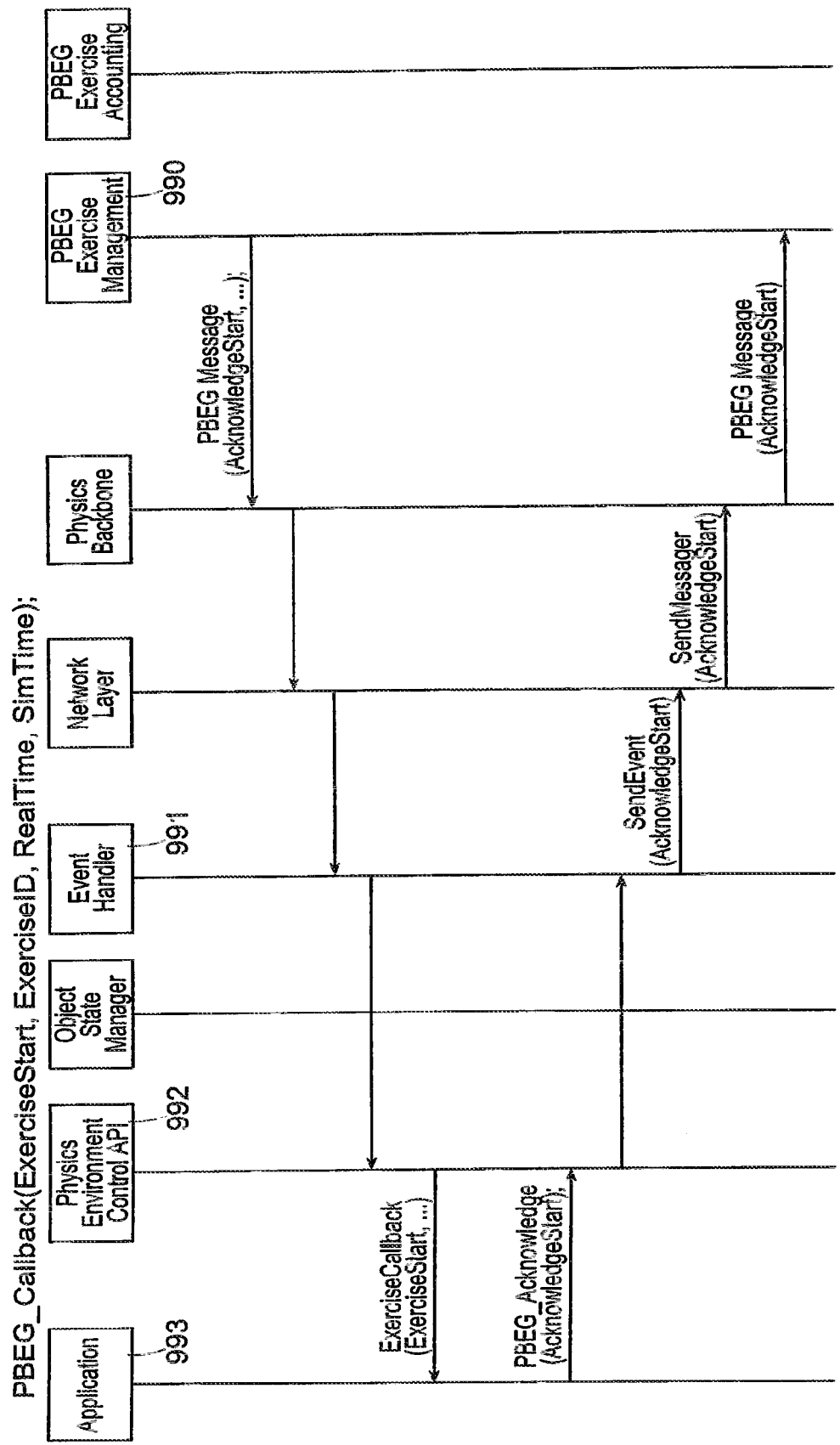
FIGS. 44 and 45 are schematic diagrams of the flow of data to and from a PBEG exercise management application according to the invention.
Figure 45:
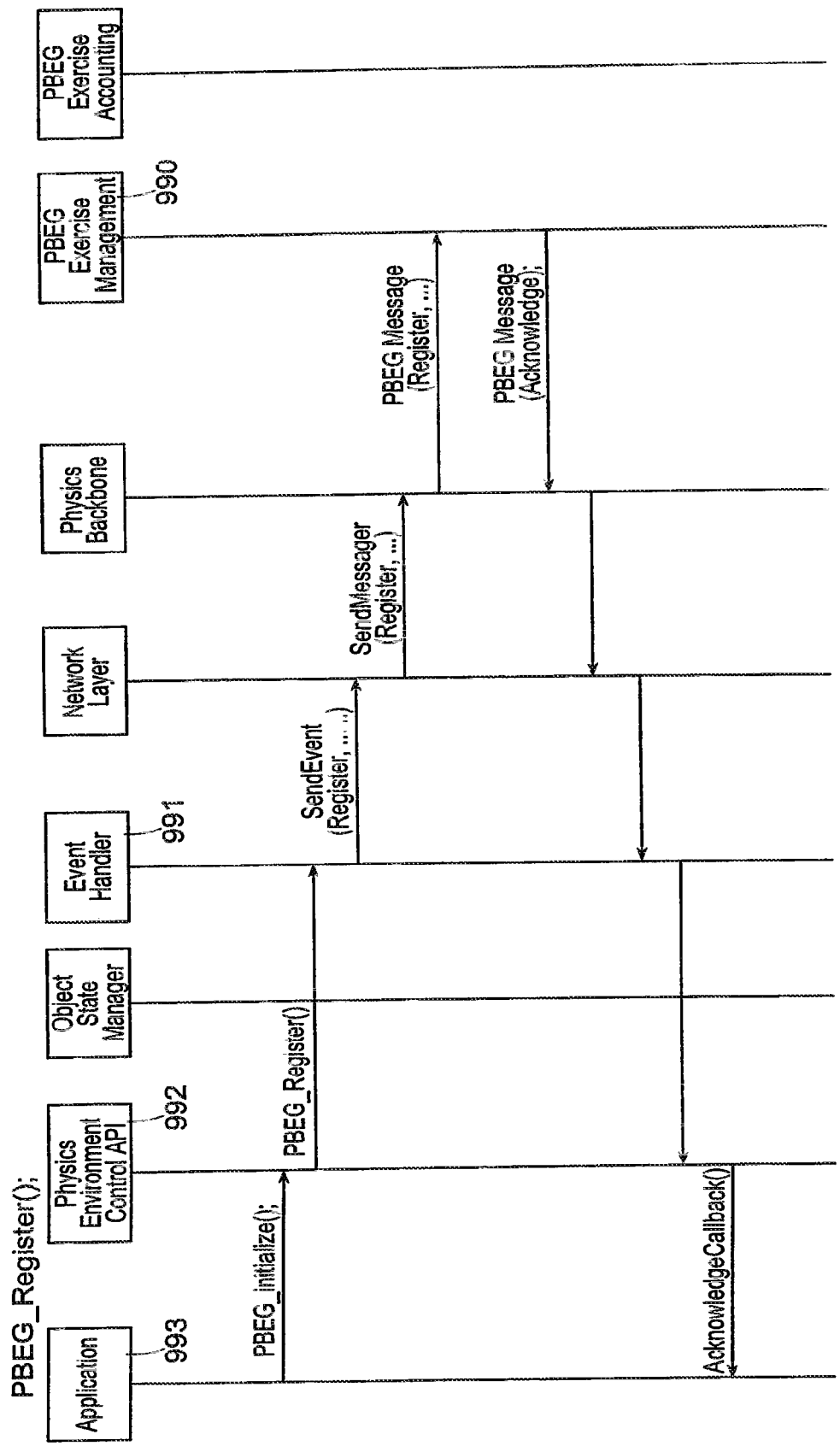

As best seen in FIGS. 44 and 45, a PBEG exercise management module 990 supported on a separate remote server, provides for exercises for training in the PBEG environment. The exercise management module 990 provides a variety of functions, including selecting the virtual world design for the physics based PBEG environment, e.g., the Arizona desert, from a library, and also setting up the PBEG or controlling a training exercise. The PBEG exercise management allows for applications to join the system and participate in an exercise even after it has started, and, also, applications can re-join an exercise after failure. Applications register themselves with the PBEG exercise management component and respond to PBEG exercise management controls. Preferably, provisions are also made for applications to operate in a stand-alone mode, without the PBEG exercise management.

The control flow for the start of an exercise is illustrated in FIG. 44. The PBEG exercise management module 990 transmits a message indicating exercise start across the physics backbone to the event handler at the client system for the application to be involved. The event handler 991 routes this notification to the physics environment control API 992 on the outer functionality layer of the PBEG infrastructure, which transfers the notification to the application 993 itself as an exercise callback message requesting a call back to the PBEG exercise management module 990. A callback is issued, either automatically or by operator input, acknowledging the start notification, which is passed into the physics infrastructure at API 992, then to the event handler 991 and over the network back to PBEG exercise management module 990.

A request for callback may also be made in the other direction as illustrated in FIG. 45. The application 993 transmits a registration request to the exercise management module 990. it enters the PBEG infrastructure through API 992, is passed to the event handler 992, which transmits the registration message over the network layer and physics backbone to the PBEG exercise management module 990. The PBEG exercise management module 990 then responds with an acknowledgement message that returns through the exact same route to application 993, arriving as an acknowledge callback.

The foregoing invention provides significant improvement over earlier distributed systems. The object state manager, which organizes object state data allows for a more efficient aggregation of virtual objects, even when they are the products of applications as different as legacy SAF systems and current simulator stations. The system and methods herein avoid latency as well as avoiding the problems of tight coupling between the behavior, physics and rendering, which has presented problems in the prior art. The use of plug ins as synchronizers and for the physics engines provides a very flexible open architecture, and the system of the invention is highly scalable.

It will be understood that the systems and methods of the foregoing disclosure are preferably implemented using software operating on electronic computer processor systems linked via a network such as the internet and having computer-accessible data storage attached thereto such as disk drives or other mass storage devices. The physics engine components, however, as discussed above, are preferably dedicated hardware implemented in a computer system having memory and display devices as are well known in the art.

As has been mentioned above, under certain circumstances, the master synchronizer or controller for an object may be replaced by a different master synchronizer at a different client system on the network. The process by which this happens is illustrated in FIG. 46

Figure 46:
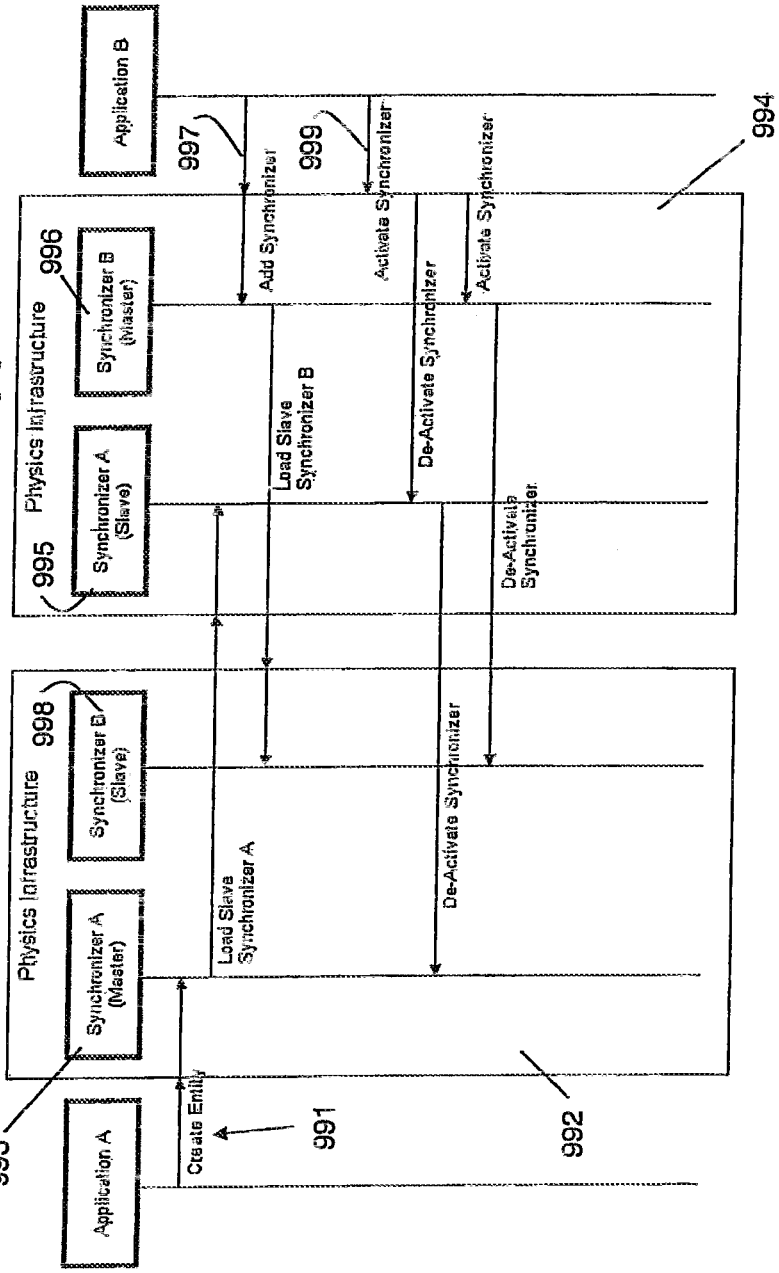
FIG. 46 is a timeline diagram illustrating the transfer of control of a client object from a master synchronizer at one computer system to a master controller at a second computer system.

When the object is first instantiated by application A in FIG. 46, a create-entity instruction 991 is sent through the physics environment API at computer system 992 to create master Synchronizer A 993. Master synchronizer A 993 sends a command over the physics network to load appropriate slave synchronizer A, which is received at a second computer system 994, which loads and starts slave synchronizer A 995.

At station 994 an application B is started, which may be a manual control or another type of controlling software for the entity that has been created. Application B triggers loading of master synchronizer B 996 by an add synchronizer command 997. This command may be the result caused by Application B when an instructor at station 994 activates direct human control of an entity at the instructor station, and the master synchronizer program starts on the instructor station computer. Loading of master synchronizer B produces a command to load slave synchronizer B, which is broadcast over the entire system, where every system, including system 992, loads a slave synchronizer B 998.

Subsequently, Application B is prompted by the user or by some other event to activate control by Application B. this results in an activate-synchronizer command 999 sent to the physics environment API at system 994, which does two things: it de-activates the then-active slave synchronizer following master synchronizer A, and it activates master synchronizer B to take control of the entity.

When de-activated, slave synchronizer A 995 sends a deactivation instruction to its master synchronizer A 993 over the network. The master controller 993 at the simulation station 992 controlling the entity then detects the presence of the superseding master synchronizer and relinquishes control, no longer transmitting any route data.

When activated, the new master synchronizer B 996 transmits an instruction to activate all the corresponding slave controllers throughout the system, including slave synchronizer B on client system 992. All the slave synchronizers loaded for master synchronizer B then begin to control their respective local copies of the entity according to the control data received from master synchronizer B 996, as operated by Application B. The control data may be route data or man-in-loop control data, depending on what type of application Application B is.

The process can be reversed responsive to Application A asserting control again with an activate synchronizer instruction to system 992, or responsive to a deactivate synchronizer command from Application B at computer system 994.

The terms used in this specification should be understood to be language of description, not limitation, as those of skill in the art with this specification before them will be able to make changes and modifications therein without departing from the scope of the invention. In particular, the term SAF as it has been used herein should not be seen as limited to legacy types of object force simulation, but as referring to any sort of moving entity or object that exhibits a computer-generated behavior, especially, but not limited to, computer-controlled opposing forces that act according to predefined tactical rules. Similarly, the terms object and entity have been used fairly interchangeably herein, both intended to refer to virtual objects or virtual collections of object defined by data stored in electronic computer systems.

What is claimed is:

1. A simulation system comprising:
a plurality of computerized simulation stations connected with each other via a network, each having a respective computer-accessible data storage storing a respective version of scene data corresponding to a virtual environment, a respective computerized image generator generating in real time serial frames each of which is a rendered view for a respective point of view in said virtual environment, and a display device displaying said frames to a respective user of the computerized simulation station;
said versions of the scene data each including respective client data defining a virtual client entity in the virtual environment, said client data including respective position data associated with the virtual client entity and defining a respective position thereof in the respective version of the virtual environment;
said computerized simulation stations each modifying the respective client data in real time pursuant to the respective version of the scene data and to communications over the network such that the respective version of the scene data defines the virtual client entity moving in the virtual environment according to predetermined physics rules defined in the computerized simulation station controlling movement of virtual objects in the virtual environment;
wherein each simulation station has a physics engine accessing physics based environment data stored at said simulation station corresponding to all virtual objects in the virtual environment of the scene data, the predetermined physics rules being implemented by said physics engine, said physics engine controlling the respective version of the scene data such that the virtual client entity and the virtual objects in the respective version of scene data move according to the physics based environment data and the physics rules;

wherein the simulation stations each transmit physics based data over the network corresponding to physical forces applied to some of the virtual objects in the virtual environment;

a simulation computer system determining behavior of the virtual client entity in the virtual environment and transmitting client synchronization data via the network to the simulation stations, said client synchronization data corresponding to said behavior and defining a location of the client entity in the virtual environment, and time-constraint data indicative of a point in time for the entity to be at the location; and each simulation station having a slave synchronizer receiving the client synchronization data and based thereon causing the respective version of the scene data to be modified so as to reflect movement toward synchronization of the location of the client entity in the respective version of the scene data with the virtual client entity being at said location at said point in time according to the predetermined physics rules and the respective version of the scene data so as to reduce any latency-caused differences between the positions of the virtual client entity in the versions of the scene data.

2. The system of claim 1, wherein the client synchronization data identifies the location as a point in the virtual environment.

3. The system of claim 2, wherein, where the client entity is a ground-moving entity, the client synchronization data identifies the location by a two-dimensional coordinate in a two-dimensional surface in the virtual environment in which the client entity moves.

4. The system of claim 2, wherein, where the client entity is an air-moving entity, the client synchronization data identifies the location by a three-dimensional coordinate in a three-dimensional space in the virtual environment in which the client entity moves.

5. The system of claim 1, wherein the client synchronization data identifies an orientation in the virtual environment for the client entity.

6. The system of claim 1, wherein the client synchronization data comprises data defining a point in time at which the entity is directed to reach the location.

7. The system of claim 1, wherein the client synchronization data comprises data defining a rate at which the entity is directed to move toward the location.

8. The system of claim 7, wherein the client synchronization data comprises data defining a start time at which the entity is directed to start moving toward the location.

9. The system of claim 1, wherein the synchronizer controls the movement of the client entity in the scene data using a closed loop control process.

10. The system of claim 1, wherein each synchronizer influences the respective version of the scene data by transmitting data to the physics engine configured to produce movement of the client entity in the virtual environment.

11. The system of claim 1, wherein positional update data is transmitted to the simulation stations so that the scene data is updated continually so as to be in conformance with all other versions of the scene data across the system.

12. The system of claim 1, wherein the client entity is directed to move along a route to said location, and wherein, if the client entity is prevented from movement toward the location by the physics engine due to obstruction of said route by an object or objects in the virtual environment, a new route to the location is devised that avoids being obstructed by said object or objects, and said client entity is caused by said synchronizer to move along said new route so as to reach the location by said point in time.

13. The system of claim 1, wherein the client entity is directed to move along a route to said location, and wherein, if the client entity is prevented from movement toward the location by the physics engine due to obstruction of said route by an object or objects in the virtual environment, said synchronizer causes the physics engine to temporarily suspend at least part of the physics rules thereof with respect to the object or objects such that the client entity is able to move without being obstructed thereby and so as to reach the location by said point in time.

14. The system of claim 1, wherein, responsive to the client movement data, the synchronizer is directed to move along a first route to said location, and, if the client entity is prevented from movement toward the location by the physics engine due to obstruction of said route by an object or objects in the virtual environment, the synchronizer attempts to devise a new route to the location that avoids being obstructed by said object or objects, wherein, if the synchronizer can devise the new route, said client entity is caused by said synchronizer to move along said new route so as to reach the location by said point in time; and wherein, if the synchronizer can devise the new route, said synchronizer causes the physics engine to temporarily suspend at least part of the physics rules thereof with respect to the object or objects such that the client entity is able to move along the route without being obstructed thereby and so as to reach the location by said point in time.

15. The system of claim 1, wherein the synchronizer derives from the client movement data a desired route for the client entity to follow to the location and a desired rate at which to proceed along said route, the synchronizer using a closed loop speed control process to control the rate of movement of the client entity along said route based on the desired rate, and the synchronizer using a closed loop steering control process to control the direction of movement of the client entity so that said client entity follows said route.

16. The system according to claim 1, wherein the simulation stations each emulate a vehicle and include input devices that allow input of control commands from the respective user, said control commands being used by the respective simulation system to influence the version of scene data.

17. The system according to claim 16, wherein the simulation stations each transmit client synchronization data for a respective client vehicle entity, and the other simulation stations each has a synchronizer that moves the client vehicle entity in the respective version of the scene data according thereto and according to the respective physics rules.

18. The system according to claim 1, wherein the synchronizer compares a position of the virtual client entity derives difference data from a comparison of a synchronized position derived from the client synchronization data with a current position of the virtual client entity, and deriving physics data causing the virtual client entity to move toward the synchronized position.

19. The system according to claim 1, wherein the simulation computer system has a simulated vehicle receiving input from a trainee and a master synchronizer, said master synchronizer deriving the client synchronization data.

20. The system of claim 1, wherein the simulation computer system causes the virtual client entity to simulate operation of a vehicle responsive to input from a human operator interacting with the simulation computer system.

21. The system of claim 1, wherein the simulation computer system determines the behavior of the virtual client entity as an automated force acting solely based on automatic computer control thereof.

22. A system for providing distributed simulations to one or more users, said system comprising:
- a first computer system linked for communication over a network and having a data storage device storing data and a display;
- said data storage device storing scene data defining a first version of a virtual scene having a number of virtual objects therein each having a respective visual appearance, position and orientation defined by said scene data;
- said computer system including a viewer generating real time imagery from said scene data and displaying said imagery on said display, the imagery corresponding to a rendered view at the time the image was rendered of the virtual scene as defined by said scene data;
- a second computer system having a data storage device, said data storage device storing scene data defining a second version of the same virtual scene with the same virtual objects as defined by said data on the first computer system;
- said first and second computer systems each independently determining the positions of virtual objects in the virtual scene based on the scene data defining the respective version of the virtual scene, predetermined physics rules defining interactions between the virtual objects, and communications received over the network relating to some of the virtual objects;
- wherein each computer system has a physics engine with memory therein, said physics engine setting the predetermined rules defining interactions between the virtual objects and storing physics data corresponding to physical parameters of the virtual objects in the virtual scene including respective positions thereof, said scene data at each computer system being periodically updated by position data from the physics engine thereof;
- wherein the computer systems transmit physics data between the physics engines over the network, said physics data including physics data units each being determined at a respective one of said physics engines and corresponding to a respective virtual force applied to a respective one of the virtual objects, wherein the virtual force is applied to said virtual object by the other of the physics engine;
- said second computer system running a program determining movement of a controlled virtual object in the virtual scene;
- said second computer system further having a master synchronizer transmitting over the network route data for said controlled virtual object indicative of a point in the virtual scene and a future point in time by which the controlled virtual object is directed to reach said point;
- said first computer system having a slave synchronizer receiving said route data, and responsive thereto, causing the scene data stored therein to be modified so that in the scene data stored at the first computer system, the controlled virtual object moves to the point in the virtual scene by the point in time in conformance with the predetermined physics rules defining interactions between the virtual objects so as to reduce any latency-caused difference between the positions of the controlled virtual object as determined by the first and second computer systems.

23. The system of claim 22 wherein the point in time is defined in terms of a shared system clock value.

24. The system of claim 22 wherein the route data comprises data defining a point and data defining a point in time.

25. The system of claim 22 wherein the route data comprises data defining a point in the scene, a start time and a rate.

26. The system of claim 22 wherein the first computer system has a master synchronizer that begins to transmit route data for the virtual object to the second computer system, and said second computer system has a slave synchronizer that modifies the data stored at the second computer system so as to comply with said route data, and the master synchronizer at the second computer system relinquishes control of the controlled virtual object and the slave synchronizer at the first computer system does not cause further changes in the data at the first computer system.

27. The system of claim 22 wherein the slave synchronizer at the first computer system determines whether the virtual object is delayed in proceeding to said point by said time, and responsive to said determination, takes a corrective action selected from the group consisting of increasing force on the virtual object, causing the virtual object to move on a route around an obstruction, and modifying or suspending physical rules of the physics engine so as to permit the virtual object to reach the point by the time.

28. The system of claim 22, wherein the second computer system determines the movement of the controlled virtual object as an automated force with a behavior determined by the second computer system.

29. A system for providing simulations to one or more users, said system comprising:
- a plurality of computerized simulation stations each linked with and communicating over a network so as to transmit data to each other thereacross;
- each simulation station having a data storage device storing scene data defining a respective version of a shared virtual environment including respective positions of virtual entities in said version of said virtual environment;
- each simulation station determining and transmitting over the network physical data indicative of virtual force being applied in the simulation to an associated one of the virtual entities, and each simulation station receiving over the network from one of the other simulation stations physical data defining respective virtual forces being applied in simulation for one of the other virtual entities;
- each of said simulation stations including
- a physics engine determining in real time positions of the virtual entities in the respective version of the scene data according to predetermined physics rules based on the physical data, on physics data in the scene data defining physical attributes in simulation of the virtual entities and virtual objects in the virtual environment;
- an image generator generating video for the simulation in real time from the respective scene data; and
- a display apparatus displaying the video to the respective user in real time;
- each simulation station transmitting to all other simulation stations synchronization data for the associated virtual entity defining a position in the virtual environment and a point in time for the associated virtual entity to be at said point;
- each simulation station receiving over the network synchronization data for a virtual entity associated with another simulation station, and having a slave synchronizer determining synchronizer forces that are applied to said virtual entity by the physics engine thereof so as to cause said virtual entity to move toward a position based on said received synchronization data in conformance with the predetermined physics rules so as to reduce any latency-caused differences between the positions of the virtual entity in the versions of the scene data.

30. The system according to claim 29, wherein the synchronizer forces are determined by a controller that compares a current position of the virtual entity with a desired position thereof and calculates forces configured to move said virtual entity toward the desired position in the version of the scene data.

31. The system according to claim 30, wherein the controller operates in a control loop so as to continually determine said forces to move the virtual entity to the desired position.

32. The system according to claim 30, wherein, responsive to a determination that the virtual entity is delayed in proceeding to said desired position by said point in time, the simulation station takes a corrective action selected from the group consisting of increasing force on the virtual entity, causing the virtual entity to move on a route around an obstruction, and modifying or suspending the physics rules of the physics engine so as to permit the virtual entity to reach the desired position by the point in time.

33. The system of claim 29, wherein the simulation stations each include a simulator of a respective vehicle, and the associated virtual entity corresponds to the respective vehicle in the virtual environment, said simulation system determining movement of the associated virtual entity responsive to user input from the simulator.

34. A system for providing simulation of a shared virtual environment to a plurality of users, said system comprising:
   a network connecting a plurality of computerized simulation stations each associated with a respective user and storing a respective version of simulation environment data defining the virtual environment; and
   said simulation stations exchanging over the network physics force data defining forces applied to virtual objects in the virtual environment and synchronization data defining master synchronizer time and location data in the virtual environment for corresponding virtual objects determined by an assigned respective one of the simulation stations;
   each simulation station having a slave synchronizer determining synchronizer physics force data from the synchronization data for the associated virtual object not assigned to said simulation station, said synchronizer physics force data being configured to move the virtual object toward a position based on the master synchronizer time and location data of the synchronization data so as to reduce any latency-caused differences between the positions of the virtual object in the versions of the simulation environment data;
   each simulation station determining respective positions in the version of the simulation environment data thereof for virtual objects based on the physics force data and predetermined physics rules so that positions of the virtual objects are synchronized across the system in conformance with the physics rules; and
   wherein each simulation station determines said respective positions in the version of the simulation environment data thereof for the virtual objects using a physics processing unit of the simulation station applying the physics force data.

35. The system according to claim 34, wherein the simulation environment data includes data defining the position, orientation, mass, dimensions, and appearance of all virtual objects in the virtual environment.

36. The system according to claim 35, wherein for each of the virtual objects the master synchronizer time and location data thereof is generated by only one of the simulations stations.

37. The system according to claim 36, wherein the simulation station generating the master synchronizer time and location data operates as a master synchronizer, and all other simulation stations process the master synchronizer time and location data as slave synchronizers.

38. The system according to claim 34, wherein the simulator stations each has an image generator rendering video in real time of the virtual environment based on the respective version of the simulated environment data, and a display device displaying said video to the user.

39. The system according to claim 34, wherein the simulation stations each determine the synchronizer physics force data based on a comparison of the position of the virtual object according to the respective version of the simulation environment data with a desired position of the virtual object based on the master synchronizer time and location data of the synchronization data.

40. The system of claim 34 wherein the simulation stations each include a simulator of a respective vehicle, and the associated virtual entity corresponds to the respective vehicle in the virtual environment, said simulation system determining movement of the associated virtual entity responsive to user input from the simulator.

* * * * *